United States Patent
Yim et al.

(10) Patent No.: US 10,104,218 B2
(45) Date of Patent: Oct. 16, 2018

(54) MOBILE TERMINAL AND METHOD FOR CONTROLLING SAME

(71) Applicant: LG ELECTRONICS INC., Seoul (KR)

(72) Inventors: Youngbin Yim, Seoul (KR); Hyukjae Jang, Seoul (KR); Jungseok Lee, Seoul (KR); Sungho Woo, Seoul (KR); Taejung Kwon, Seoul (KR); Jiyong Yoo, Seoul (KR); Minjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/513,547

(22) PCT Filed: Jul. 1, 2015

(86) PCT No.: PCT/KR2015/006763
§ 371 (c)(1),
(2) Date: Mar. 22, 2017

(87) PCT Pub. No.: WO2016/047902
PCT Pub. Date: Mar. 31, 2016

(65) Prior Publication Data
US 2017/0289329 A1    Oct. 5, 2017

(30) Foreign Application Priority Data

Sep. 23, 2014 (KR) .................. 10-2014-0126895
Oct. 2, 2014 (KR) .................. 10-2014-0133414
Oct. 13, 2014 (KR) .................. 10-2014-0137799

(51) Int. Cl.
*H04W 88/02*    (2009.01)
*H04M 1/725*    (2006.01)
(Continued)

(52) U.S. Cl.
CPC ......... *H04M 1/7253* (2013.01); *H04W 4/008* (2013.01); *H04W 4/80* (2018.02);
(Continued)

(58) Field of Classification Search
CPC . H04M 1/7253; H04W 76/023; H04W 8/005; H04W 4/008; H04W 88/02; H04W 84/18
See application file for complete search history.

(56) References Cited

U.S. PATENT DOCUMENTS

2005/0272408 A1    12/2005 Wilkes-Gibbs et al.
2010/0227651 A1*   9/2010 Kim .................. G06F 3/1423
                                                           455/566

(Continued)

FOREIGN PATENT DOCUMENTS

JP    2011142527    7/2011
JP    2012060494    3/2012

(Continued)

OTHER PUBLICATIONS

PCT International Application No. PCT/KR2015/006763, International Search Report dated Oct. 12, 2015, 4 pages.

(Continued)

*Primary Examiner* — Chuong A Ngo
(74) *Attorney, Agent, or Firm* — Lee, Hong, Degerman, Kang & Waimey

(57) ABSTRACT

The present invention relates to a mobile terminal which can detect the operation states of a plurality of other devices, and a method for controlling the mobile terminal. The mobile terminal comprises: a display unit; a transceiver for receiving information regarding the operation state of each of a plurality of devices and transmitting information regarding the current operation state to at least one of the plurality of devices; and a control unit for carrying out control related to an occurred event when an event occurs, wherein the control (Continued)

unit determines the availability state of the terminal, and transmits, using a wireless communication unit, information related to the event to another terminal in order to enable the information regarding the occurred event to be outputted by another terminal in accordance with the result of the determination, or outputs the information related to the event through an output unit.

14 Claims, 55 Drawing Sheets

(51) Int. Cl.
*H04W 8/00* (2009.01)
*H04W 76/02* (2009.01)
*H04W 4/00* (2018.01)
*H04W 76/14* (2018.01)
*H04W 4/80* (2018.01)
*H04W 84/18* (2009.01)

(52) U.S. Cl.
CPC ......... *H04W 8/005* (2013.01); *H04W 76/023* (2013.01); *H04W 76/14* (2018.02); *H04W 84/18* (2013.01); *H04W 88/02* (2013.01)

(56) References Cited

U.S. PATENT DOCUMENTS

| | | | |
|---|---|---|---|
| 2013/0113830 A1* | 5/2013 | Suzuki | G06T 3/00 345/634 |
| 2013/0244633 A1 | 9/2013 | Jacobs et al. | |
| 2015/0065095 A1* | 3/2015 | Seo | H04L 67/2823 455/412.2 |
| 2015/0103708 A1* | 4/2015 | Kang | H04W 72/0433 370/311 |
| 2015/0351690 A1* | 12/2015 | Toth | A61B 5/6833 600/373 |

FOREIGN PATENT DOCUMENTS

| | | |
|---|---|---|
| KR | 20070120827 | 12/2007 |
| KR | 20100093740 | 8/2010 |

OTHER PUBLICATIONS

European Patent Office Application Serial No. 15843339.1, Partial Search Report dated May 16, 2018, 11 pages.

* cited by examiner

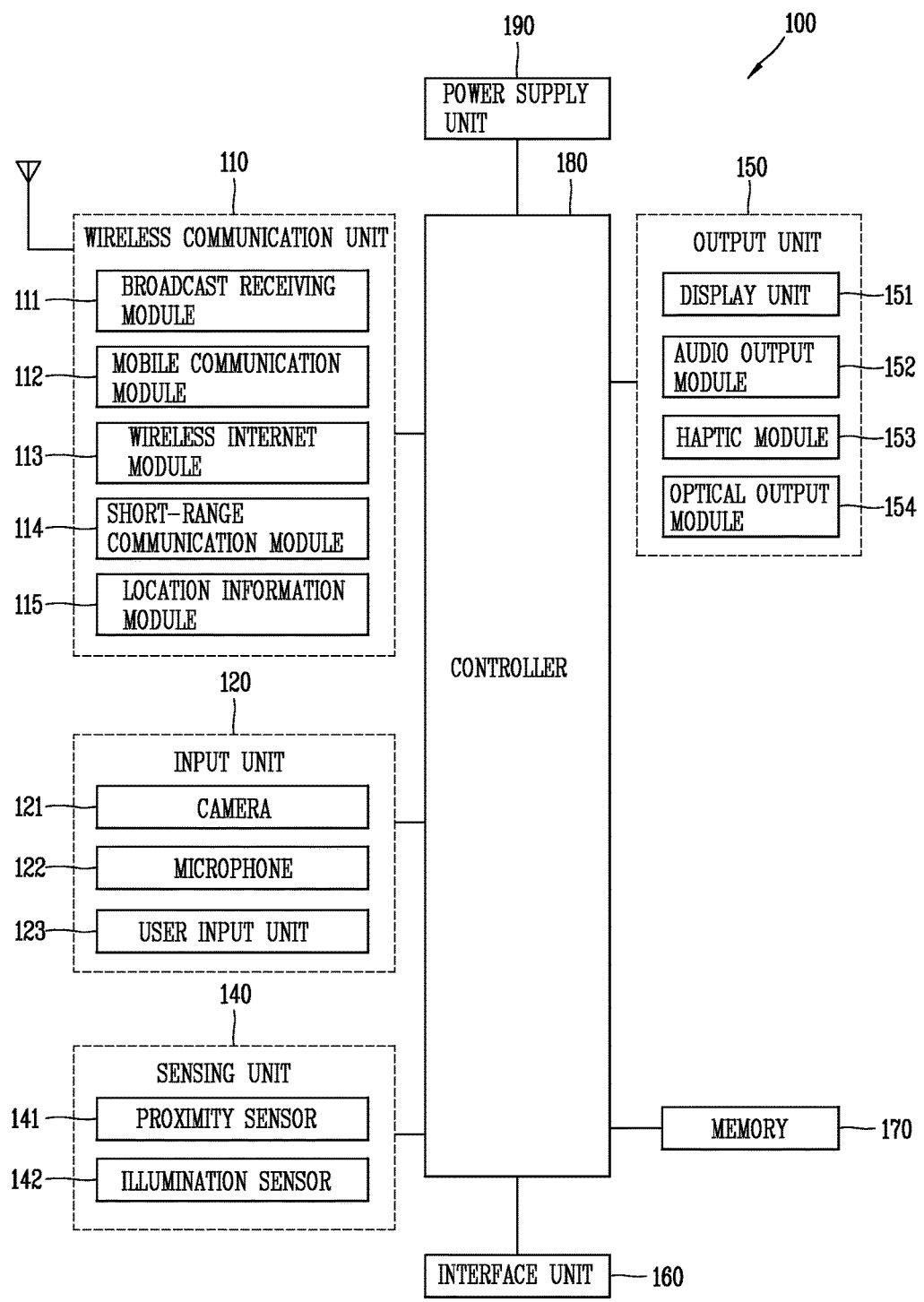

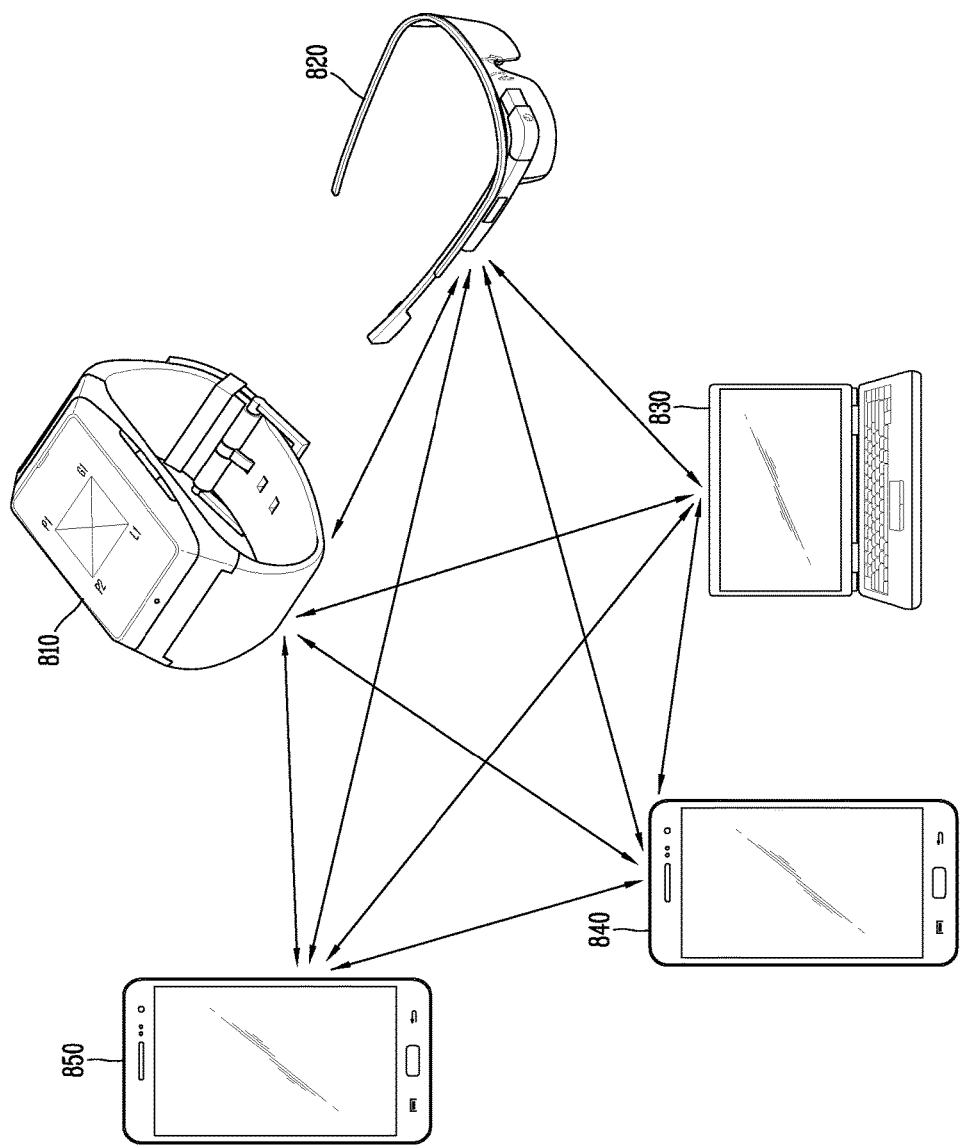

FIG. 29
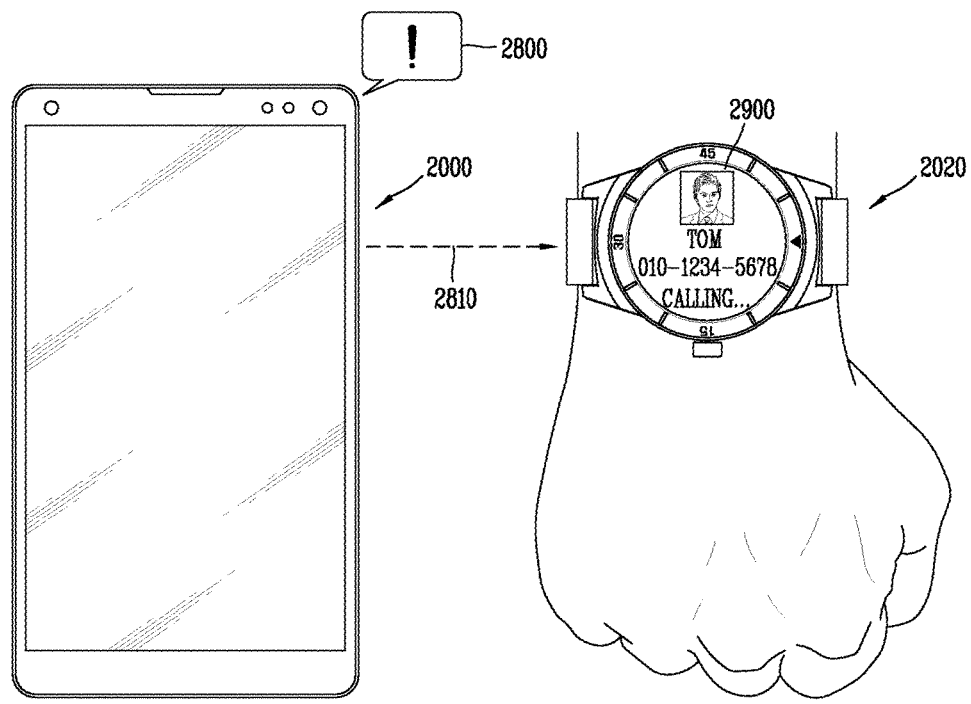
(a)  (b)
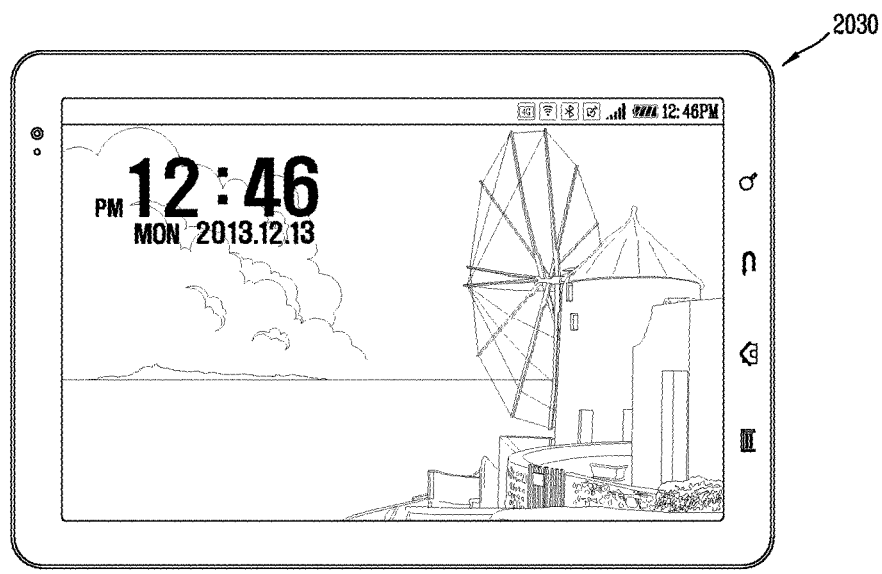
(c)

FIG. 30
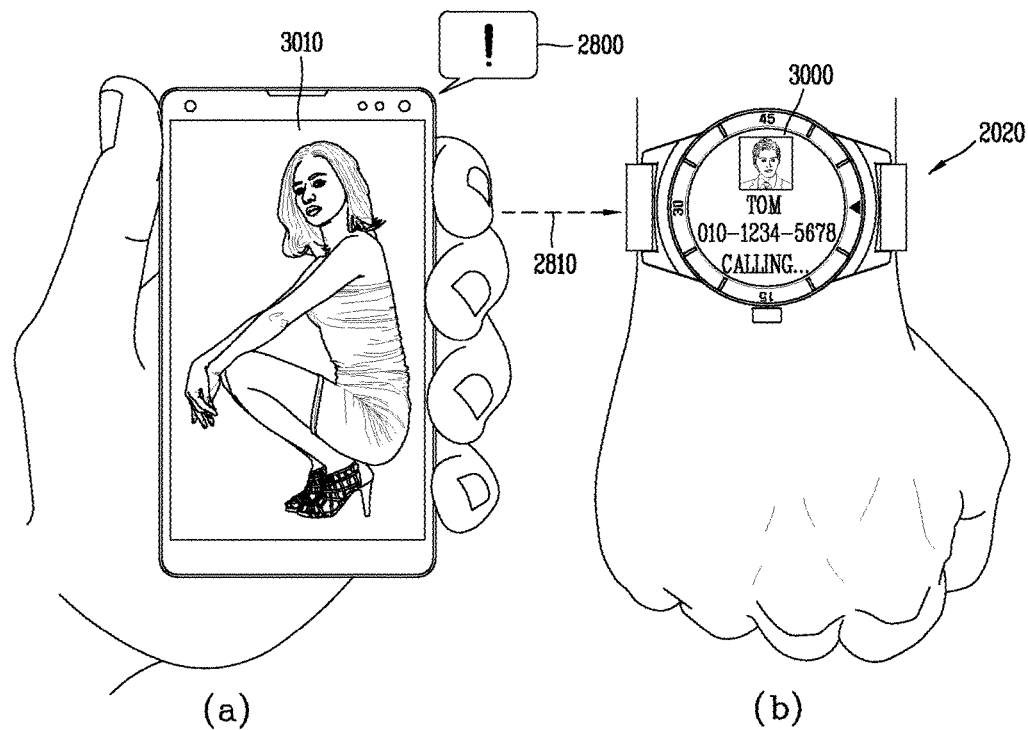
(a)  (b)
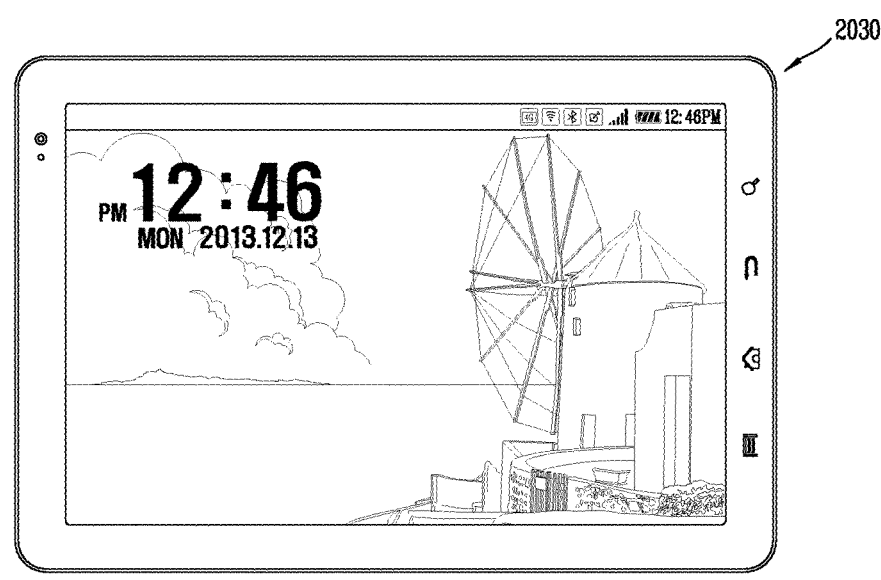
(c)

FIG. 31
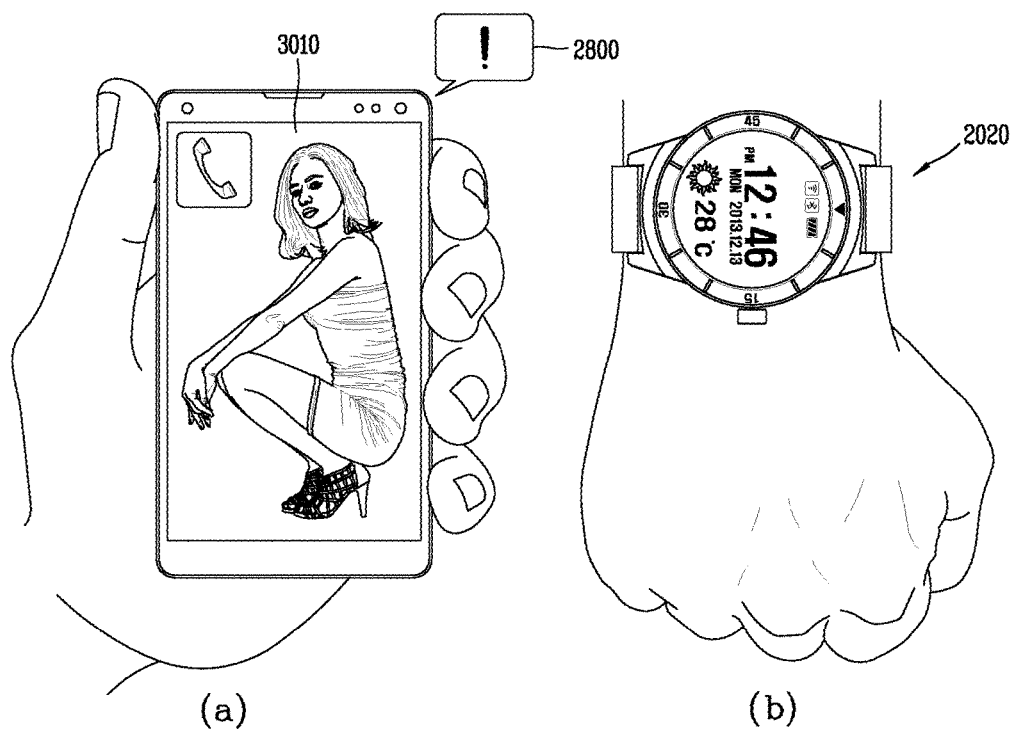
(a)  (b)
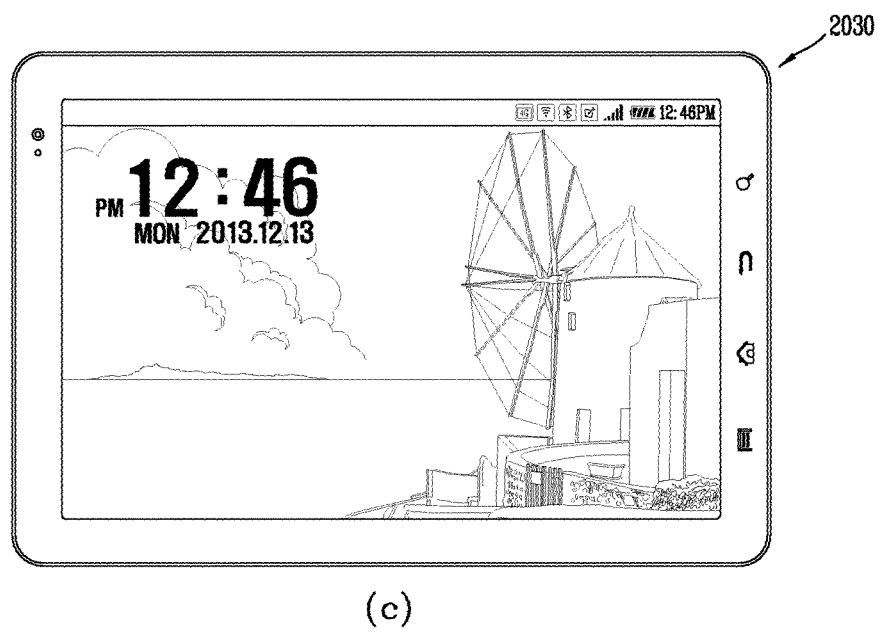
(c)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2015/006763, filed on Jul. 1, 2015, which claims the benefit of earlier filing date and right of priority to Korean Application Nos. 10-2014-0126895, filed on Sep. 23, 2014, 10-2014-0133414, filed on Oct. 2, 2014 and 10-2014-0137799, filed on Oct. 13, 2014, the contents of which are all hereby incorporated by reference herein in their entirety.

TECHNICAL FIELD

The present disclosure relates to a mobile terminal and a control method thereof.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Moreover, in recent years, technologies have developed to further miniaturize terminals, and accordingly, various types of wearable terminals such as a smart watch for allowing a user to wear like a watch or glasses have been in the market. Furthermore, in this case, the user may carry a plurality of terminals at the same time, and use a plurality of such carried terminals at the same time. Accordingly, studies on a method of more effectively using such a plurality of terminals have been actively carried out.

DISCLOSURE OF THE INVENTION

An object of the present disclosure is to provide a mobile terminal capable of allowing a user to more easily control a plurality of devices when the user uses the plurality of devices, and a control method thereof.

Another object of the present disclosure is to provide a mobile terminal capable of checking the operation states of at least one other device, and providing a user interface associated with various functions executable on the at least one other device, and a control method thereof.

Still another object of the present disclosure is to provide a mobile terminal for allowing a user to check information associated with an event occurred on a plurality of terminals, respectively, using any one of the plurality of terminals when the user uses the plurality of terminals, and a control method thereof.

Yet still another object of the present disclosure is to provide a mobile terminal capable of selecting any one of the plurality of terminals based on a user's situation, and allowing the selected terminal to output information associated with an event occurred on the plurality of terminals, respectively, and a control method thereof.

In order to accomplish the foregoing and other objects, according to an aspect of the present disclosure, a mobile terminal according to an embodiment of the present disclosure may include a wireless communication unit configured to transmit and receive wireless signals, an output unit configured to output at least one of audio information and image information, and a controller configured to perform control associated with an occurred event when the event occurs, wherein the controller determines an available state of the terminal, and transmits information associated with the occurred event to another terminal using the wireless communication unit or outputs information associated with the event through the output unit to output information associated with the event from the another terminal according to the determination result.

According to an embodiment, the controller may determine an available state of the mobile terminal based on at least one of whether the mobile terminal is worn or gripped by a user, and an operation state of the mobile terminal.

According to an embodiment, the controller may determine that the mobile terminal is not in an available state when the operation state of the mobile terminal is a sleep mode, and transmit information associated with the event to at least one terminal operating in a wake-up state among the other terminals.

According to an embodiment, when at least two of the mobile terminal and at least one of the other terminals operate in a wake-up state, the controller may transmit information associated with the event to a terminal worn or gripped by a user.

According to an embodiment, when two or more terminals are worn or gripped by the user, the controller may transmit information associated with the event to any one of the worn or gripped mobile terminals based on whether or not there is provided with a display unit and a size of the provided display unit.

According to an embodiment, when the operation state of the mobile terminal is a wake-up state, the controller may transmit information associated with the event to other terminals or output information associated with the event through the output unit based on whether or not there are the other terminals operating in a wake-up state.

According to an embodiment, when there are other terminals operating in the wake-up state, the controller transmits information associated with the event to the other terminals or outputs information associated with the event through the output unit based on an application executed on the mobile terminal and the other terminals operating in the wake-up state.

According to an embodiment, the controller may control the wireless communication unit or the output unit to output information associated with the event from a terminal except terminals on which a preset specific application is executed among the mobile terminal and the other terminals operating in the wake-up state.

According to an embodiment, the controller may transmit information associated with the event to the other terminals or output information associated with the event through the output unit based on whether or not the other terminals operating in the wakeup state and the mobile terminal are worn or gripped by a user.

According to an embodiment, the wireless communication unit may receive information associated with an event occurring on at least one of the other terminals, and the controller may output information associated with an event occurring in the at least one of the other terminals based on an available state of the mobile terminal.

According to an embodiment, the event may include a case of generating an alarm by an alarm set in the mobile terminal or the at least one of the other terminals, wherein the controller outputs an alarm set in the mobile terminal and an alarm at an alarm time set in the at least one of the other terminals, or transmits information associated with the alarm set in the mobile terminal to the other terminals based on an available state of the mobile terminal.

According to an embodiment, when an alarm is output from the mobile terminal, the controller may transmit information associated with the output alarm to the at least one of the other terminals to output the alarm even on the at least one of the other terminals if there is no user's check on the alarm within a predetermined period of time.

According to an embodiment, the mobile terminal may further include a sensing unit configured to sense a user's biological signal, wherein the controller determines a user's physical condition based on the sensed result of the sensing unit, and transmits information associated with the user's physical condition to other terminals when the user's physical condition is in a specific state.

According to an embodiment, when a user is in a sleep state as a result of determining the user's physical condition or receiving information associated with the user's physical condition from at least one of other terminals, the controller may switch the operation mode to a vibration mode or a mute mode according to whether or not the mobile terminal is worn by the user.

According to an embodiment, the controller may further determine a user's surrounding situation, and transmit information associated with the occurred event to another terminal or output information associated with the event through the output unit based on a result of determining the user's surrounding situation.

According to an embodiment, the controller may determine the user's surrounding situation based on at least one of a location of the user, whether the user has entered a specific region, and a predetermined schedule of the user.

According to an embodiment, when there is a prespecified terminal configured to output information associated with the occurred event, the controller may transmit information associated with the event to other terminals or output information associated with the event through the output unit based on whether or not the mobile terminal is the prespecified terminal.

According to an embodiment, the prespecified terminal may be different according to the type of the occurred event.

According to an embodiment, when there is a user's check on the information associated with an event output from the mobile terminal, the controller may transmit information associated with the user's check to at least one of the other terminals.

In order to accomplish the foregoing and other objects, according to an aspect of the present disclosure, a control method of a mobile terminal according to an embodiment of the present disclosure may include exchanging at least one of an operation state and information associated with the sensed surrounding environment with at least one of other terminals, sensing whether or not an event occurs, selecting either one of the terminal and the at least one terminal based on an available state of the terminal and the exchanged information during the occurrence of the event, and outputting notification information for notifying the occurrence of the event or transmit information associated with the event to other terminals according to whether or not the terminal is selected.

In order to accomplish the foregoing and other objects, according to an aspect of the present disclosure, there is provided a mobile terminal connectable to at least one of a plurality of devices sharing information associated with an operation state between them, and the mobile terminal may include a display unit, a transmitting and receiving unit configured to receive information associated with an operation state of each of the plurality of devices from the at least one device and transmit information associated with a current operation state to at least one of the plurality of devices, and a controller configured to display a plurality of graphic objects corresponding to at least part of functions executable on the mobile terminal and the plurality of devices in a grouped manner for each device, and display the graphic objects in different manners on the display unit according to the operation states of the mobile terminal and the plurality of devices, wherein the controller controls at least one function executable on the mobile terminal and the plurality of devices based on a touch input to any one of the graphic objects.

According to an embodiment, the controller may further display a control menu including a plurality of graphic objects corresponding to at least part of commonly executable functions, respectively, on the mobile terminal and the plurality of devices.

According to an embodiment, the controller may arrange a plurality of graphic objects corresponding to executable functions, respectively, on the plurality of devices according to a preset order, and arrange graphic objects included in the control menu according to an order in which the plurality of graphic objects are arranged.

According to another embodiment, the controller may display graphic objects included in the control menu at a position adjacent to the graphic objects grouped by the plurality of devices to display graphic objects included in the control menu, and graphic objects corresponding to executable functions on the plurality of devices at the same column for each function.

According to an embodiment, the preset order may be determined according to a degree of use of each function determined based on a user's preset order, a number of times a function is selected or executed by the user, a time at which the function is executed, or the like.

According to an embodiment, the controller may determine a position at which graphic objects corresponding to the plurality of devices and functions executable on the plurality of devices are displayed on the display unit based on at least one of a user's preset order, a frequency or time at which the user uses the plurality of devices, or whether or not there is any device having the same or similar function among the devices.

According to an embodiment, the controller may display a menu screen including executable functions by any one of the plurality of devices on at least part of the display unit based on a touch input to any one of graphic objects corresponding to the any one device, and allow a user to select functions to be displayed on the display unit through the plurality of graphic objects among functions executable on the any one device through the menu screen.

According to an embodiment, the controller may display a menu screen including executable functions by the mobile terminal and the plurality of devices based on a touch input to any one of graphic objects included in the control menu on at least part of the display unit, and allow a user to select a function to be added to the control menu or a function to be deleted from the control menu among function included in the control menu through the menu screen.

According to an embodiment, when a specific function is added to the control menu or deleted from the control menu, the controller may add a graphic object corresponding to the specific function to a plurality of graphic objects corresponding to at least part of executable functions on the mobile terminal and the plurality of devices or remove it from a plurality of graphic objects included in the control menu.

According to an embodiment, when there is a user's touch input to any one of graphic objects included in the control menu, the controller may control a function corresponding to the graphic object on the mobile terminal and the plurality of devices according to the touch input.

In order to accomplish the foregoing and other objects, according to an aspect of the present disclosure, a control method of a mobile terminal according to an embodiment of the present disclosure may include receiving information associated with an operation state from at least one device adjacent to the mobile terminal, displaying a plurality of graphic objects corresponding to at least part of executable functions on the mobile terminal and the at least one device in a grouped manner for each device, displaying the graphic objects in different manners based on information received from the at least one device and a current operation state of the mobile terminal, displaying a control menu including a plurality of graphic objects corresponding to at least part of commonly executable functions, respectively, on the mobile terminal and the at least one device, and controlling an executable function on at least one of the at least one device and the mobile terminal based on a user's touch input to any one of graphic objects grouped for the each device and graphic objects included in the control menu.

In order to accomplish the foregoing task, according to an aspect of the present disclosure, a communication medium device for a network configuration associated with an embodiment of the present disclosure may include a wireless communication device configured to transmit a command signal to each of communicatively connectable communication devices to allow at least one of the communication devices to broadcast a specific signal, and a controller configured to control communication connection state information between the communication devices, as the communication device that has received the command signal broadcasts the specific signal, to be received through the wireless communication unit from the communication devices, respectively, and control the communication connection state between the communication devices to be displayed based on the received communication connection state information, wherein the specific signal includes information for each of the communication devices to be connected to each other.

According to an embodiment, when at least one communication connection state between the communication devices is in a communication disabled state, the controller may control to receive the communication disabled state information from the communication device, and control to display the communication connection state of the communication device in the communication disabled state.

According to an embodiment, when communication connection priorities between the communication devices are set, the controller may control communication connection state information between the communication devices for which the priorities are set to receive from each of the communication devices for which the priorities are set, and display a connection state of a communication device connected to the communication device for which the connection priority is set.

According to an embodiment, the controller may control to broadcast the specific signal, and further display a communication connection state of the connected device using the specific signal broadcasted by the communication medium device.

According to an embodiment, the controller may control the distance information of the communication device to be included in communication connection state information between the communication devices that have received the broadcasted specific signal, and control the distance information between the communication devices to be displayed based on the received communication connection state information.

According to an embodiment, the communication medium device may further include a display unit configured to display at least one communicatively connectable communication device on a UI screen, wherein the controller controls the display unit to display a communication connection state between the communication devices on the UI screen.

According to an embodiment, the communication medium device may further include an audio output unit configured to output the information of at least one of communicatively connectable communication devices, wherein the controller outputs a communication connection state between the communication devices through the audio output unit.

On the other hand, a control method of a communication medium device for a network configuration according to an embodiment of the present disclosure may include transmitting a command signal to each of communicatively connectable communication devices to allow at least one of the communication devices to broadcast a specific signal, receiving communication connection state information between the communication devices, as the communication device that has received the command signal broadcasts the specific signal, from the communication devices, respectively, and displaying the communication connection state between the communication devices based on the received communication connection state information, wherein the specific signal includes information for each of the communication devices to be connected to each other.

According to an embodiment, said receiving step may include receiving the communication disabled state information from the communication device when at least one communication connection state between the communication devices is in a communication disabled state, and said displaying step may include displaying the communication connection state of the communication device in the communication disabled state.

According to an embodiment, said receiving step may include may receive communication connection state information between the communication devices for which the priorities are set from each of the communication devices for which the priorities are set when communication connection priorities between the communication devices are set, and said displaying step may reflect the received communication connection state information to display a connection state between communication device.

According to an embodiment, the control method may further include broadcasting the specific signal, and said displaying step may further display a communication connection state of the connected device using the specific signal broadcasted by the communication medium device.

According to an embodiment, said receiving step may allow the distance information of the communication device to be included in communication connection state information between the communication devices that have received the broadcasted specific signal, and control the distance information between the communication devices to be displayed based on the received communication connection state information.

According to an embodiment, the control method may further include displaying at least one communicatively connectable communication device on a UI screen, and said display step may display a communication connection state between the communication devices on the UI screen.

According to an embodiment, the control method may further include outputting the information of at least one of communicatively connectable communication devices through the audio output unit, and said display step may output a communication connection state between the communication devices through the audio output unit.

On the other hand, a communication system associated with an embodiment of the present disclosure may include a communication medium device configured to transmit a command signal to allow at least one communicatively connectable communication device to broadcast a specific signal each of the communication devices and a communication device configured to allow the communication device that has received the command signal to broadcast the specific signal, wherein the communication medium device receives communication connection state information between the communication devices that have received the broadcasted specific signal from the communication device, and displays a communication connection state between the communication devices based on the received communication connection state information.

According to an embodiment, when the communication medium device is unable to perform a communication medium between the communication devices, the communication system may select one of the communication devices as a new communication medium device, and the new communication medium device may transmit a command signal to each of the communication devices to broadcast a specific signal, and the communication device that has received the command signal may broadcast the specific signal, and receive communication connection state information between the communication devices that has received the broadcasted specific signal from the communication device, and display a communication connection state between the communication devices based on the received communication connection state information.

According to an embodiment, when a command for changing a device communicatively connected to a first communication device communicatively connected thereto to a second communication device instead is received at the first communication device, the first communication device may release existing communication connection, and perform communication connection with the second communication device.

According to an embodiment, when there are a plurality of communication devices communicatively connected to the first communication device, the first communication device may release one of the existing communication connections based on a preset reference of existing communication connections, and perform communication connection with a new second communication device.

According to an embodiment, when a second device communicatively connected to the first communication device communicatively connected thereto and a third device communicatively connectable to the first communication device are located, and a communication connection command between the second communication device and the third communication device is received at the first communication device, the first device may perform communication medium to allow the second device and the third device to be communicatively connected to each other, and release communication connection between the first device and the second device.

The effects of a mobile terminal according to the present disclosure and a control method thereof will be described as follows.

According to at least one of the embodiments of the present disclosure, the objective of the present disclosure is to provide a mobile terminal and a control method thereof in which when a user uses a plurality of terminals, an event occurs on at least one of the plurality of terminals is transmitted to any one of the terminals determined based on a preset condition, thereby preventing notification information from being output from each of the plurality of terminals.

Furthermore, according to at least one of the embodiments of the present disclosure, the present disclosure may select any one terminal to output notification information based on an operation state of each of the terminals and whether or not the terminal is gripped or worn by a user, thereby having an advantage capable of checking events occurring on the plurality of terminals through a terminal currently used by the user.

Furthermore, according to at least one of the embodiments of the present disclosure, the present disclosure may recognize a user's surrounding environment to select any one terminal to output the notification information, and determine an operation mode of the plurality of terminals, thereby having an advantage capable of outputting notification information more suitable for a user's current situation.

According to at least one of the embodiments of the present disclosure, the present disclosure may provide a user interface including information on a current operation state and executable functions of at least one of other devices, thereby having an advantage of checking the operation state of the at least one of other devices and executing a desired function.

BRIEF DESCRIPTION OF THE DRAWINGS

FIG. 1 is a block diagram for explaining a mobile terminal that can be employed as a communication medium device in accordance with an embodiment of the present disclosure.

FIGS. 12A and 12B are views illustrating the operation of a network system when a communication medium device is excluded from the network.

FIGS. 28 through 31 are exemplary views illustrating an example in which notification information is output from either one of a mobile terminal associated with the embodiment of the present disclosure and at least one of other terminals selected based on an operation state and a surrounding environment.

MODES FOR CARRYING OUT THE PREFERRED EMBODIMENTS

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 2A:
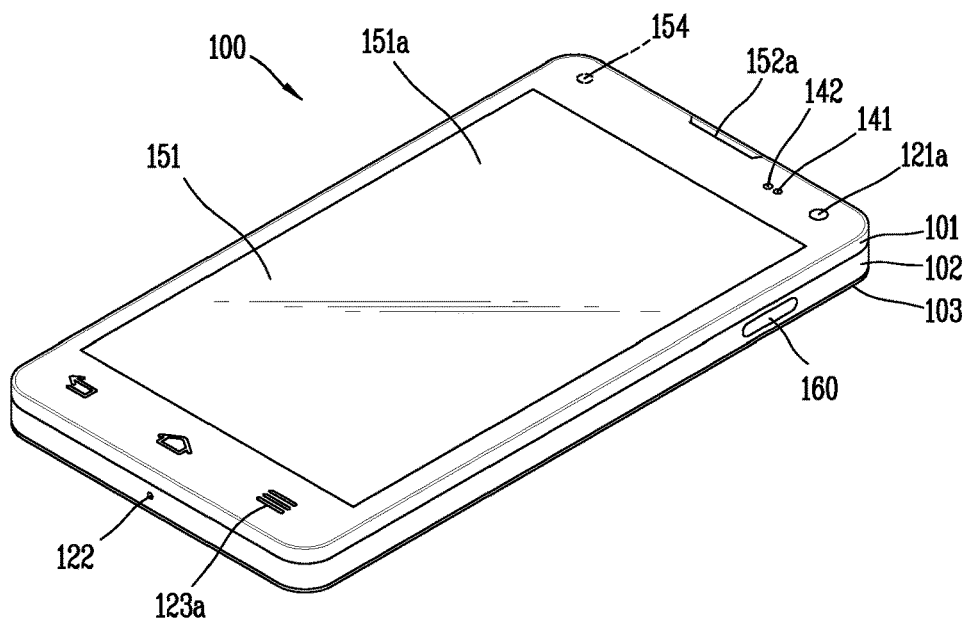
FIGS. 2A and 2B are views illustrating the configuration of a mobile terminal that can be employed as a communication medium device according to an embodiment of the present disclosure.
Figure 2B:
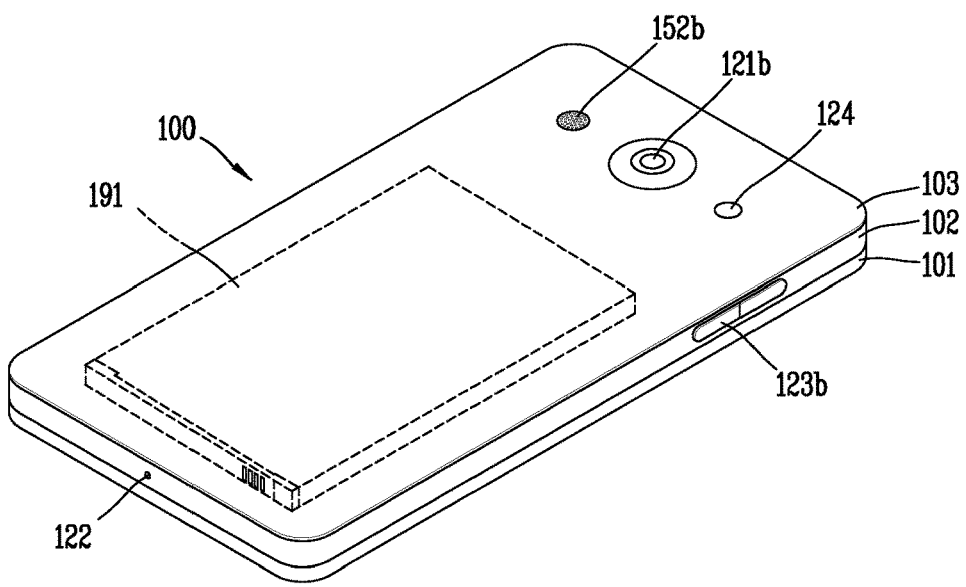

Referring to FIGS. 2A and 2B, FIGS. 2A and 2B are conceptual views of one example of a mobile terminal that can be communication medium device associated with the present disclosure is viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, command words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast signal may be encoded according to at least one of technical standards (or transmission methods, for example, DVB, ATSC, etc.) for transmission and reception of digital broadcast signals. The broadcast receiving module 111 may receive the digital broadcast signals using a method appropriate for a technical specification defined in the technical standards. Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. Broadcast signals and/or broadcast associated information received via the broadcast receiving module 111 may be stored in a suitable device, such as a memory 160.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

As described above, when touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operation state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

On the other hand, the camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program running on the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit may receive the 3D image and extract the left image and the right image, or may receive the 2D image and change it into a left image and a right image.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

On the other hand, as aforementioned, the controller 180 may typically control the general operations of the mobile terminal 100. For example, the controller 180 may set or release a lock state for restricting a user from inputting a control command with respect to applications when a status of the mobile terminal meets a preset condition.

Furthermore, the controller 180 may perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Referring to FIGS. 2A and 2B, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b. The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, as illustrated in FIGS. 2A and 2B, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program running on the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

As described above, the display unit 151 may form a touch screen together with the touch sensor. Here, the touch screen may serve as the user input unit 123 (see FIG. 1). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 2A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

On the other hand, a mobile terminal may extend to a wearable device which is wearable on a human body, going beyond usually using the mobile terminal by a user with grabbing it with a hand. Examples of the wearable device may include a smart watch, smart glasses, a head mounted display (HMD), and so on. Hereinafter, description will be given of examples of a mobile terminal extending to the wearable device.

A wearable device may exchange data with (or cooperate with) another mobile terminal 100. The short-range communication module 114 may sense (recognize) a wearable device, which is able to communicate with the mobile terminal 100, near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

Figure 3A:
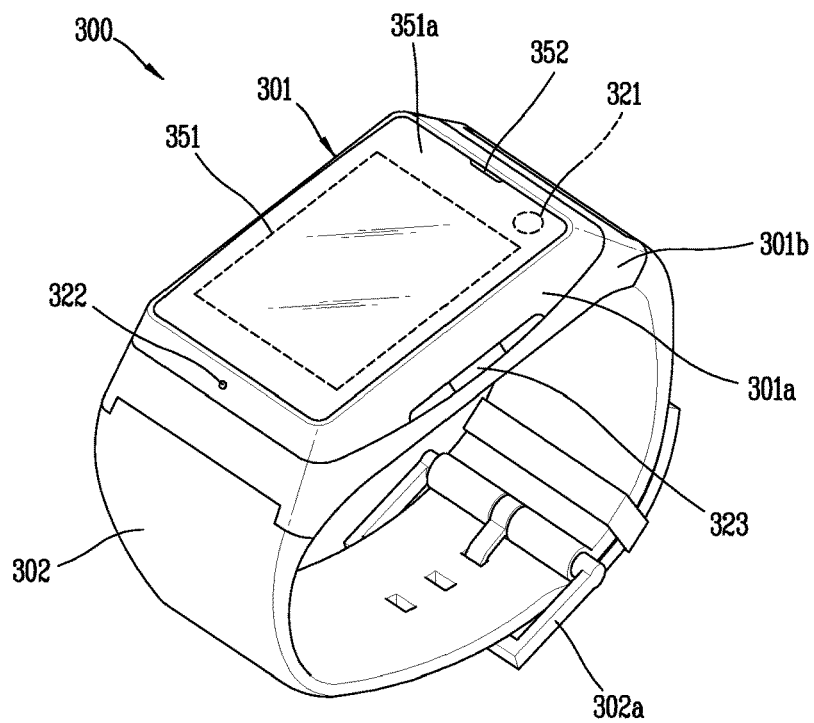
FIG. 3A is a perspective view illustrating an example of a watch-type mobile terminal 300 that can be employed as a communication medium device associated with another embodiment of the present disclosure.

FIG. 3A is a perspective view illustrating one example of a watch type mobile terminal 300 in accordance with another exemplary embodiment.

As illustrated in FIG. 3A, the watch type mobile terminal 300 may include a main body 301 with a display unit 351, and a band 302 connected to the main body 301 to be wearable on a wrist. Here, the display unit 351 may be provided in the main body 301, but the present disclosure may not be necessarily limited to this. In other words, the present disclosure may be implemented in a band type with no additional display unit 351. Meanwhile, the watch type mobile terminal 300 may include the features of the mobile terminal 100 in FIGS. 1, 2A and 2B or similar features thereof.

The main body 301 may include a case defining an appearance. As illustrated, the case may include a first case 301a and a second case 301b cooperatively defining an inner space for accommodating various electronic components. However, the present disclosure may not be limited to this. One case may be configured to define the inner space, thereby implementing a mobile terminal 300 with a unibody.

The watch type mobile terminal 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351a of the display unit 351 may be mounted onto the first case 301a to form a front surface of the terminal body together with the first case 301a.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

Figure 3B:
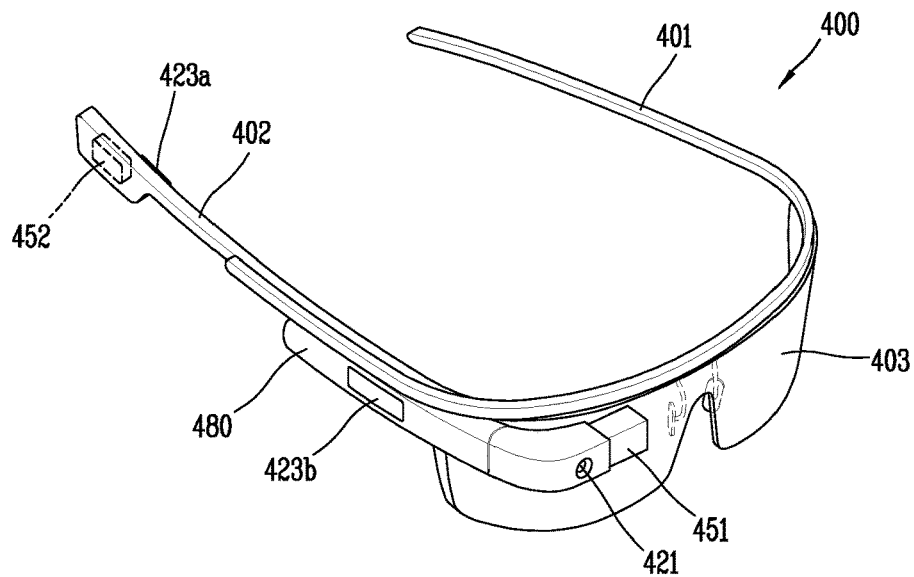
FIG. 3B is a perspective view illustrating an example of a glasses-type mobile terminal 400 that can be employed as a communication medium device associated with another embodiment of the present disclosure.

FIG. 3B is a perspective view illustrating one example of a glass type mobile terminal 400 in accordance with another exemplary embodiment.

The glass type mobile terminal 400 may be wearable on a head of a human body and provided with a frame part (case, housing, etc.) therefor. The frame part may be made of a flexible material to be easily worn. The drawing exemplarily illustrates that the frame part includes a first frame 401 and a second frame 402 which are made of different materials from each other. In general, the mobile terminal 400 may include the features of the mobile terminal 100 in FIGS. 1 through 2B or similar features thereof.

The frame part may be supported on the head and define a space for mounting various components. As illustrated, electronic components, such as a control module 480, an audio output module 452 and the like, may be mounted to the frame part. Also, a lens 403 for covering at least one of a left eye and a right eye may be detachably coupled to the frame part.

The control module 480 may control various electronic components disposed in the mobile terminal 400. The control module 480 may be understood as a component corresponding to the aforementioned controller 180. The drawing exemplarily illustrates that the control module 480 is installed in the frame part on one side of the head. However, the position of the control module 480 may not be limited to this.

The display unit 451 may be implemented into a type of head mounted display (HMD). The HMD type refers to a displaying method by which a display is mounted to a head so as to show an image directly in front of a user's eyes. In order to provide an image directly in front of the user's eyes when the user wears the glass type mobile terminal 400, the display unit 451 may be disposed to correspond to at least one of a left eye and a right eye. The drawing exemplarily illustrates that the display unit 451 is located on a portion corresponding to the right eye to output an image toward the user's right eye.

The display unit 451 may project an image into the user's eye using a prism. Also, the prism may be formed transparent such that the user can view both the projected image and a general visual field (a range that the user views through the eyes) in front of the user.

In such a manner, the image output through the display unit 451 may be viewed with overlapping the general visual field. The mobile terminal 400 may provide an augmented reality (AR) of showing a single image by overlaying a virtual image on a realistic image or background using the characteristic of the display.

The camera 421 may be disposed adjacent to at least one of the left eye and the right eye to capture an image in front thereof. Since the camera 421 is located adjacent to the eye, the camera 421 may acquire a scene that the user is viewing as an image.

The drawing exemplarily illustrates that the camera 421 is provided at the control module 480, but the present disclosure may not be limited to this. The camera 421 may be installed on the frame part or provided in plurality to acquire a stereoscopic image.

The glass type mobile terminal 400 may include user input units 423a and 423b manipulated by the user to input a control command. The user input units 423a and 423b may employ any method if it is a tactile manner allowing the user to perform manipulation with a tactile feeling such as touch, push, or the like. The drawing exemplarily illustrates that the user input units 423a and 423b operable in a pushing manner and a touching manner are disposed on the frame part and the control module 480, respectively.

Also, the glass type mobile terminal 400 may include a microphone (not shown) which processes input sound into electric audio data, and an audio output module 452 for outputting an audible sound. The audio output module 452 may be configured to transfer the audible sound in a general audio output manner or an osteoconductive manner. When the audio output module 452 is implemented in the osteoconductive manner, the audio output module 452 may be closely adhered onto the head when the user wears the mobile terminal 400 and vibrate the user's skull to transfer sounds.

Hereinafter, a communication system which is operable with the mobile terminal 100 according to the present disclosure will be described.

First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings apply equally to other system types including a CDMA wireless communication system.

A CDMA wireless communication system includes one or more mobile terminals 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

In addition, Global Positioning System (GPS) satellites for locating the position of the mobile terminal 100 may cooperate with the CDMA wireless communication system. Such satellites 300 facilitate locating the position of the mobile terminal 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

A location information module 115 of the mobile terminal is configured to acquire a position of the mobile terminal. Such location information module 115 may include a Global Position System (GPS) module and a Wireless Fidelity (Wi-Fi) module. According to circumstances, the location information module 115 may perform any function of other modules in the wireless communication unit 110 to substitutionally or additionally obtain data for the location of the mobile terminal.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module.

The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, SSID, RSSI, channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, etc. The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter.

Besides the above methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

As aforementioned with reference to FIG. 2A, a short-range communication technique, such as Bluetooth™, Radio Frequency Identification (RFID), Infrared Data Association (IrDA), Ultra Wideband (UWB), ZigBee and Near Field Communication (NFC), may be applicable to the mobile terminal according to the present invention.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The security module may be a physical medium such as UICC (Universal Integrated Circuit Card) (e.g., SIM (Subscriber Identification Module) or USIM (Universal SIM)), a secure micro SD and a sticker, or a logical medium (e.g., embedded SE (Secure Element)) embedded in the mobile terminal. SWP (Single Wire Protocol)-based data exchange may be performed between the NFC module and the security module.

In a case where the NFC module operates in a card mode, the mobile terminal may transmit card information on a general IC card to outside. More specifically, if a mobile terminal having therein card information on a payment card (e. g, a credit card or a bus card) is made to approach to a card reader, a short-range mobile payment may be executed. On the other hand, if a mobile terminal which stores card information on an entrance card is made to approach to an entrance card reader, an entrance approval procedure may start. A card such as a credit card, a traffic card and an entrance card may be mounted in the security module in the form of applet, and the security module may store card information on the card mounted therein. Card information of a payment card may be at least one of a card number, a remaining amount and a usage history. Card information of an entrance card may be at least one of a user's name, a user's number (e.g., undergraduate number or staff number) and an entrance history.

In a case where the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In a case where the NFC module operates in a Peer-to-Peer (P2P) mode, the mobile terminal may execute P2P communication with another mobile terminal. In this case, LLCP (Logical Link Control Protocol) may be applied to the P2P communication. For the P2P communication, connection may be generated between the mobile terminal and said another mobile terminal. The connection may be categorized into a connectionless mode which ends after one packet is switched, and a connection-oriented mode in which packets are switched consecutively. For the P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is short.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

As described above, in case where an arbitration device is used when a local network is configured, the network itself is broken when the arbitration device is excluded from the network, and unnecessary hop connection may occur when a new device is added to the network.

As a method for solving such a problem, a network may be configured using a communication medium device to ensure the efficiency and stability of the network, and thus a network using a communication medium device is proposed.

Figure 4:
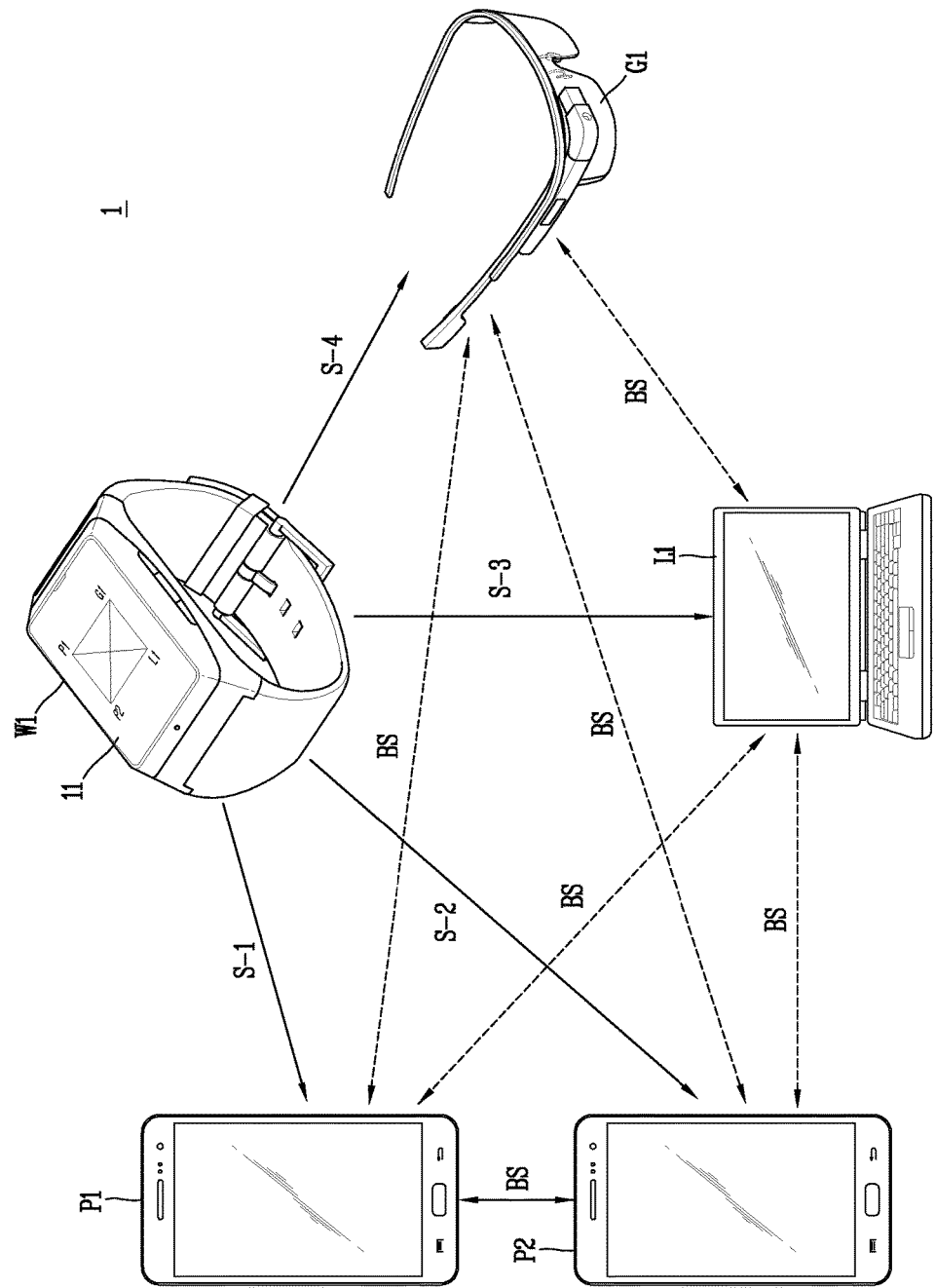
FIG. 4 is a schematic view illustrating a network system including a communication medium device to which the present disclosure is applied.

FIG. 4 is a schematic view illustrating a network system including a communication medium device to which the present disclosure is applied. According to FIG. 4, a network system 1 may include a smart watch (W1), a first and a second smart phone (P1, P2), a laptop L1, and smart glasses (G1).

Referring to FIG. 4, the smart watch (W1) is assumed to be a communication medium device. The smart watch (W1) may include a display unit 11. The smart watch (W1) may recognize each communication device (P1, P2, L1, G1). It may be assumed that the smart watch (W1) and each communication device (P1, P2, L1, G1) are not communicatively connected to each other. The display 11 of the smart watch (W1) may display only the communication devices (P1, P2, L1, G1) that are communicatively connected to the smart watch (W1). As a result, it may be possible to prevent passing through an unnecessary hop during communication connection.

The smart watch (W1) may give a command (S-1, S-1, S-3, S-4) to the communication devices (P1, P2, L1, G1) communicatively connected the smart watch (W1) to broadcast a specific signal (e.g., BLE Signal).

Specifically, when the network ID, device ID, device type information, and device type are the same, the smart watch (W1) may transmit priority information, effective connection period information, and connected other devices information to the devices (P1, P2, L1, G1) to be configured with a BAN (Body Area Network) network (S-1, S-2, S-3, S-4).

On the other hand, it is assumed that the smart watch (W1) recognizes the communication devices (P1, P2, L1, G1) communicatively connectable to the smart watch (W1). Each communication device (P1, P2, L1, G1) may broadcast (BS) a specific signal (e.g., BLE Signal) to adjacent communication devices. For instance, when the present disclosure is described around the first smart phone (P1), the first smart phone (P1) may transmit a specific signal to the second smart phone (P2), laptop (L1), smart glasses (G1), and smart watch (W1). Furthermore, the first smartphone (P1) may receive a specific signal from adjacent communication devices (P2, L1, G1). In this case, the first smart phone (P1) may perform communication with the adjacent devices (P2, L1, G1). In particular, the first smart phone (P1) may perform a pairing (e.g., BT pairing) with the adjacent devices (P2, L1, G1) to be communicatively connectable to the peripheral devices (P2, L1, G1).

The second smart phone (P2), laptop (L1) and smart glasses (G1) may also perform communication connection with adjacent devices in the same manner as the first smart phone (P1). Then, the adjacent devices (P1, P2, L1, G1) may use the smart watch (W1) as a mediator (intermediator) to enable communication connection. In this case, even when the smart watch (W1) leaves the network system 1 due to a failure of the network, the communication states of the adjacent devices (P1, P2, L1, G1) may be protected. The present disclosure may overcome a disruption of the network itself when a coordinator device is out of the network, which is a limitation of the prior art.

When the adjacent devices (P1, P2, L1, G1) are all connected, each of the adjacent devices (P1, P2, L1, G1) may transmit connection information indicating that which device is connected to each of the adjacent devices (P1, P2, L1, G1) to the smart watch (W1) which is a communication medium device. In this case, the smart watch (W1) as the communication medium device may display a connection state of the adjacent devices (P1, P2, L1, G1) on the display unit 11 as a UI screen. The connections between the adjacent devices (P1, P2, L1, G1) may be indicated by a line. Furthermore, when the adjacent devices (P1, P2, L1, G1) also have displays, the network connection state may be displayed on the relevant display as a UI screen.

On the other hand, although the smart watch W1 has been described as a communication medium device, the present disclosure may not be necessarily limited to this at the time of implementation, and any communicable device including a mobile terminal, a laptop, a PC, a wireless headset, and the like may be used without restriction. Furthermore, when a distance between the communication medium device and the adjacent communication device is short, it may be possible to perform communication with a direct communication method using NFC (Near Field Communication), BT (Bluetooth), WiFi-Direct or the like. The communication medium device and the adjacent communication device may be connected to each other using a hub or the like therebetween or connected through the Internet, a cloud, or the like.

Meanwhile, although it has been described in FIG. 4 that the communication medium device as the smart watch W1 does not form a network, the smart watch (W1) may also be used as a constituent device of the network at the time of implementation. In other words, the communication medium device may also be implemented to perform the role of a communication device.

On the other hand, prior to describing network control using the communication medium device illustrated in FIG.

4, communication connection between devices constituting a BAN (Body Area Network) will be described with reference to FIGS. 5 to 7.

Figure 5:
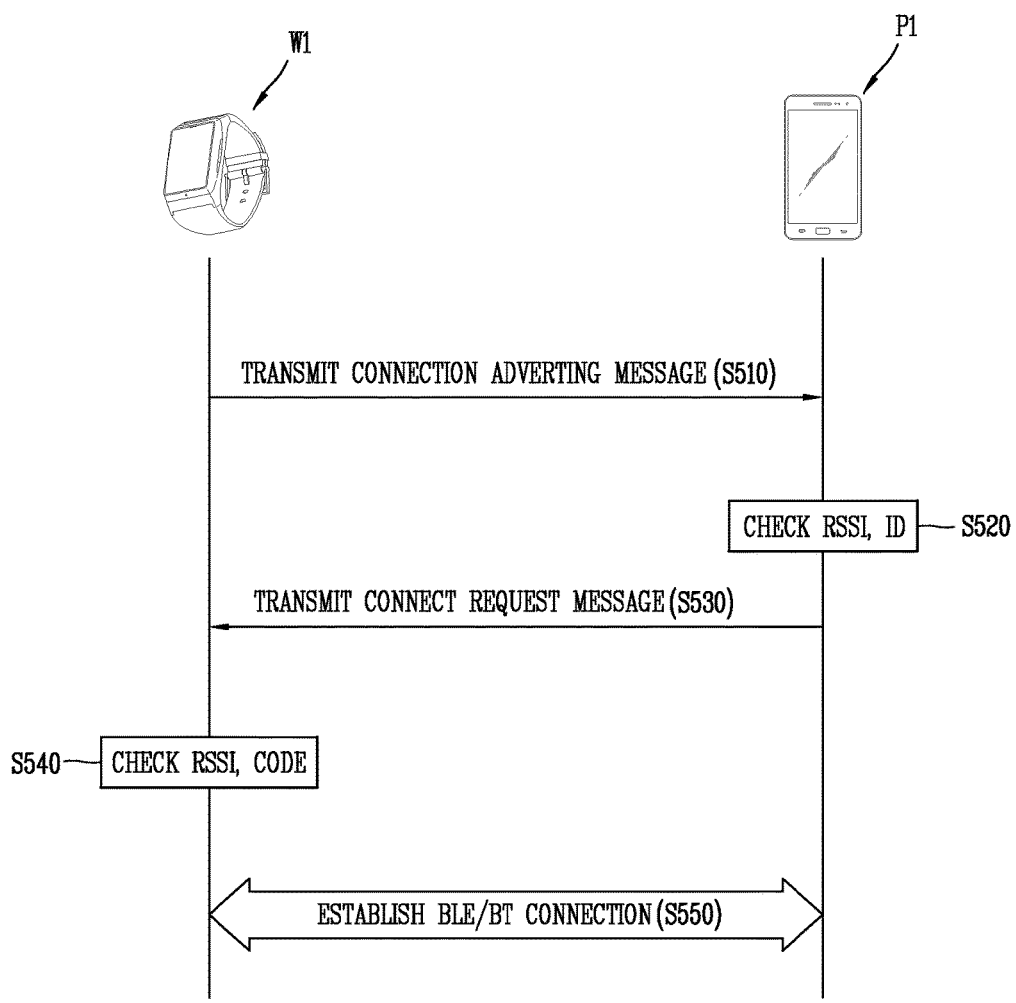
FIG. 5 is a view illustrating a process of establishing communication between devices on a one-to-one basis to facilitate the description of the present disclosure.

FIG. 5 is a view illustrating a process of establishing communication between devices on a one-to-one basis facilitate the description of the present disclosure.

According to FIG. 5, the smart watch (W1) may perform a communication connection with the first smart phone (P1). When the communication connection is started from the smart watch (W1), the smart watch (W1) may transmit a BAN ID of the smart watch (W1), a Connection Advertising message, a signal expired time, and a code (S510).

The BAN ID is an identifier indicating a specific BAN (Body Area Network). The Connection Advertising message may include a command for instructing the first smart phone (P1) to broadcast a specific signal. The signal expired time is a time at which a term that transmits a Connection Advertising message expires. The code is an identifier assigned for a period of one term. The first smart phone (P1) should transmit a message including an allocated code within one signal expired time to the smart watch (W1) to perform communication connection with the smart watch (W1). When a message including the code is not received from the first smart phone (P1) until one signal expired time ends, the smart watch (W1) may allocate a new signal expired time and code again to transmit them to adjacent devices.

Subsequent to the step 510, when the first smart phone (P1) receives a command for broadcasting a specific signal (e.g., BLE Signal) from the smart watch (W1), the first smart phone (P1) may search a field included in the received command (S520). For example, in case of a message that does not have a BAN ID, the first smart phone (P1) may filter and ignore the relevant message.

In addition, the first smart phone (P1) may check the received signal strength (RSSI), and when there is no device within a predetermined distance (e.g., 50 cm), a scan window may be opened to the maximum during one signal expired time to track the proximity of the counterpart device. Here, when the counterpart device is within a predetermined distance, a connection request may be transmitted to the counterpart device (S530). The connection request may transmit the checked signal strength (RSSI) and the code transmitted from the counterpart together. The first smart phone (P1) may transmit the Connection Request signal including the BAN ID to the smart watch (W1).

Next, when the smart watch (W1) receives the signal from the first smart phone P1, it may check the RSSI and the code (S540). The smart watch (W1) may compare the RSSI measured by the smart watch (W1) with the received RSSI to check whether the connection is valid by checking the code. If the connection is valid, then the smart watch (W1) performs communication connection with the first smart phone (P1) (S550).

Figure 6:
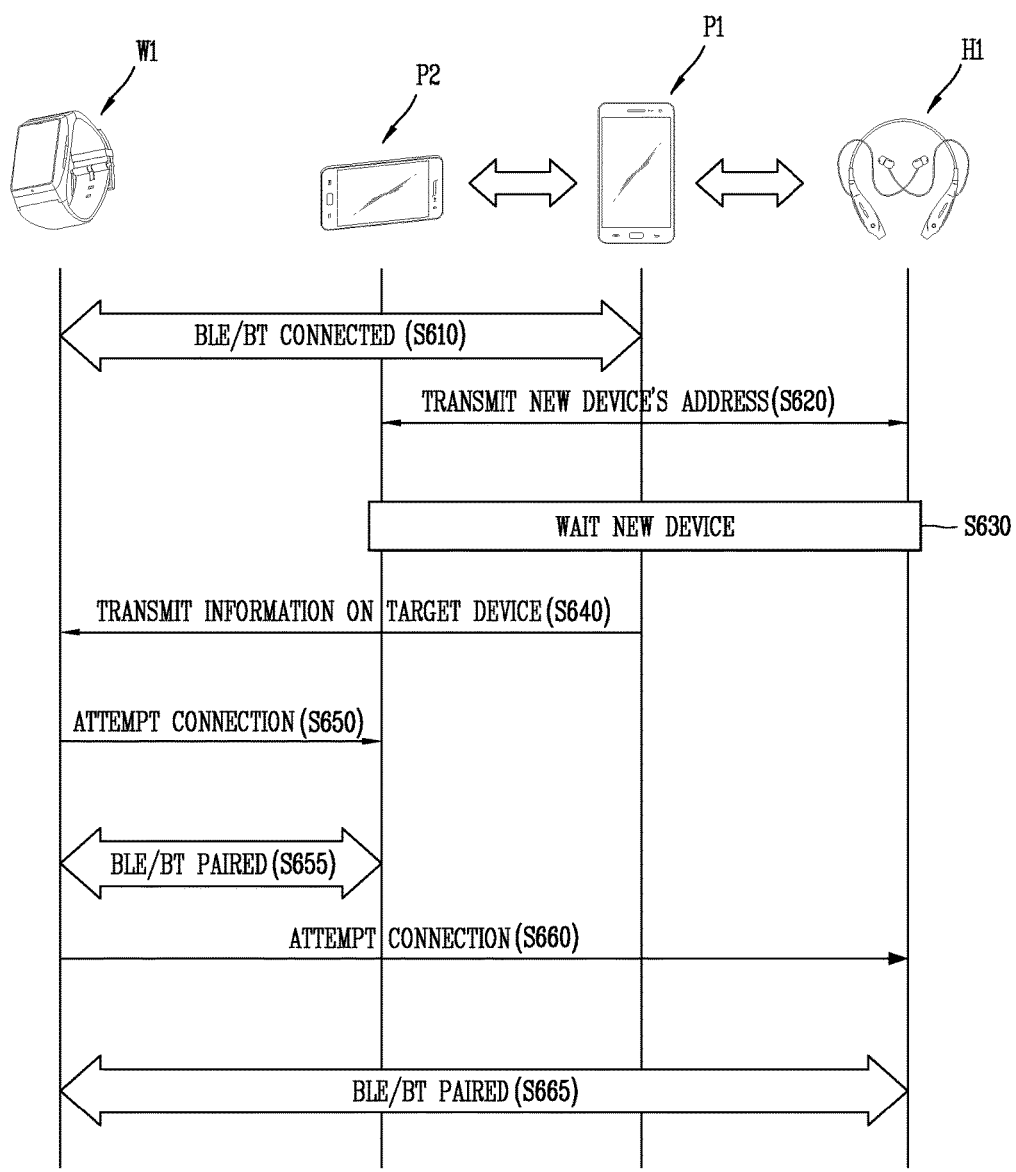
FIG. 6 is a view illustrating a process in which a new device is additionally connected in a state that a BAN network is formed to facilitate the description of the present disclosure.

FIG. 6 is a view illustrating a process in which a new device is additionally connected in a state that a BAN network is formed to facilitate the description of the present disclosure.

According to FIG. 6, the first smart phone (P1) may be configured with a second smart phone (P2) and a Bluetooth headset (H1) on a BAN network, and the smart watch (W1) may additionally be communicatively connected to the BAN network. The first smart phone (P1) may be a master device performing the role of mediation for the BAN network. Furthermore, the second smart phone (P2) connected to the first smart phone (P1) to constitute the BAN network and the Bluetooth headset (H1) may be a slave device of the BAN network.

First, the first smart phone (P1) may be communicatively connected to the smart watch (W1) (S610). For example, it may be connected to BLE/BT using Bluetooth (S610). The first smart phone (P1) transmits the address of the smart watch (W1) to the second smart phone (P2) and the Bluetooth headset (H1) which are already connected thereto (S620). At this time, the first smart phone (P1) may transmit a BAN ID, a Connection Waiting command, and a code at the same time. The BAN ID may be an identifier of a specific BAN network. In addition, the BAN ID may be employed in various ways if the BAN network can be uniquely identified. For example, it may be an ID on the BAN of the first smart phone (P1).

The Connection Waiting command is a command for instructing the existing device (P2, H1) to wait for a communication connection with the first smart phone (P1). Furthermore, the first smart phone (P1) may generate a code for connection arbitration and transmit it to the existing devices (P2, H1). Next, the existing devices (P2, H1) constituting the BAN change their state to a Listen State to prepare for connection with a new device (S630). When a new device transmits a connection request to the existing devices (P2, H1), communication connection may be carried out according to the request. The existing devices (P2, H1) may filter operations except connection request.

Then, the first smart phone (P1) provides information to the smart phone W1 to connect with the existing devices (P2, H1) (S640). The relevant information may include a BAN ID, a connection command, an address of a target device, and a code. The first smart phone (P1) may assist the connection of the slave devices (P2, H1) with the new device (W1). Accordingly, when connection between the existing device (P2) and the new device (W1) is completed, the connection between the existing device (P2, H1) and the new device (W1) is maintained even if the first smart phone (P1) leaves the BAN. Accordingly, it may be possible to enhance network stability, and enhance security, device efficiency, user convenience, and the like without passing through an unnecessary hop.

On the other hand, the BAN ID is a command for making a connection, and the address of the target device is device information including the existing device address for allowing the smart watch (W1) to perform communication connection. The code corresponds to an identifier for the above communication connection.

Next, the smart watch (W1) attempts to establish communication connection with the second smart phone (P2) and the Bluetooth headset (H1) (S650, S660). The connection attempt may be repeatedly carried out, and the existing devices (P2, H1) that have received the connection request may perform a validity check by comparing the codes. When there is no problem, the smart watch (W1) performs connection with the existing devices (P2, H1) (S655, S665). At this time, if the smart watch (W1) is connected to the existing devices (P2, H1), all other links except the connection with the master device (P1) may be released. Furthermore, fast reconnection may be also possible based on the existing link information under the arbitration of the master device (P1). Of course, the smart watch (W1) may also release connection with the master device (P1).

Figure 7:
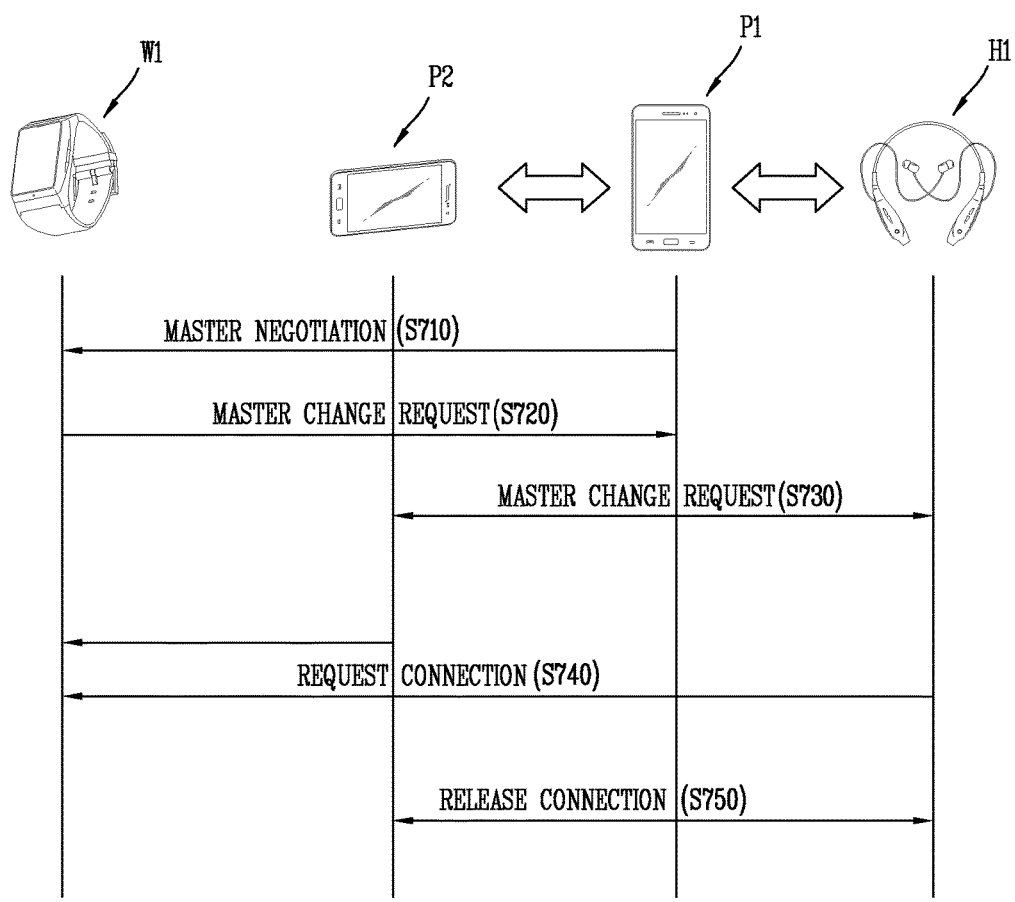
FIG. 7 is a view illustrating a process of changing a master device in the BAN network in order to facilitate the description of the present disclosure.

FIG. 7 is a view illustrating a process of changing a master device in the BAN network to facilitate the description of the present disclosure.

According to FIG. 7, a current master device is the first smart phone (P1). However, the smart watch (W1) may be changed to a master device. Furthermore, the smart watch (W1) may be a master device even in the same position as a slave device (e.g., P2, H1) of the BAN. The first smart phone (P1) may perform master negotiation with the smart watch (W1). The first smart phone (P1) may transmit information such as a BAN ID, a master negotiation command, and a master priority to the smart watch (W1) (S710).

The master negotiation command may be a command for perform communication to change the master device. A system may set a different master priority for each device. For example, the system may give a higher master priority to a wearable device. The system may set the master priority of the device in various ways. If the master priority of the smart watch (W1) is higher, it may be changed to a master device.

If the master priority of the smart watch (W1) is higher, then a master change may be requested to the first smart phone (P1) (S720). At this time, the BAN ID and the master priority of the smart watch (W1) may be transmitted together.

The first smart phone (P1) may respond to the master change request. A master change command is transmitted to the second smart phone (P2) and the Bluetooth headset (H1) which are slave devices (S730). The first smart phone (P1) transmits the address of the smart watch (W1) at the same time. The master change command corresponds to a command indicating that the master device is changed. Then, the slave devices (P2, H1) attempt to establish a communication connection with the smart watch (W1) (S740). Then, the smart watch (W1) performs connection with the slave devices (P2, H1) (S750).

Figure 8:
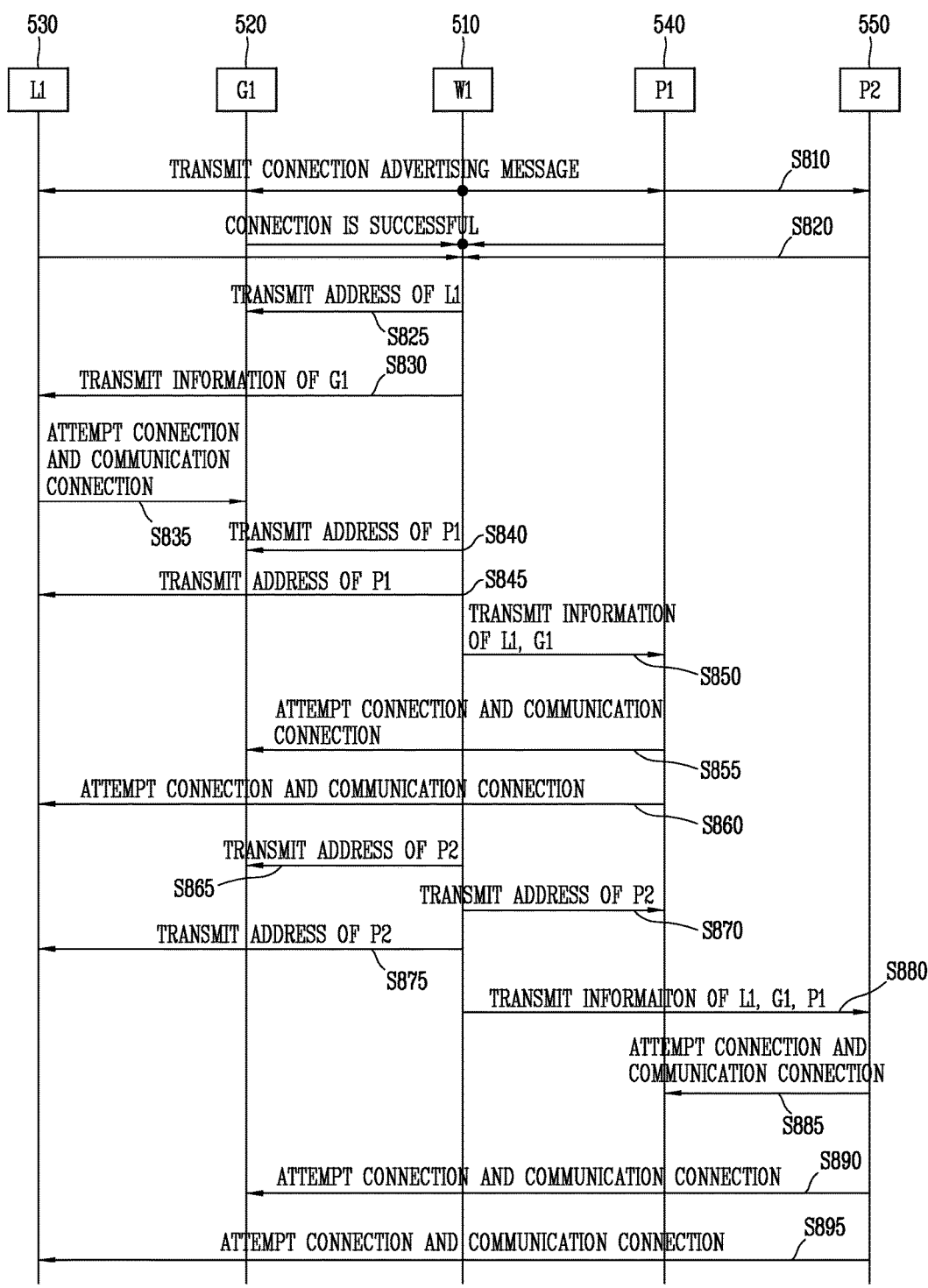
FIG. 8 is a sequence diagram illustrating a detailed network control operation of the BAN network system illustrated in FIG. 4.

FIG. 8 is a sequence view illustrating a specific network control operation of the BAN network system illustrated in FIG. 4.

According to FIG. 8, a device included in the BAN network may include a smart watch (W1) 510 as a master device, smart glasses (G1) 520 as a slave device, laptops (L) 530, a first smart phone (P1), a second smart phone (P2). The smart watch (W1) may be communicatively connected to the slave devices (G1, L1, P1, P2) according to the method illustrated in FIGS. 5 and 6.

As illustrated in FIG. 5, the smart watch (W1) may perform communication connection with each of the slave devices (G1, L1, P1, P2). The smart watch (W1) may continuously communicate with the slave devices using the method of FIG. 6, which performs communication with one of the slave devices and then adds another slave device.

For now, the smart watch (W1) may perform communication with the slave devices (G1, L1, P1, P2) as illustrated in FIG. 5. Specifically, the smart watch (W1) may transmit a BAN (Body Area Network) ID, a Connection Advertising message, a signal expired time, and a code to the slave devices (G1, L1, P1, P2). The BAN ID is an identifier of a specific BAN (Body Area Network). The Connection Advertising message may include a command for allowing the slave devices (G1, L1, P1, P2) to broadcast a specific signal. The signal expired time is a time at which a term that transmits a Connection Advertising message expires. If communication connection is not established within one term, the smart watch (W1) may attempt to establish communication connection with the slave devices (G1, L1, P1, P2) again with a new signal expired time. The code corresponds to a specific signal expired time, and the code is an identifier assigned for a period of one term. When a message including the code is not received from adjacent devices until one signal expired time ends, the smart watch (W1) may allocate a new signal expired time and code again to transmit them to the adjacent devices.

When the slave devices (G1, L1, P1, P2) receive a command for broadcasting a specific signal (e.g., BLE Signal) from the smart watch (W1), the slave devices (G1, L1, P1, P2) search a field included in the received command. For example, if there is no BAN ID, the slave devices (G1, L1, P1, P2) may filter and ignore the message.

The slave devices (G1, L1, P1, P2) check the received signal strength (RSSI) and open the scan window to the maximum for the signal expired time when there is no device within a predetermined distance (e.g., 50 cm) to track whether or not the counterpart device that has transmitted the RSSI is in close proximity. At this time, if the counterpart device is within a predetermined distance, then the Connection Request may be transmitted to the counterpart device. The Connection Request may transmit the checked signal strength (RSSI) and the code transmitted from the counterpart together.

In the above-described manner, the smart watch (W1) may be communicatively connected to the slave devices (G1, L1, P1, P2), respectively. Here, it is illustrated a process in which the slave devices (G1, L1, P1, P2) except the smart watch (W1) are communicatively connected to each other. It will be described by assuming that the smart watch (W1) is first connected to the smart glasses (G1). Of course, the smart watch (W1) may set connection priorities to be connected to a device having a high connection priority.

The smart watch (W1) transmits the address information of the L1 530 to be communicatively connected to the smart glasses (G1) 520 which is already connected to the communication (S825). At this time, the smart watch (W1) may transmit a BAN ID, a Connection Waiting command and a code together. The Connection Waiting command is a command for instructing the existing device (G1) 520 to wait for communication connection with the laptop (L1). Furthermore, the smart watch (W1) may generate a code for connection arbitration to transmit it to the existing device (G1). Existing devices (G1) 520 changes its state to a Listen State.

Next, the smart watch (W1) provides information to the laptop (L1) 530 to allow the smart watch (W1) to be connected to the existing device (G1) (S830). The information may include a BAN ID, a connection command, an address of a target device, and a code. The BAN ID is an ID of the BAN network, the connection command is a command for making a connection, and the address of the target device including device the existing device address is device information for allowing the smart watch (W1) to perform communication connection, and the smart watch (W1). The code corresponds to an identifier for the communication connection.

Then, the laptop (L1) performs a connection attempt and communication connection to the existing device (G1) (S835). The connection attempt may be repeatedly carried out, and the existing device (G1) that has received the connection request may perform a validity check by comparing the codes. When there is no problem, the laptop (L1) performs connection with the existing device (G1).

At this time, when the laptop (L1) is connected to the existing device (G1), all other links except the connection with the master device (W1) may be released. Furthermore, fast reconnection may be possible based on the existing link information under the arbitration of the master device (W1). In this manner, new devices (P1, P2) may also be incorporated into the BAN network. The detailed description is similar to the foregoing description, and will be omitted.

On the other hand, it may be assumed that the communication medium device (W1) recognizes the identification information of adjacent communication devices (P1, P2, L1, G1) prior to performing communication medium. The identification information of the adjacent communication devices (P1, P2, L1, G1) may be configured in various ways. For example, when the communication medium device (W1) and the adjacent communication devices (P1, P2, L1, G1) are connected to the Internet, a cloud, or the like, the communication medium device (W1) may recognize the identification information of the adjacent communication devices (P1, P2, L1, G1). Furthermore, when the communication medium device is a mobile terminal such as a wearable communication device or a glass type communication device, and the adjacent communication devices (P1, P2, L1, G1) are configured with smart phones (P1, P2), the smart watch (W1) may recognize the smart phone numbers of the adjacent communication device (P1, P2, L1, G1). In this case, the communication medium device (W1) may deliver a message to the adjacent communication devices (P1, P2, L1, G1) through an SMS or the like. Furthermore, when the communication medium device and the adjacent communication devices (P1, P2, L1, G1) are connected by an access point (AP), they may communicate with each other through the AP. In addition to the above-described method, it is assumed that the communication medium device (W1) recognizes the identification information of the adjacent communication devices (P1, P2, L1, G1) prior to communication medium.

Although communication is not completely impossible even if the communication medium device (W1) does not know the identification information of the adjacent communication devices (P1, P2, L1, G1) (e.g., when the communication medium device recognizes the identification information of other communication devices connected to the adjacent communication devices), in consideration of the purpose, effect, and the like of the present disclosure, it will be described with a case where the smart watch (W1) recognizes the identification information of the adjacent communication devices (P1, P2, L1, G1).

On the other hand, the adjacent communication devices (P1, P2, L1, G1) may be configured with a singular number, but a case where a plurality of communication devices are connected using the communication medium device (W1) will be mainly described.

The communication medium device (W1) may transmit a command signal to the adjacent communication devices to broadcast a specific signal to the adjacent communication devices (P1, P2, L1, G1). The command signal transmitted by the communication medium device (W1) to the adjacent communication devices (P1, P2, L1, G1) may be a signal including the content of "broadcasting a specific signal". The relevant command signal may be transmitted through an SMS, a Push Message, or the like using a mobile communication network, and when the message is transmitted via the Internet or a cloud, the command message may be transmitted using various methods such as a Push Message and an Instant Messenger (IM). Bluetooth, Radio Frequency Identification (RFID), Infrared Data Association (IrDA), Ultra Wideband (UWB), ZigBee, Near Field Communication (NFC), Wireless Universal Serial Bus (Wireless USB) may also be used.

On the other hand, when the communication medium device is selected, proximity to the user may be considered to enhance the convenience of the user. For example, a communication medium device may be selected in the order of a smart watch, a glass-type mobile terminal, a Bluetooth headset, a smart phone, and the like. However, this is merely an embodiment, and at the time of implementation, the communication medium device may be selected in various selection methods. Furthermore, although the smart watch 100 has been described as an example of the communication mediating device, this is merely an example and may be used without any limitation as long as it is a communication device having a display unit and a communication module. On the other hand, in case of a communication device having only a communication module, it is possible to display communication devices communicatively connected thereto with another method including an acoustic method or the like without visually displaying the communication device.

The adjacent communication devices (P1, P2, L1, G1) may transmit a specific signal around. The specific signal is a signal that can be transmitted by each of the adjacent communication devices (P1, P2, L1, G1), and may include various fields. For example, the adjacent communication devices (P1, P2, L1, G1) may transmit a specific signal including fields suitable for various communication modules for communication connection between the adjacent communication devices (P1, P2, L1, G1). It is possible to transmit and receive a specific signal including an appropriate field suitable for the communication specification from the identification information of each of the adjacent communication devices (P1, P2, L1, G1). Here, in particular, each of the adjacent communication devices (P1, P2, L1, G1) may transmit a specific signal including its own COD (Class Of Device). The COD may be an identification field indicating the type of the adjacent communication devices (P1, P2, L1, G1).

On the other hand, when the adjacent communication devices (P1, P2, L1, G1) transmit a specific signal, they may be driven with low power. For example, when communication is carried out using the Bluetooth module between the adjacent communication devices (P1, P2, L1, G1), Bluetooth Low Energy (BLE) may be used when transmitting a specific signal between the adjacent communication devices (P1, P2, L1, G1). In this case, when the adjacent communication devices (P1, P2, L1, G1) transmit a specific signal, the specific signal may be transmitted and received at low power.

Meanwhile, it may be seen that communication is connected between the adjacent communication devices (P1, P2, L1, G1) using Bluetooth. All of the adjacent communication devices (P1, P2, L1, G1) may mount the Bluetooth modules, and the adjacent communication devices (P1, P2, L1, G1) that have received a command for connecting Bluetooth communication (attempting Bluetooth pairing) may attempt Bluetooth pairing between the adjacent communication devices (P1, P2, L1, G1). When all of the adjacent communication devices (P1, P2, L1, G1) may transmit communication connection state information on which communication devices are connected thereto to the communication medium device (W1). The communication connection state information may confirm a connection relationship and state of each communication device (P1, P2, L1, G1). For example, the communication connection state information may include device identification information connected to each communication device (P1, P2, L1, G1), and thus include information such as a MAC address, an SSID (Service Set IDentification), a RSSI (Received Signal Strength Indicator), RSRP (Reference Signal Received Power), RSRQ (Reference Signal Received Quality), channel information, Privacy, Network Type, Signal Strength, and Noise Strength. In addition, the device identification information may include connection information, COD information, distance information of each communication device (P1, P2, L1, G1) according to each communication specification, and the like.

Although it has been described that the communication medium device (W1) receives communication connection information from each of the adjacent communication devices (P1, P2, L1, G1), this is merely an embodiment, and a specific communication device among the adjacent communication may collect the communication connection information of each communication device to transmit it to the gas accommodation portion (S1), and also, the communication medium device (W1) may request communication connection information to each adjacent communication device to receive the communication connection information.

On the other hand, displaying a communication connection state means that the communication connection information of the adjacent communication devices (P1, P2, L1, G1) is displayed through the display unit 11 on a communication connection relationship with the adjacent communication devices (P1, P2, L1, G1). Furthermore, if the communication medium device does not have the display unit 11, then it may provide a communication connection state with voice. For example, when a Bluetooth headset becomes a communication medium device, a communication connection state between the adjacent communication devices (P1, P2, L1, G1) may be to the user with voice. In this case, the adjacent communication devices (P1, P2, L1, G1) may directly provide voice information on the communication connection state to the Bluetooth headset or the Bluetooth headset itself may have a module for converting communication connection information received from the adjacent communication devices (P1, P2, L1, G1) into voice. On the other hand, a control method of the foregoing communication medium device may be carried out automatically. However, a command for transmitting the command signal may be triggered by a user's input.

Figure 9A:
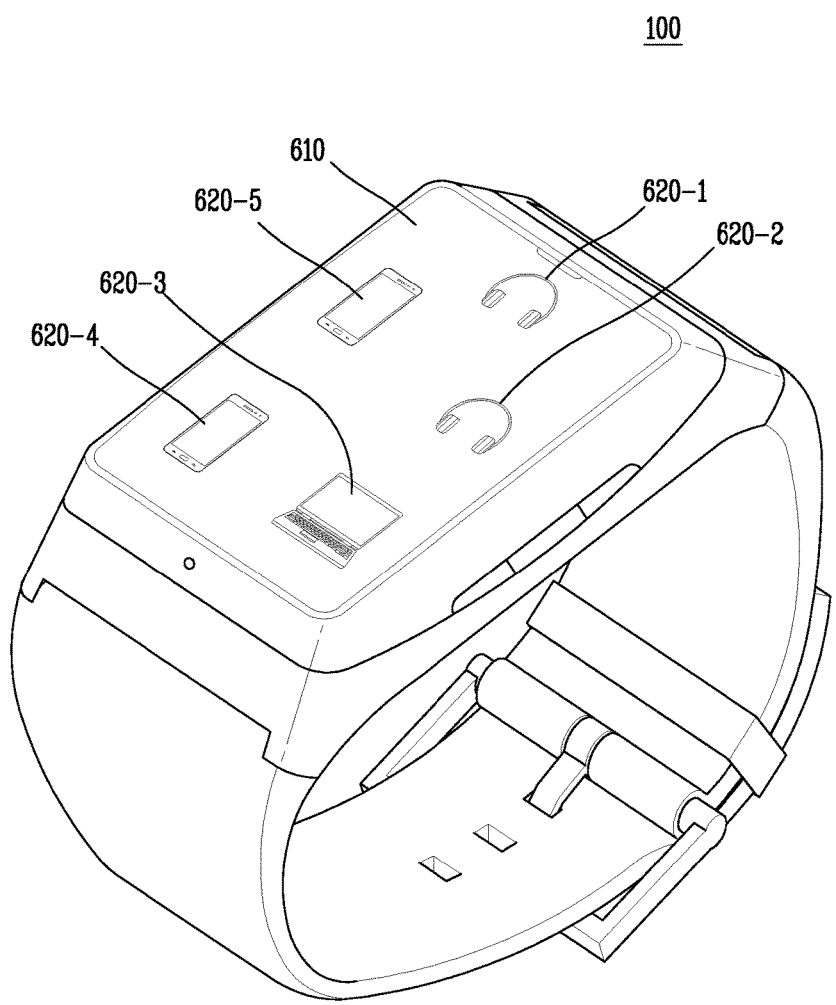
FIGS. 9A and 9B are views illustrating a UI screen for displaying a communication connection state when a smart watch according to an embodiment of the present disclosure is employed as a communication medium device.
Figure 9B:
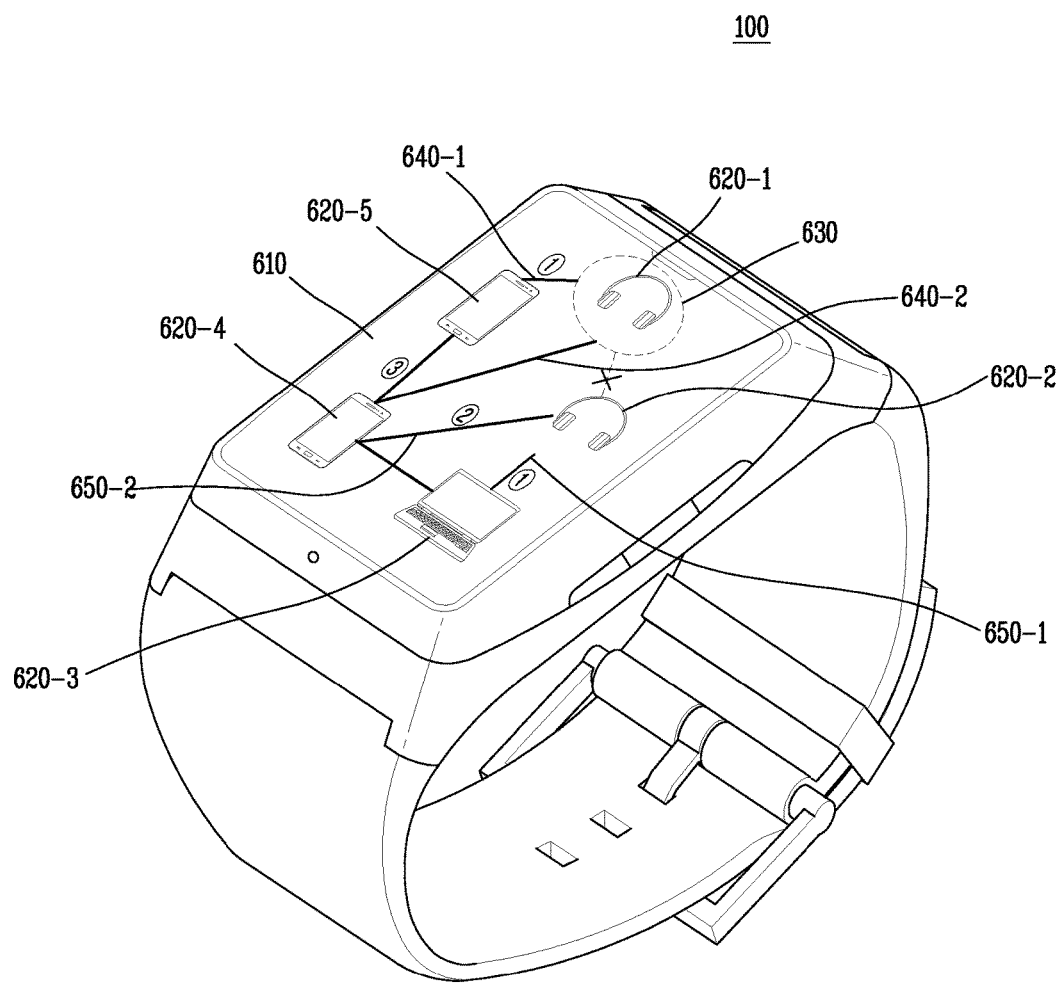

FIGS. 9A and 9B are views illustrating a UI screen for displaying a communication connection state when a smart watch according to an embodiment of the present disclosure is employed as a communication medium device.

According to FIG. 9A, the communication medium device 100 may be a smart watch having a display unit 610. FIG. The smart watch 100 may display at least one communicatively connectable communication device on the UI screen. The smart watch 100 may recognize communicatively connectable communication device information. For example, the smart watch 100 may recognize information capable of identifying each communication device including a phone number, an IP, an Email Address, a MAC address, and the like. The smart watch 100 may perform the role of mediating communication connection between communicatively connectable communication devices.

In addition, the smart watch 100 may display a communicatively connectable communication device on the display unit 610. For example, the smart watch 100 may display a first headset 620-1, a second headset 620-2, a PC 620-3, a first smart phone 620-4 and a second smart phone 620-5. The smart watch 100 may arbitrate the connection of the communicatively connectable communication devices 620-1 through 620-5 that can automatically communicate with each other. In addition, the smart watch 100 may arbitrate the connection of the communicatively connectable communication devices 620-1 through 620-5 by a user event including a user's input or the like. The process of allowing the smart watch 100 to arbitrate the connection of the communication devices 620-1 through 620-5 will be described below.

According to FIG. 9B, the smart watch 100 may display a communication connection state between adjacent communication devices.

Specifically, the first Bluetooth headset 620-1 is connected to the first smart phone 620-5 and second smart phone 620-4. The smart watch 100 transmits a command signal for broadcasting a BLE signal to adjacent communication devices 620-1 through 620-5, and accordingly, each communication device 620-1 through 620-5 broadcast the BLE signal. For example, the first Bluetooth headset 620-1 may be connected to (paired with) the first smart phone 620-5 and second smart phone 620-4 via Bluetooth.

At this time, it is possible to set a connection restriction to each communication device. When a communication connection state between the communication devices 620-1, 620-2 is in a communication disabled state, the communication medium device 100 may receive the communication disabled state information from the communication devices. At this time, the communication medium device 100 may display the states of the communication devices 620-1, 620-2 in the communication disabled state. For example, the first Bluetooth headset 620-1 may not be Bluetooth-paired with the second Bluetooth headset 620-2 performing the same function. Each device may broad cast the BLE signal including a Class of Device (COD) information field, and thus communication connection may be restricted between communication devices having the same specific COD. In this case, the communication medium device 100 may display a message indicating that communication connection between devices is restricted on the UI screen or output a message indicating that the communication connection is restricted with voice.

Meanwhile, when a communication connection priority is set for at least one of the communication devices 620-1, 620-2, the communication medium device 100 may receive connection priority information and communication device information connected to a communication device for which the communication priority is set from the communication device for which the communication priority is set.

For example, the first Bluetooth headset 620-1 is connected to the first smart phone 620-5 and the second smart phone 620-4, and is not connected to the PC. Here, the first Bluetooth headset 620-1 may establish a communication connection priority to be connected to a communication device. For example, when the communication connection priorities of the first Bluetooth headset 620-1 are a smart phone and a PC, the connection may be first established with the smart phone.

Furthermore, the second Bluetooth headset 620-2 may not be connected to the first Bluetooth headset 620-1, but perform first connection with the PC, and perform second connection with the second smart phone 620-4 Can be performed. The priorities may be configured differently depending on the setting of each communication device. The communication medium device 100 may display the connection state of the communication device connected to the communication device for which the connection priority is set on the display unit 610 of the smart watch (W1).

Meanwhile, the communication medium device 100 may be used as a communication device. For example, the smart watch (W1) may transmit a command signal to the smart watch (W1) itself. In this case, the communication medium device that has received the command signal may broadcast the specific signal. The communication medium device 100 may receive communication connection state information between the communication medium device that has received the broadcast specific signal and the communication device from the communication medium device and communication device to display a communication connection state between the communication medium device and the communication device.

On the other hand, the communication medium device 100 may receive the actual distance information of the communication device to display the received communication connection state between the communication medium device and communication device based on the actual distance information. The actual distance information may be included in communication connection state information between the devices. It is possible to measure an accurate position of each communication device may be measured by the above-described GPS module, trigonometry, and the like to reflect a distance to the communication medium device 100 and display it through the communication medium device.

An initial communicatively connectable communication device may be displayed on the UI screen. In this case, a communication connection state between the communication devices may be displayed on the UI screen. However, in a case where a communication medium device is not provided with a display unit but provided with a audio output unit, at least one communicatively connectable communication device information may be output through the audio output unit. In addition, a communication connection state between the communication devices may be output through the audio output unit.

Meanwhile, a communication medium device according to an embodiment of the present disclosure may include a wireless communication unit configured to transmit a command signal to each of communication devices so as to allow at least one communicatively connectable communication device to broadcast a specific signal, and a controller configured to control the communication device that has received the command signal to broadcast a specific signal and receive communication connection state information between the communication devices that have received broadcast specific signal from the communication device through the wireless communication unit, and control a communication connection state between the communication devices to be displayed based on the received communication connection state information. The detailed configuration and control principle thereof have been described, and thus will be omitted.

Furthermore, when at least one communication connection state between the communication devices is in a communication disabled state, the controller 180 may control the communication disabled state to be received from the communication device and display a communication connection state of the communication device in the communication disabled state.

Furthermore, when a communication connection priority is set for at least one of the communication devices, the controller 180 may control the communication connection priority information and communication device information connected to a communication device for which the communication connection priority set to be received from the communication device for which the communication connection priority set, and control a connection state of the communication device connected to the communication device for which the communication connection priority set to be displayed.

Here, the wireless communication unit may transmit the command signal to the communication medium device, and the controller 180 may control the communication medium device that has received the command signal to broadcast a specific signal, and communication connection state information between the communication medium device that has received the broadcast specific signal and the communication device to be received from the communication medium and the communication device, and control a communication connection state between the communication medium device and the communication device to be displayed based on the received communication connection state information.

In addition, the controller 180 may control the distance information of the communication device to be included in communication connection state information between the communication devices that have received the broadcast specific signal, and control distance information between the communication devices to be displayed based on the received communication connection state information.

The communication medium device 100 may further include a display unit configured to display at least one communicatively connectable communication device on a UI screen, and the controller 180 may control the display unit to display a communication connection state between the communication devices on the UI screen. In addition, the communication medium device may further include an audio output unit configured to output at least one communicatively connectable communication device information, and the controller 180 may output the communication connection state between the communication devices through the audio output unit.

Figure 10A:
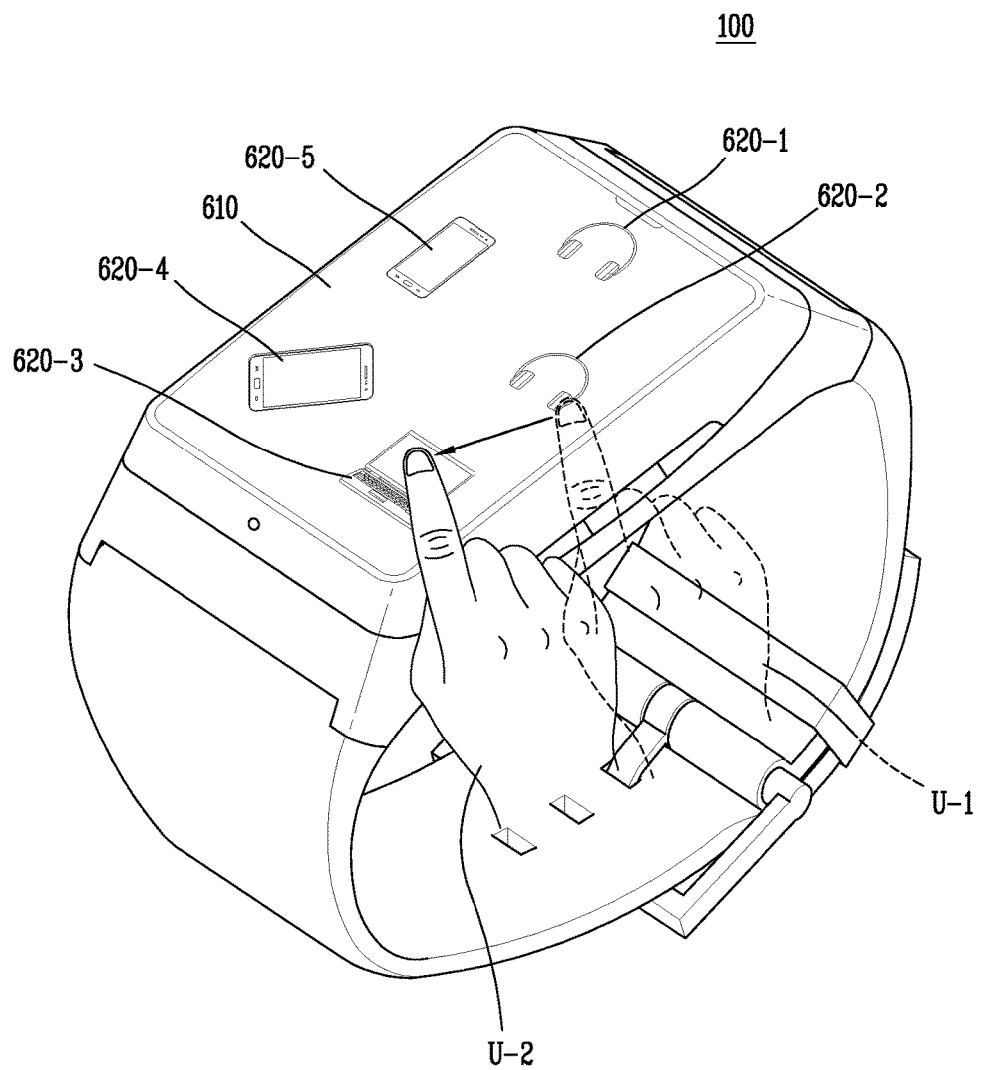
FIGS. 10A through 10D are views illustrating a method of controlling a communication device through a user input according to an embodiment of the present disclosure.
Figure 10B:
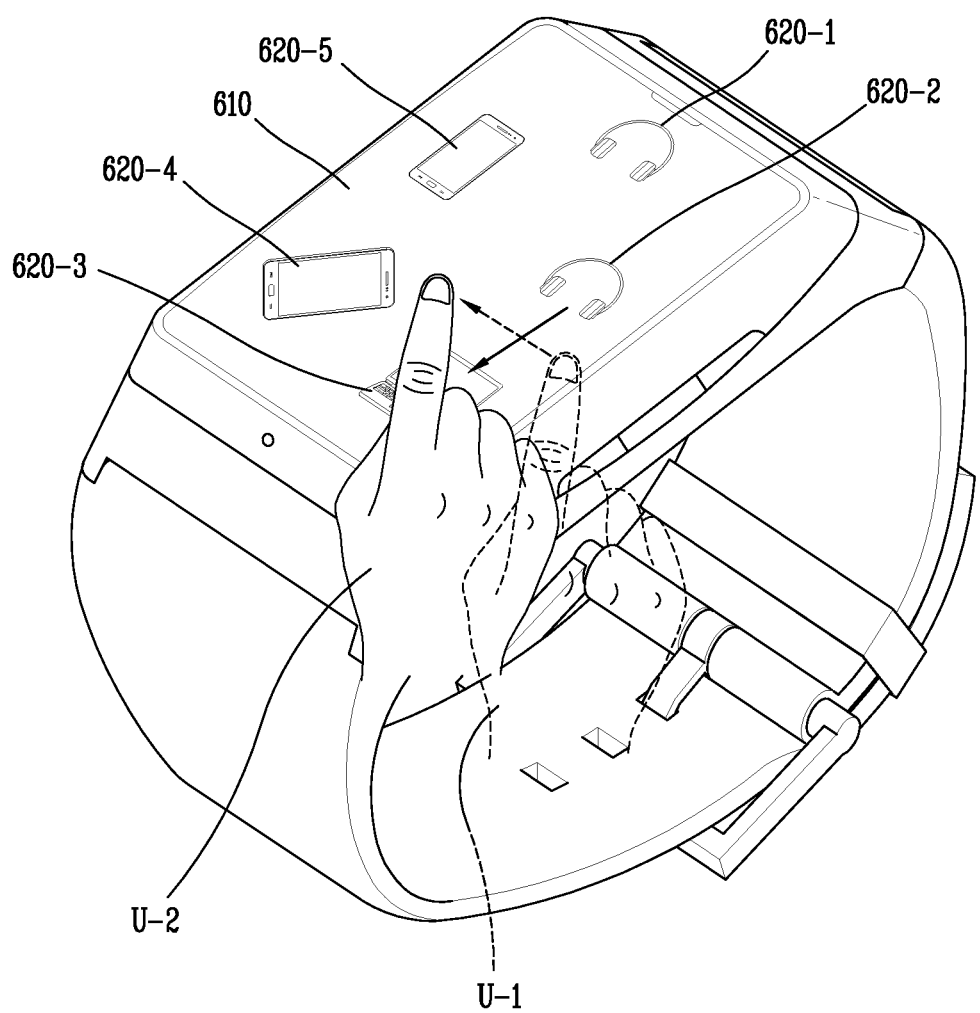
Figure 10C:
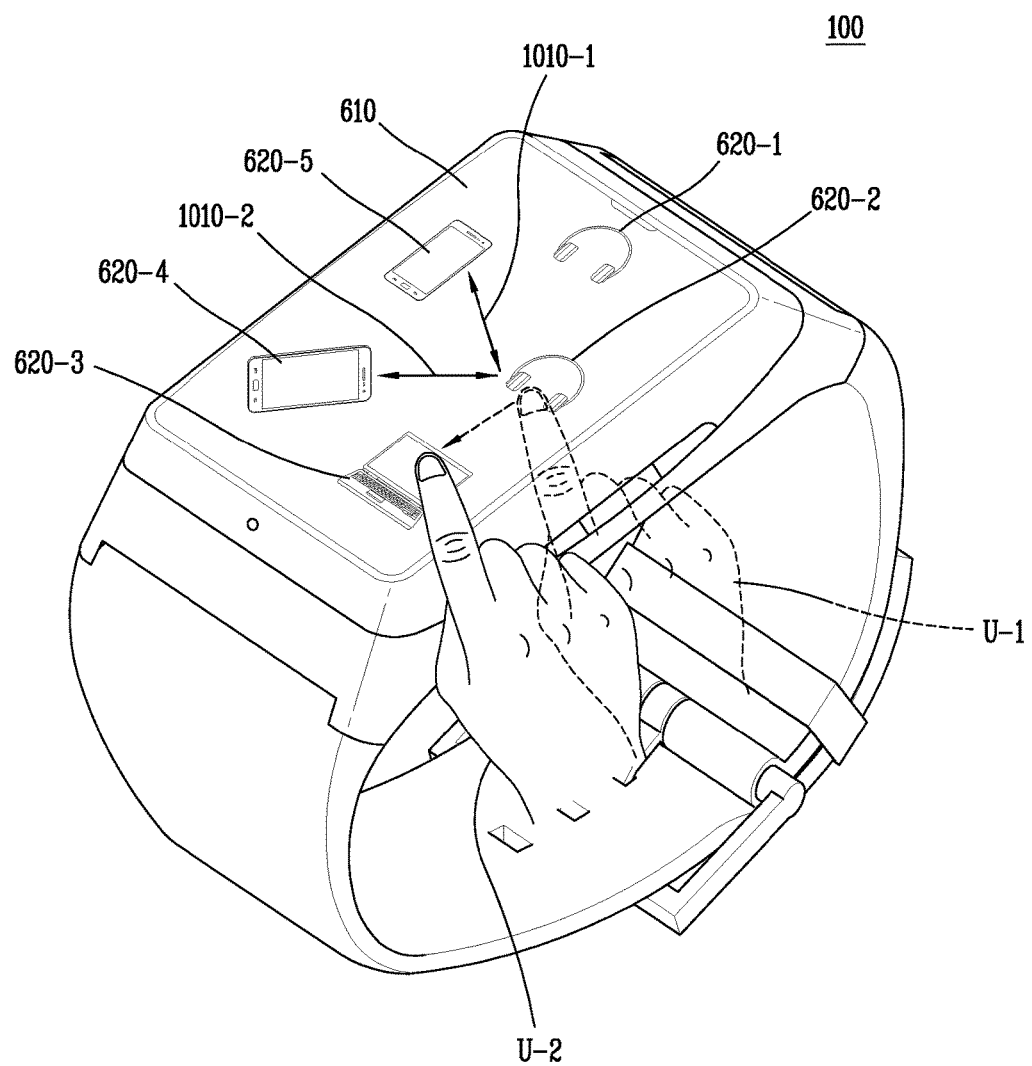

FIGS. 10A through 10C are views illustrating a method of controlling a communication device through a user input according to an embodiment of the present disclosure.

According to FIG. 10A, the controller 180 may display devices 620-1 through 620-5 communicatively connected to a display unit 610. Each device 620-1 through 620-5 is in a state of not being yet included in a BAN network. When a second user touch input (U-2) is entered as a drag operation in a state that a first user touch input (U-1) is touched at a position where an item of the wireless headset 620-2 is disposed, the controller 180 may determine it as a command for establishing communication connection between the headset 620-2 and the PC 620-3, and then control the headset device and the PC to be actually connected to each other.

According to FIG. 10B, when the first user touch input (U-1) is entered and the second user touch input (U-2) is entered in a drag manner in a state that the headset 620-2 and the PC 620-3 are connected to each other, the controller 180 may determine that a command for releasing the communication connection between the headset 620-2 and the PC 620-3 is entered, and actually release communication connection between the headset 620-2 and the PC 620-3.

According to FIG. 10C, it is assumed that a number of devices currently connected to the headset 620-2 at the maximum is two, and supposed that the headset 620-2 is connected to a first smart phone 620-5 and a second smart phone 620-4. Here, when the second headset 620-2 is connected to the PC 620-5 through an input with a user touch input (U-1-U-2), the controller 180 may disconnect one of the first and second smart phones 620-4, 620-5 and connect the second headset 620-2 to the PC 620-3.

In this case, the controller 180 may give a connection priority to the second headset 620-2, but when the connection priority of the PC is lower than that of the smart phone, connection between the second headset 620-2 and the PC 620-3 may not be allowed. In addition, the controller 180 may display the devices 620-4 and 620-5 currently connected to the headset 620-2 or connection relationships 1010-1 and 1010-2 in a highlighted manner.

In addition, when there is a priority among the devices connectable to the headset 620-2, the controller 180 may increase or decrease the priority by a user input. Meanwhile, the controller 180 may predefine various user inputs for connection or disconnection between a master device and a slave device.

Figure 10D:
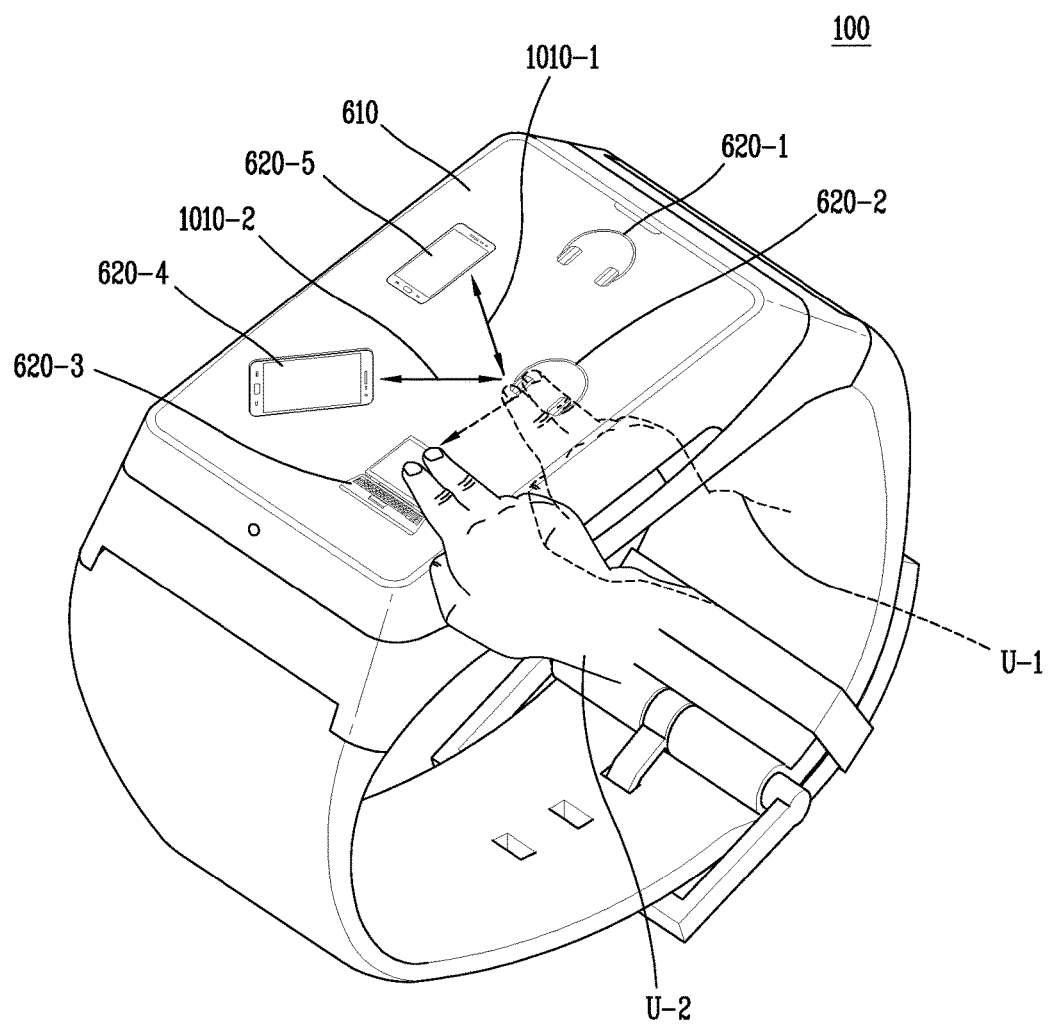

According to FIG. 10D, when the second user touch input (U-2) is entered in a drag operation in a state that the first user touch input (U-1) is touched at a position where an item of the wireless headset 620-2 is disposed with two fingers, the first headset 620-2 and the PC 620-3 may be connected regardless of the connection priority of the second headset 620-2, and one of connections between the headset 620-2 and the smart phones may be forcibly released.

Hereinafter, various embodiments of a network system using a communication medium device will be described.

Figure 11A:
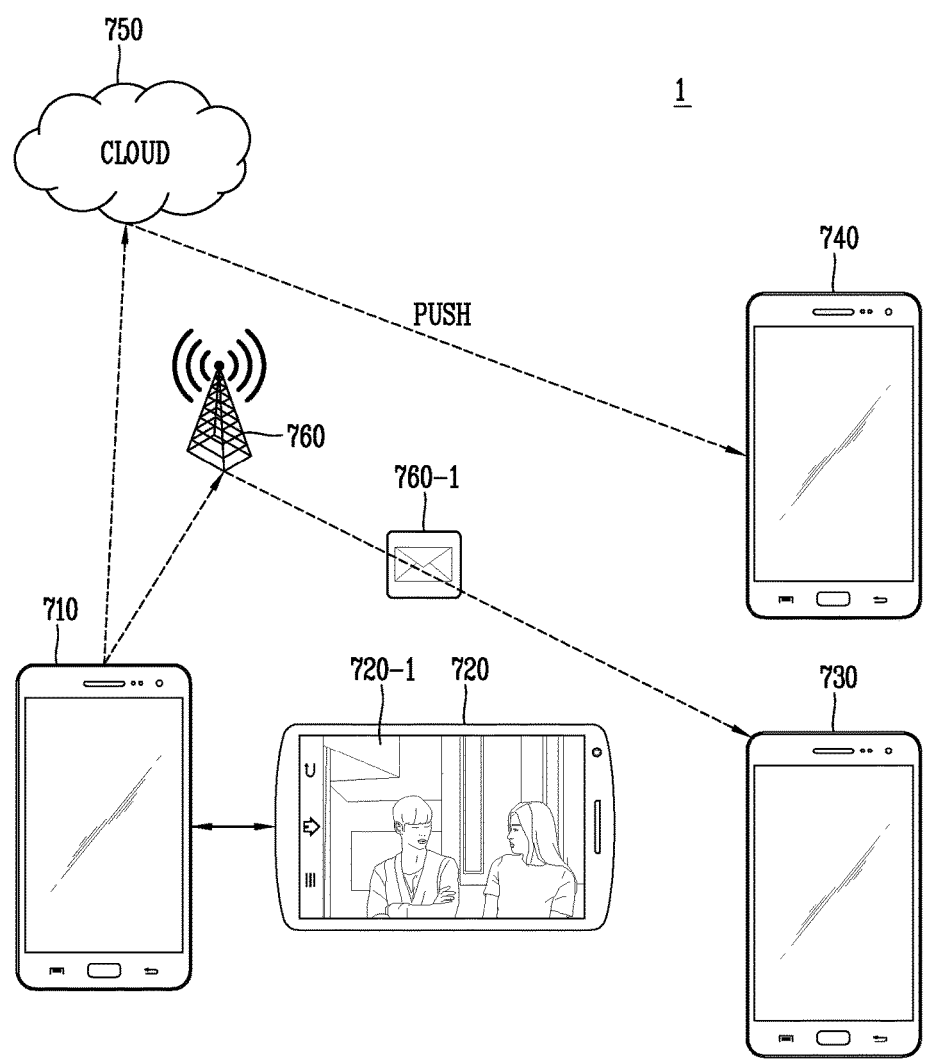
FIGS. 11A and 11B are views illustrating an embodiment of a network system using a mobile terminal as a communication medium device.
Figure 11B:
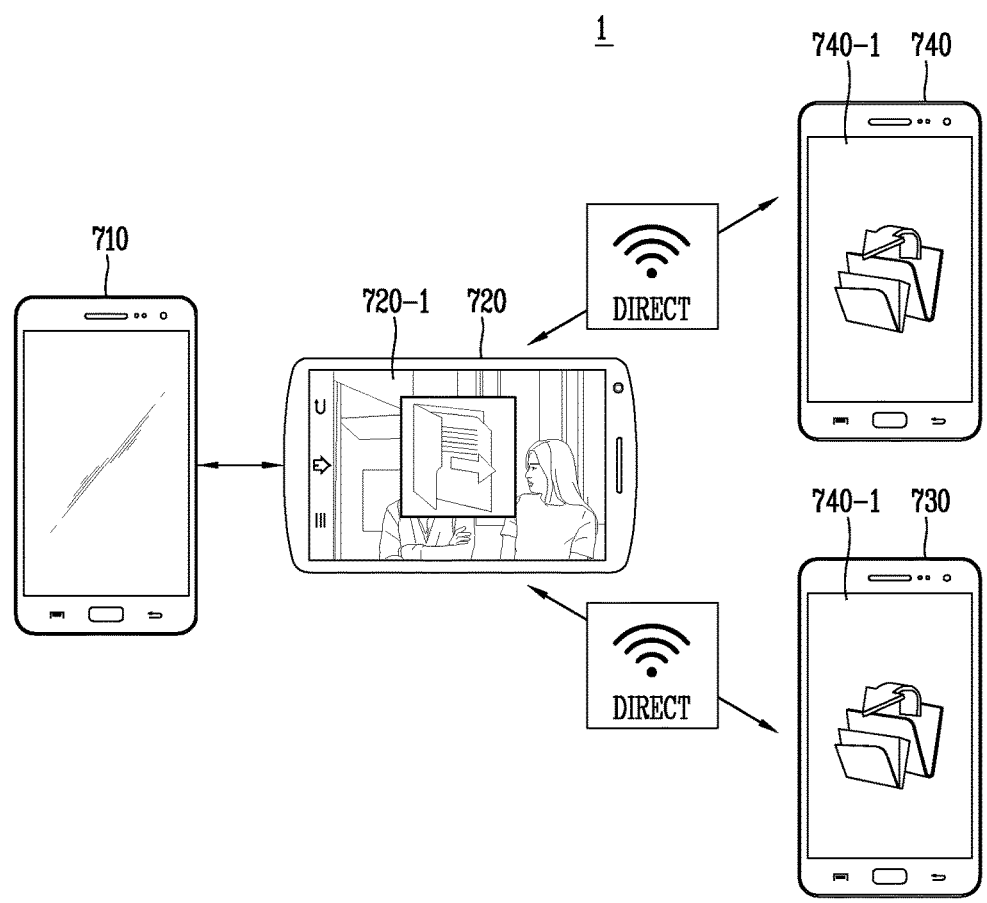

FIGS. 11A and 11B are views illustrating an embodiment of a network system using a mobile terminal as a communication medium device.

According to FIG. 11A, a network system 1 may include a mobile terminal 710, a second device 720, a third device 730, a fourth device 740, a cloud 750, and a base station 760. It is assumed that the mobile terminal 710 is communicatively connected to the second device 720. According to FIG. 11A, the mobile terminal 710 may transmit a command signal to each of the communication devices to allow at least one communicatively connectable communication device to broadcast a specific signal.

Specifically, the mobile terminal 710 may transmit a command signal for allowing each of the second device 720, the third device 730, and the fourth device 740 to transmit a specific signal for communication connection to each of the devices 720 through 740. The third device 730 may receive the command signal as an SMS through the wireless communication network, and the fourth device 740 may receive a push message through the cloud 750. The command signal may include the content of "connecting Wi-Fi direct between devices". A specific example of the specific signal has been described above and thus will not be described in detail.

According to this, each of the devices 720 through 740 may receive a command signal (e.g., Wi-Fi direct connection) to broadcast a specific signal required for Wi-Fi direct, and each of the devices 720 through 740 may receive a specific signal of the each of the devices 720 through 740. In this case, communication connection may be carried out when there is no communication restriction among the devices 720 through 740 that have received the specific signal, but communication connection may not be carried out when there is communication restriction among the devices 720 through 740.

Specifically, as illustrated in FIG. 11B, Wi-Fi direct connection is established between the second device and the third device, and Wi-Fi direct connection is carried out between the second device and the fourth device. At this time, each of the devices 720 through 740 transmits communication connection state information between the devices through the communication medium device. The communication connection state information may include device information to which each of the devices 720 through 740 is connected, network field information, connection constraints, and the like. Here, the mobile terminal 710 may display a communication connection state between the communication devices based on the received communication connection state information.

Figure 12B:
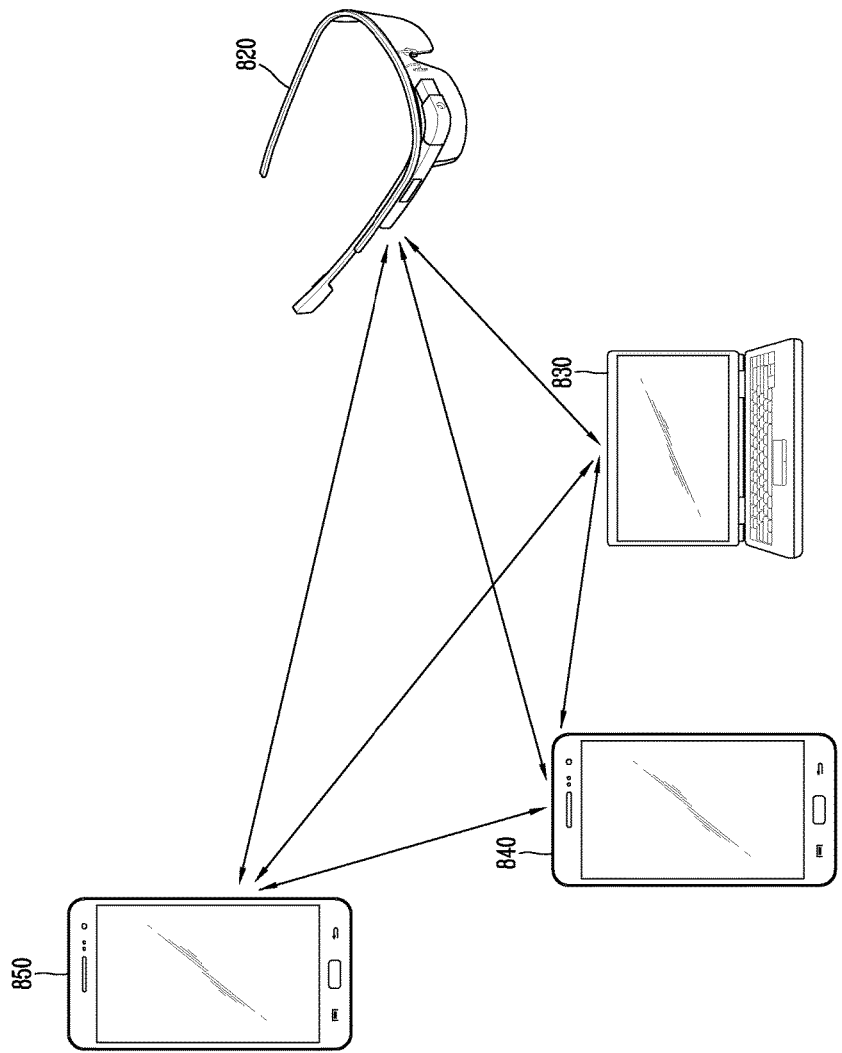

FIGS. 12A and 12B are views illustrating the operation of a network system when the communication medium device is excluded from the network.

According to FIG. 12A, the network system 1 may include a smart watch 810, glass spectacles 820, a laptop 830, a first smart phone 840, a second smart phone 850, is. The smart watch 810 may be configured as a communication device and a communication device. The communication medium device may not participate in communication connection between devices, and may be included in communication connection between device as illustrated in FIG. 12A. All of the devices illustrated in FIG. 12A are supposed to have no communication restriction, and all the devices are communicatively connected.

At this time, when the smart watch 810 is excluded from the network system, the network system 1 may select one of the communication devices as a new communication medium device. For a selection criterion, the device closest to a user may be selected in consideration of user convenience. Here, the glass spectacles 820 may be selected. The selection time may include a time at which the network is initially configured, and a case where the communication medium device is excluded from the network. Accordingly, it may be possible to overcome a problem in case where a conventional mediation device is excluded from the network.

As illustrated in FIG. 12B, when the smart watch 810 is excluded from the network, the glass spectacles may transmit a command signal to allow the laptop 830, the first smart phone 840, and the second smart phone 850 to broadcast. At this time, the glass spectacles 820 may transmit the command signal to themselves, and the glass spectacles 820 may also transmit the broadcasting signal. Each of the devices 820 through 850 that have received the command signal may receive the broadcast specific signal, and perform communication connection based on the broadcast specific signal. When there are communication constraints (e.g., priority, connection restriction, etc.), communication connection may be restricted. Each of the devices 820 through 850 may transmit communication connection state information to the glass spectacles 820, and the glass spectacles 820 may display communication connection state information between the communication devices 820 through 850 through the display unit or the audio output unit.

Figure 13:
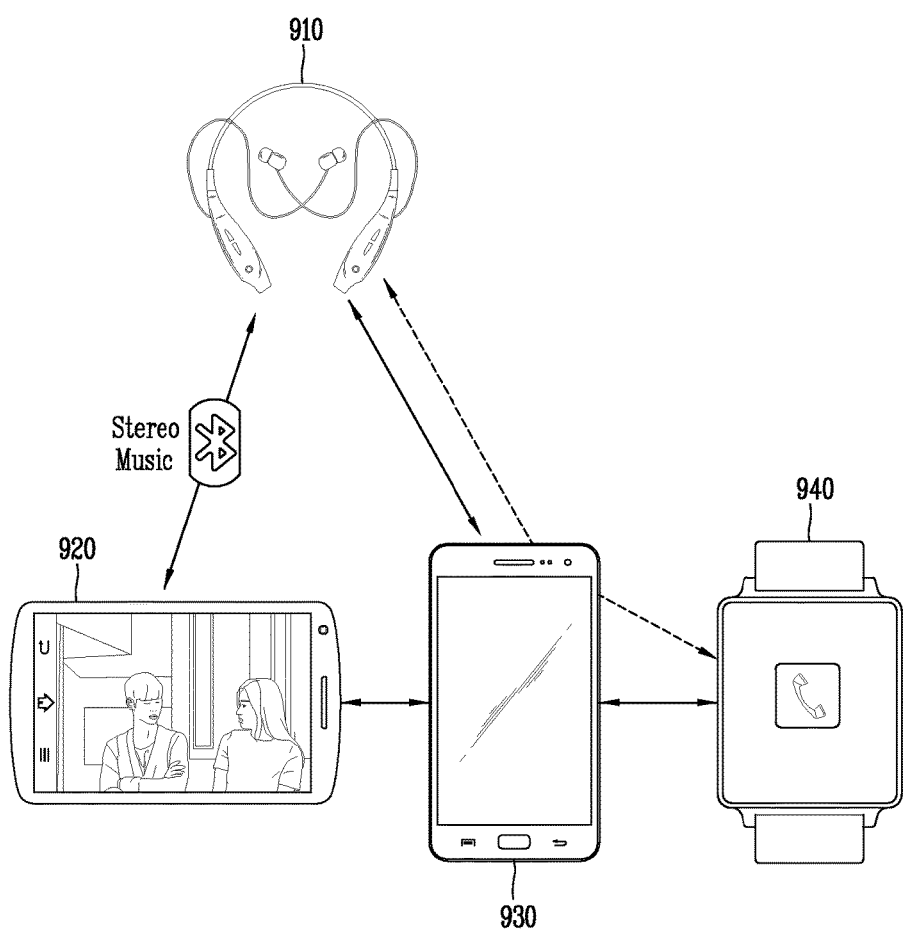
FIGS. 13 and 14 are views illustrating communication connection between communication devices when there is a communication connection restriction according to an embodiment of the present disclosure.
Figure 14:
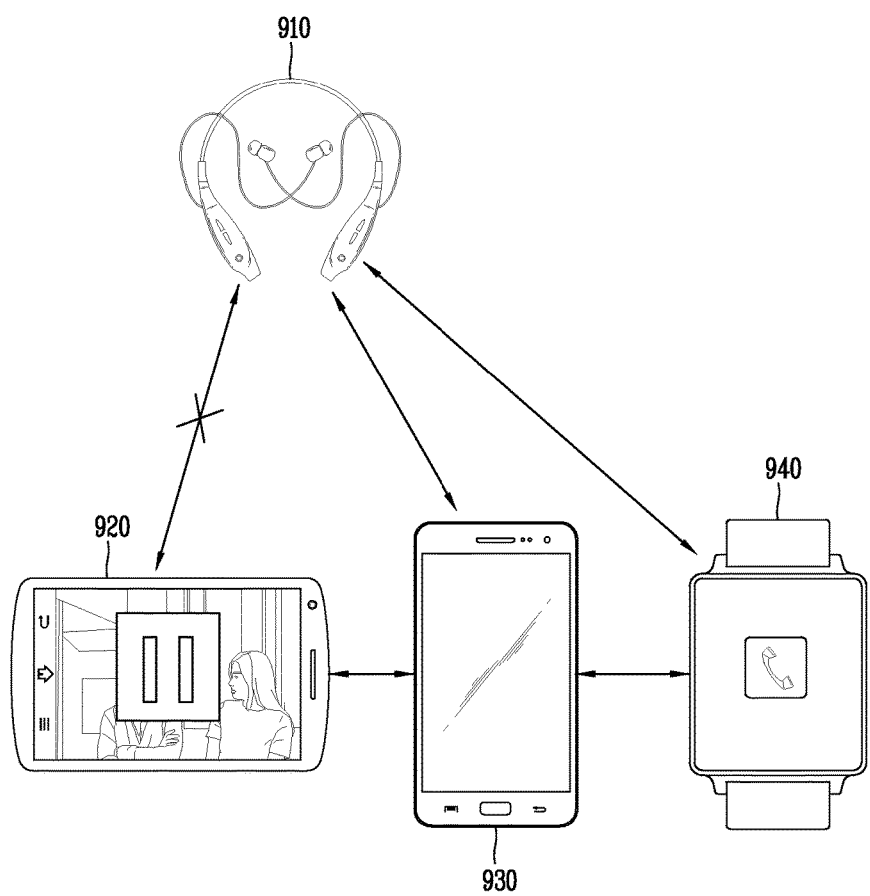

FIGS. 13 and 14 are views illustrating communication connection between communication devices when there is a communication connection restriction according to an embodiment of the present disclosure.

According to FIG. 13, the network system 1 may include a first device 910, a second device 920, a third device 930, and a fourth device 940. The communication medium device may be the first through fourth devices 910 to 940. The first device 910 is connected to the second device 920 and the third device 930 through Bluetooth connection. The second device 920 is connected to the third device 930 and the fourth device 940 is connected to the third device 930. Here, it is assumed that the first device 910 has a maximum of two communicatively connectable devices.

In this case, when a call is made to the fourth device 940, a command for connecting the fourth device 940 to the first device 910 may be received. Specifically, when a call comes in, the fourth device 940 transmits a BAN ID and incoming call information to the third device 930, which is a master device. On the other hand, the relevant command may be received from the communication medium device, and the relevant command may be triggered by a user event. The third device 930 inquires whether or not the Bluetooth headset 910 is connected to the second device 920 and the fourth device 940. Specifically, the third device 930 transmits a BAN ID and a physical connection information request message to the second device 920 and the fourth device 940, which are slave devices.

Then, the second device 920 and the fourth device 940 transmit the BAN ID and connection state information with the Bluetooth headset 910 in response thereto. The connection state information may include whether there is current connection and data information connected. When the second device 920 and the third device 930 are connected to the Bluetooth headset 910, the third device 930 may transmit a command for releasing connection to the Bluetooth headset 910 to the second device 920 connected to the Bluetooth headset 910. Since the third device 930 is a master device, the connection priority order may be set high.

The third device 930 may transmit a command for suspending video currently being played back, a BAN ID and the like to the second device 920, and the third device 930 may store connection release information between the second device and the Bluetooth headset 910. When connection between the second device 920 and the Bluetooth headset 910 is released, the third device 930 may transmit a command for connecting to the Bluetooth headset 910 to the fourth device 940. Specifically, the third device 930 may transmit a BAN ID, a connection command, the address information of the Bluetooth headset 910, and the like to the fourth device 940.

Then, as illustrated in FIG. 14, the Bluetooth headset 910 and the fourth device 940 are set to establish communication connection. The user may perform a phone call placed on the third device 930 through the Bluetooth headset 910. Meanwhile, when there are a plurality of devices connected to the first device 910, the first device 910 may select a device capable of further satisfying user convenience. Specifically, connection priorities may be stored in the memory to perform communication connection based on the stored priorities.

Figure 15:
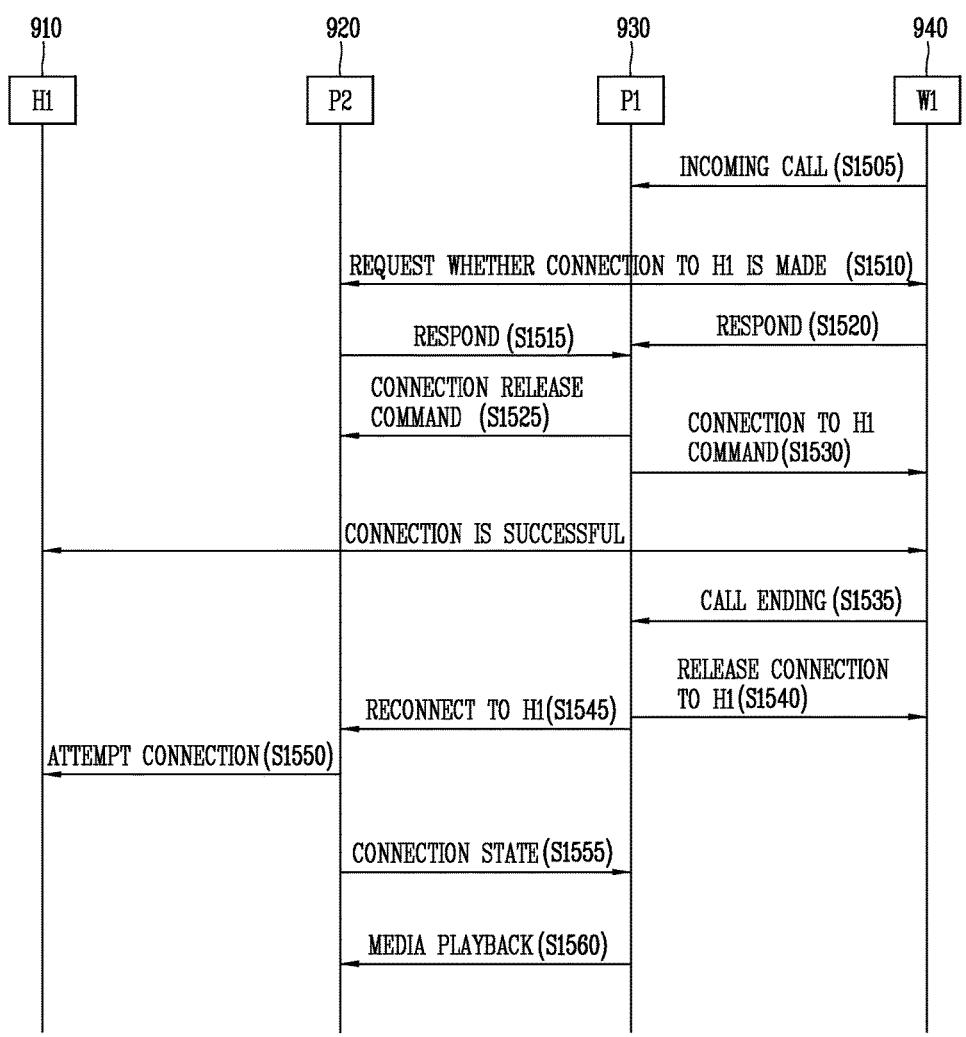
FIG. 15 is a sequence diagram illustrating communication connection and communication connection release between communication devices when there is a communication connection restriction.

FIG. 15 is a sequence view illustrating communication connection and communication connection release between communication devices when there is a communication connection restriction.

The initial state is the same as that illustrated in FIG. 13. The master device is P1 930 (first smart phone), H1 910 (Bluetooth headset) is connected to P1 930 and P2 920, and only a maximum of two may be communicatively connected. In this case, when a call comes into W1 940, the W1 940 informs the P1 930 that the call is incoming. Specifically, a BAN ID and an incoming call signal are transmitted (S1505).

Then, the P1 930 checks whether or not the H1 910 is connected to the P2 920 and the W1 940, which are slave devices connected to the H1 910. Specifically, the P1 930 transmits a BAN ID and a physical connection information transmission command to the slave device (S1510). Next, the P2 920 and the W1 930 transmit connection/disconnection information to the H1 910 to the P1 930 (S1515, S1520). Specifically, it may include the BAN ID, the connection/disconnection information to the H1 910, and connection data information.

When the P2 920 is connected to the H1 910, the P1 930 may transmit a connection release command to the P1 930 and the P2 920 (S1525). The P1 930 stores information on a number of connectable devices of the H1 910, and thus when it is determined that the W1 940 needs to be connected to the H1 910, the foregoing steps may be taken. Specifically, the P1 930 may transmit a command for suspending video currently being played back on the P2 920, a BAN ID, a command for releasing connection with the H1 910, address information of the H1 910, and the like (S1530).

In such a case, the H1 910 may release connection with the P2 920 and make new connection with the W1 940. The H1 910 may maintain connection with the existing master device P1 930 as it is. Next, when the phone call using the H1 910 ends, the W1 940 notifies the P1 930 that the communication connection is ended (S1535). Specifically, the W1 940 may transmit a BAN ID and an END CALL signal to the P1 930.

In this case, the P1 930 transmits a command for releasing connection with the H1 910 to the W1 940 (S1540). Specifically, the P1 930 may transmit the BAN ID, the connection release command, and the address information of the H1 910 to the W1 940. The P1 930 may transmit a command for reconnection with the H1 910 to the P2 920 that has been previously connected thereto because there is one available device for the H1 910 to connect to (S1545). Specifically, the BAN ID, H1 910 and the command for reconnection with the H1 910, address information of the H1 910 may be transmitted. Then, the P2 920 attempts to establish communication connection with the H1 910 (S1550). Specifically, the P2 920 may transmit the BAN ID and the connection request command to the H1 910.

When connection is completed, the P2 920 transmits connection state information to the P1 930 (S1555). Specifically, the P2 920 transmits a BAND ID and connection state information with the H1 910. The connection state information may include a connection state and data information to be transmitted. When the P2 920 has played a media prior to reconnection, the P3 930 may store the relevant information, and transmit a media playback command to the P2 920 while the reconnection is made.

Figure 16A:
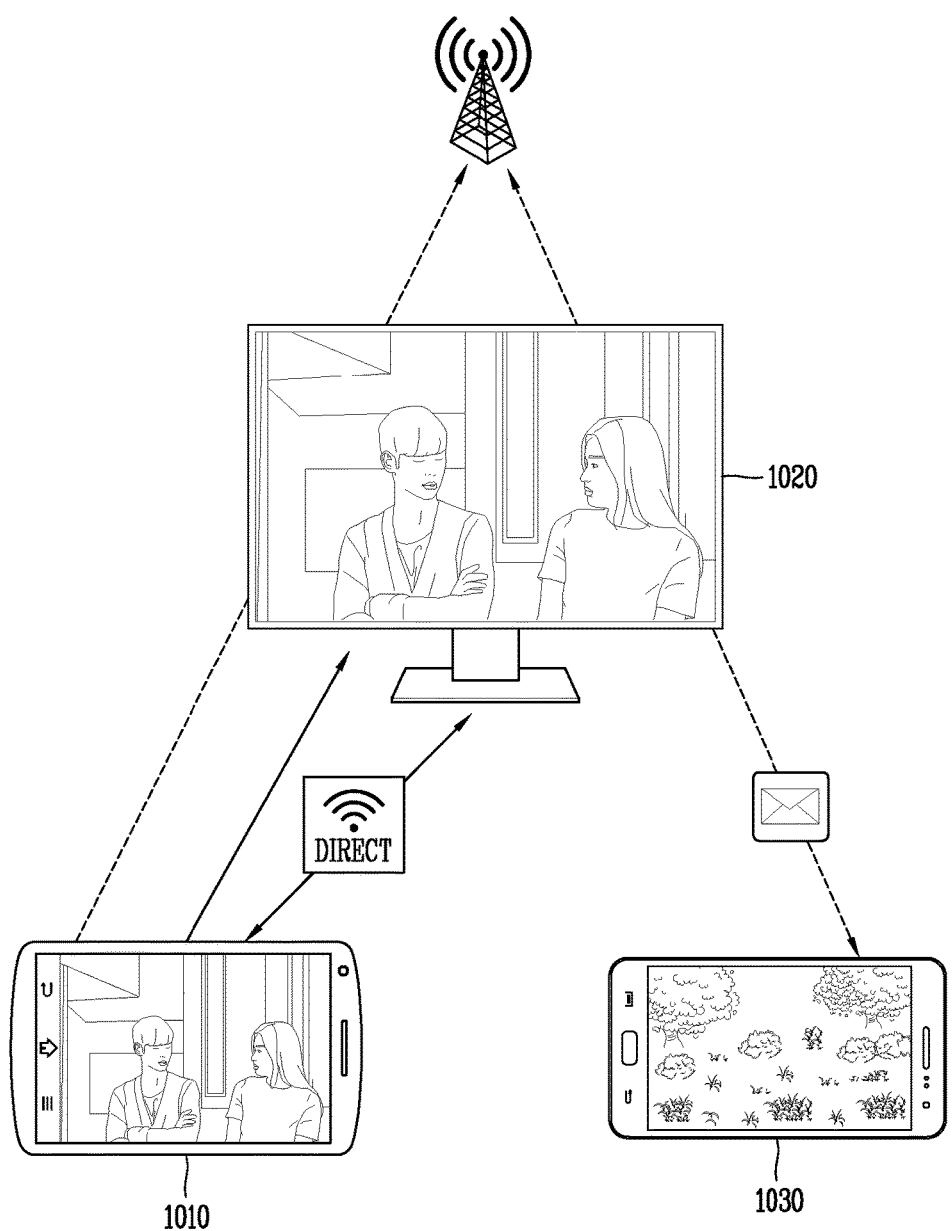
FIGS. 16A and 16B are views illustrating an operation procedure of a communication device performing communication connection with a new communication device according to various embodiments of the present disclosure.
Figure 16B:
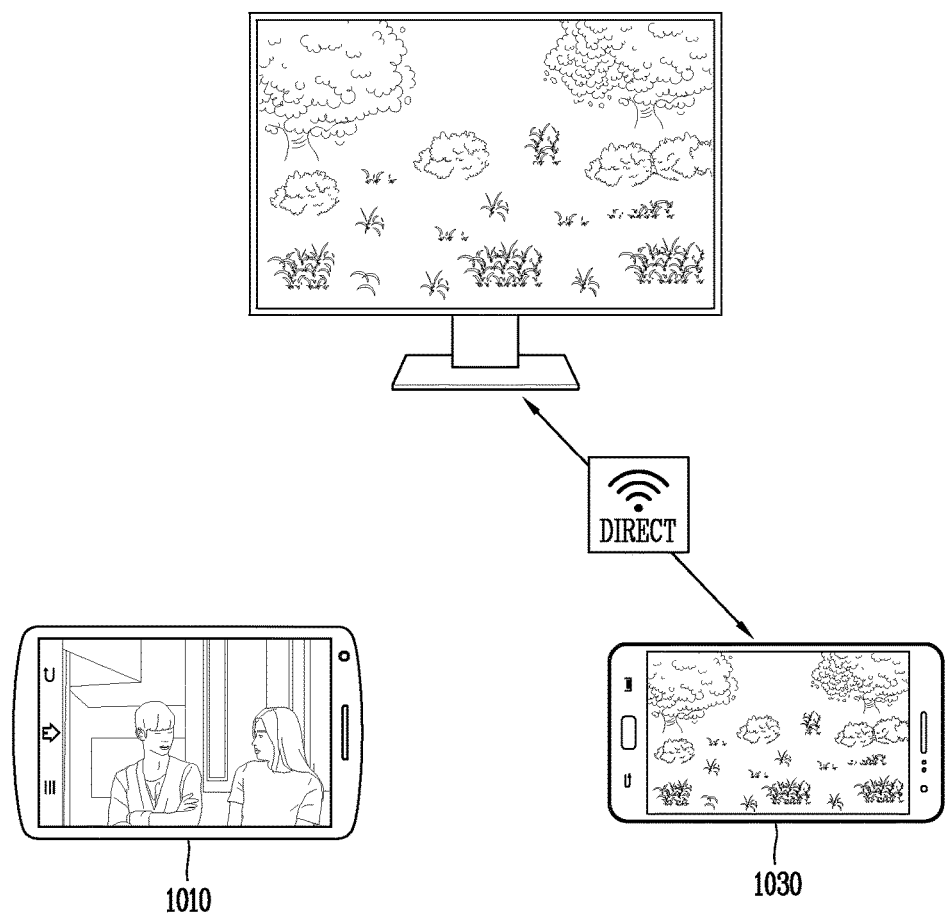

FIGS. 16A and 16B are views illustrating an operation procedure of a communication device performing communication connection with a new communication device according to various embodiments of the present disclosure.

According to FIG. 16A, the communication medium device may be a first device 1010. The network system 10 may include first through third devices 1010 through 1030. The first device 1010 and the second device 1020 are communicatively connected using Wi-Fi direct.

In this case, a command for connection between the second device 1020 and the third device 1030 may be received at the first device 1010. For example, the relevant command may be received by a communication medium device, a user event, a request from another device or a network system and the like.

At this time, the first device 1010 may perform the role of a communication medium to allow the second device 1020 and the third device 1030 to communicate with each other. In addition, communication connection between the first device 1010 and the second device 1020 may be released. On the other hand, a control method of a communication system using the communication medium device may be also taken into consideration.

For now, a command signal is transmitted to each of communication devices to allow at least one communicatively connectable communication device to broadcast a specific signal. Next, the communication device that has received the command signal by each of the communication devices broadcasts the specific signal.

Then, communication connection state information between communication devices that have received the broadcast specific signal is received from the communication device through the communication medium device. Finally, a communication connection state between the communication devices may be displayed based on the communication connection state information received by the communication medium device.

Figure 17A:
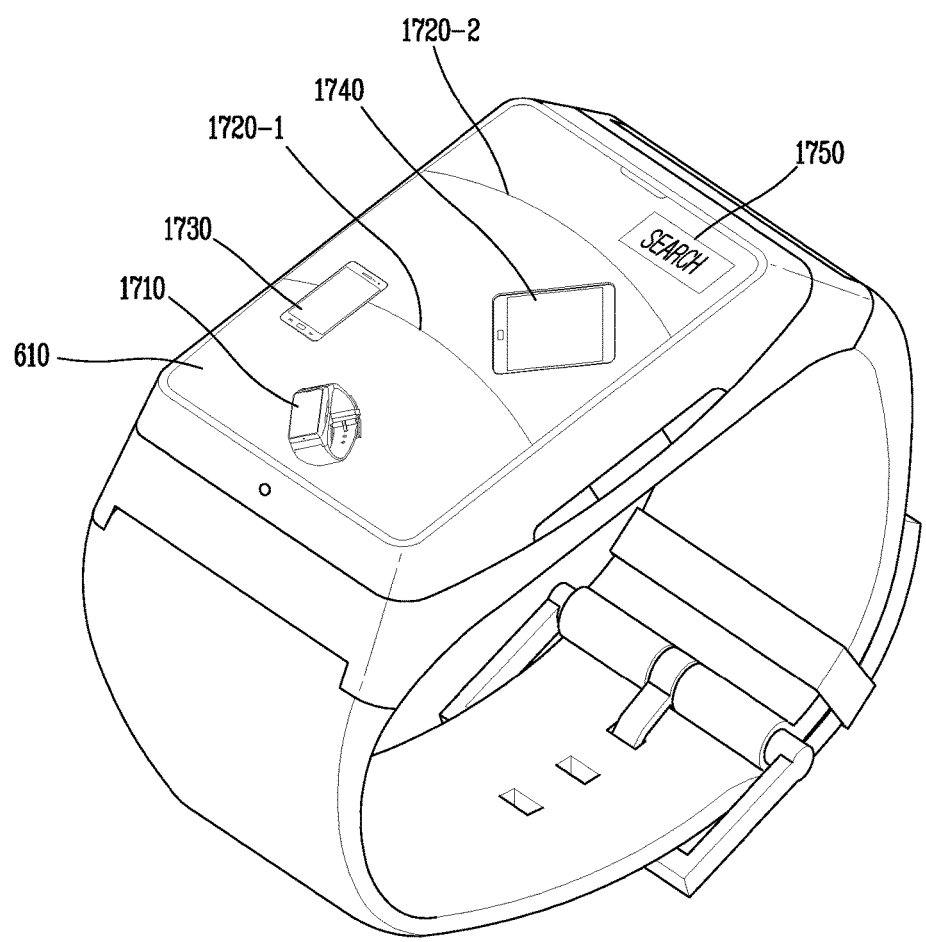
FIGS. 17A through 17C illustrate views in which the communication connection of a BAN network according to various embodiments of the present disclosure is displayed on a UI screen.
Figure 17B:
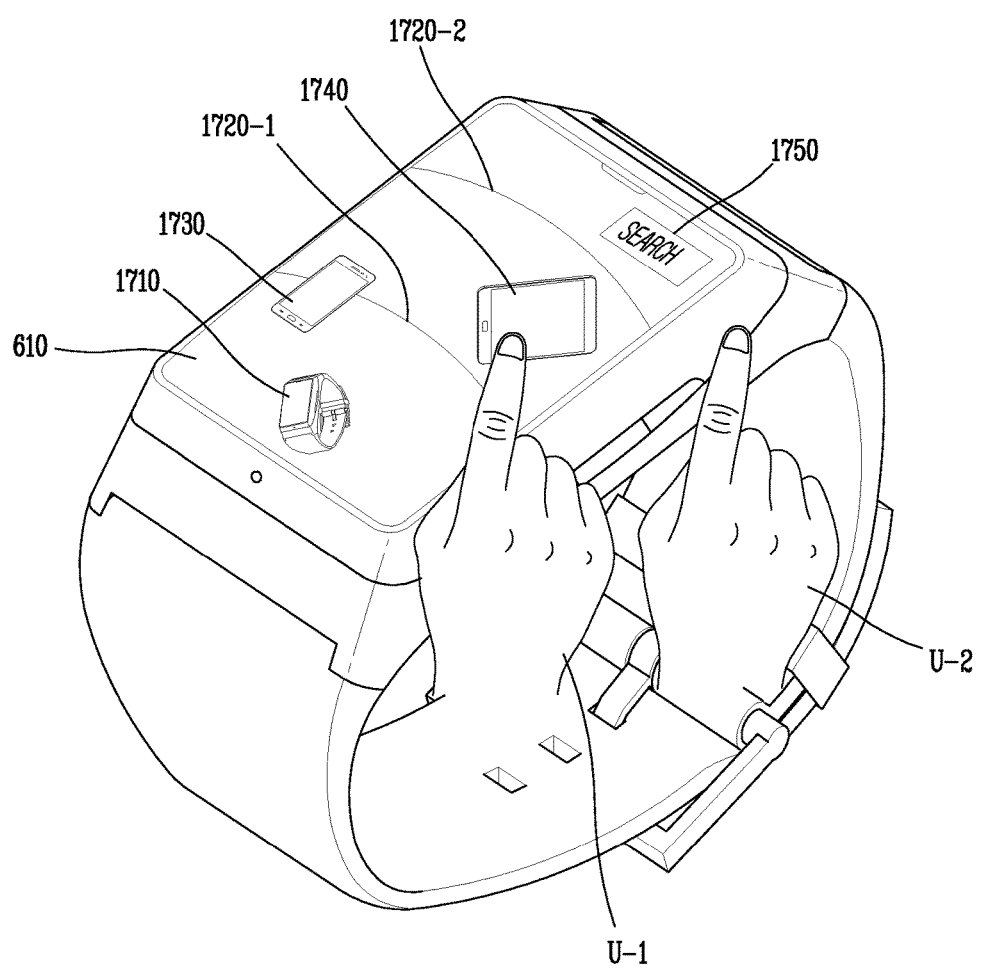
Figure 17C:
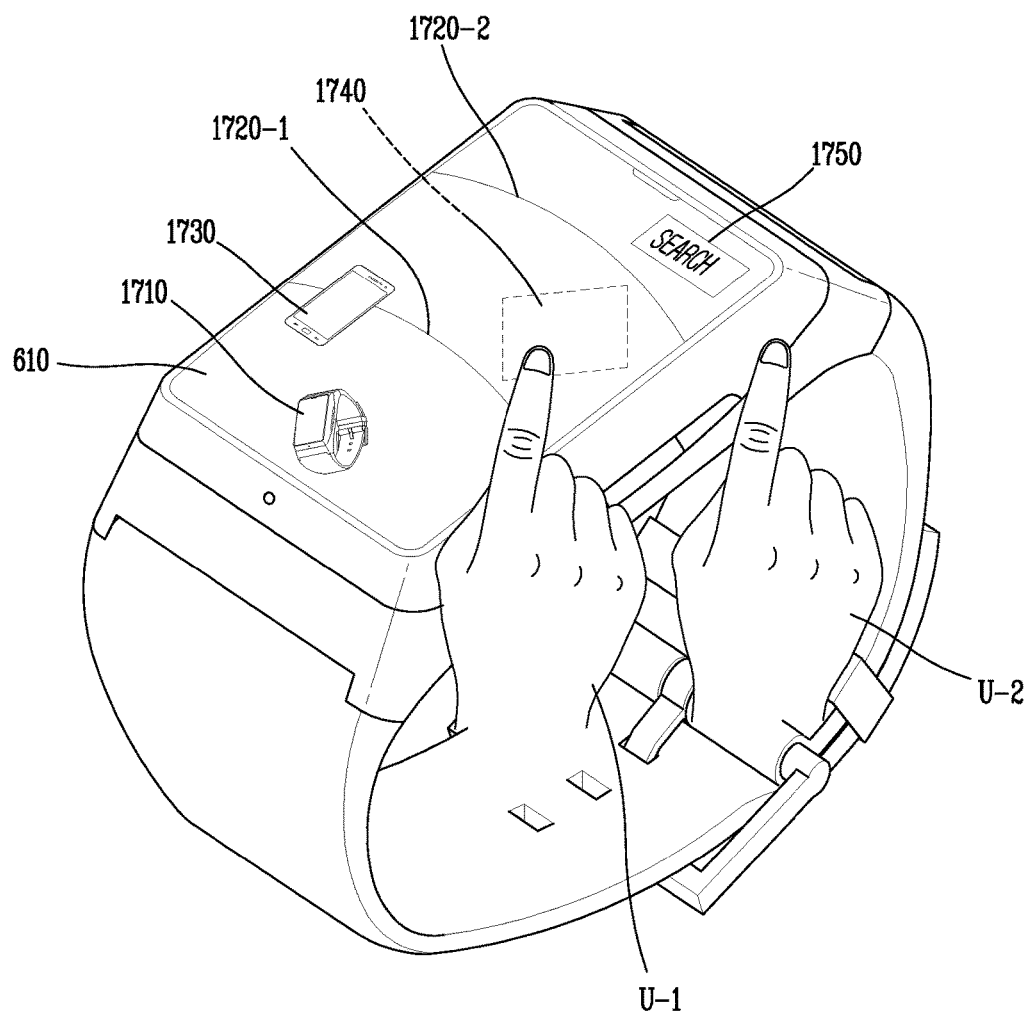

FIGS. 17A through 17C illustrate views in which the communication connection of a BAN network according to various embodiments of the present disclosure is displayed on a UI screen.

According to FIG. 17A, the communication medium device 100 may be a smart watch having a display unit 610. Adjacent devices 1730 and 1740 are searched around the smart watch 100 and a screen may be configured in a geofence manner indicating a distance between the smart watch 100 and the adjacent devices 1730 and 1740.

The smart phone 1730 is disposed closer to the smart watch 100 than the tablet PC 1740. A smart watch item 1710 representing the smart watch 100 may be displayed on the display unit 610 because a geofence is configured on the basis of the smart watch 100. A first distance line 1720-1 represents a position apart from the smart watch 100 by a first distance. A second distance line 1720-2 represents a position away from the smart watch 100 by a second distance. The first distance line 1720-1 is disposed closer to the second distance line 1720-2.

The smart watch 100 may display at least one communicatively connectable communication device on a UI screen. The smart watch 100 may recognize communicatively connectable communication device information. For example, information capable of identifying each communication device including a phone number, an IP, an Email Address, a MAC address and the like may be recognized.

The smart watch 100 may search for adjacent communication devices through a search button 1750 of the display unit 610. At this time, the smart watch 100 may display the searched devices 1730, 1740 on the display unit 610. In this case, when a user's touch input is entered from the U-1 to the U-2 in a drag manner as illustrated in FIG. 17B, the relevant device 1740 may disappear from the screen while leaving only an outline 1740. It may be difficult for the smart watch 100 to communicate with the fade-out device 1740 in a current state. However, it may be displayed again on the display unit 610 by a predetermined user input. Moreover, as illustrated in FIG. 17C, the outline 1740 may also disappear when a user input for dragging the device 1740 remaining with only the outline 1740 out of the display unit 610 is entered once again.

On the other hand, a device that can be dragged out may be employed without any limitation as long as it is a device capable of wireless networking including a PC, a laptop, a mobile device, and a tablet PC. Furthermore, although the search button 1750 has been described only for the purpose of searching for a wireless device, it is possible to search for a wireless device and use it for the purpose of communication connection. Furthermore, although the present disclosure has been described on the assumption that the communication medium device is the smart watch 100, it is merely an embodiment, and any device capable of wireless networking may be employed without any limitation.

Figure 18:
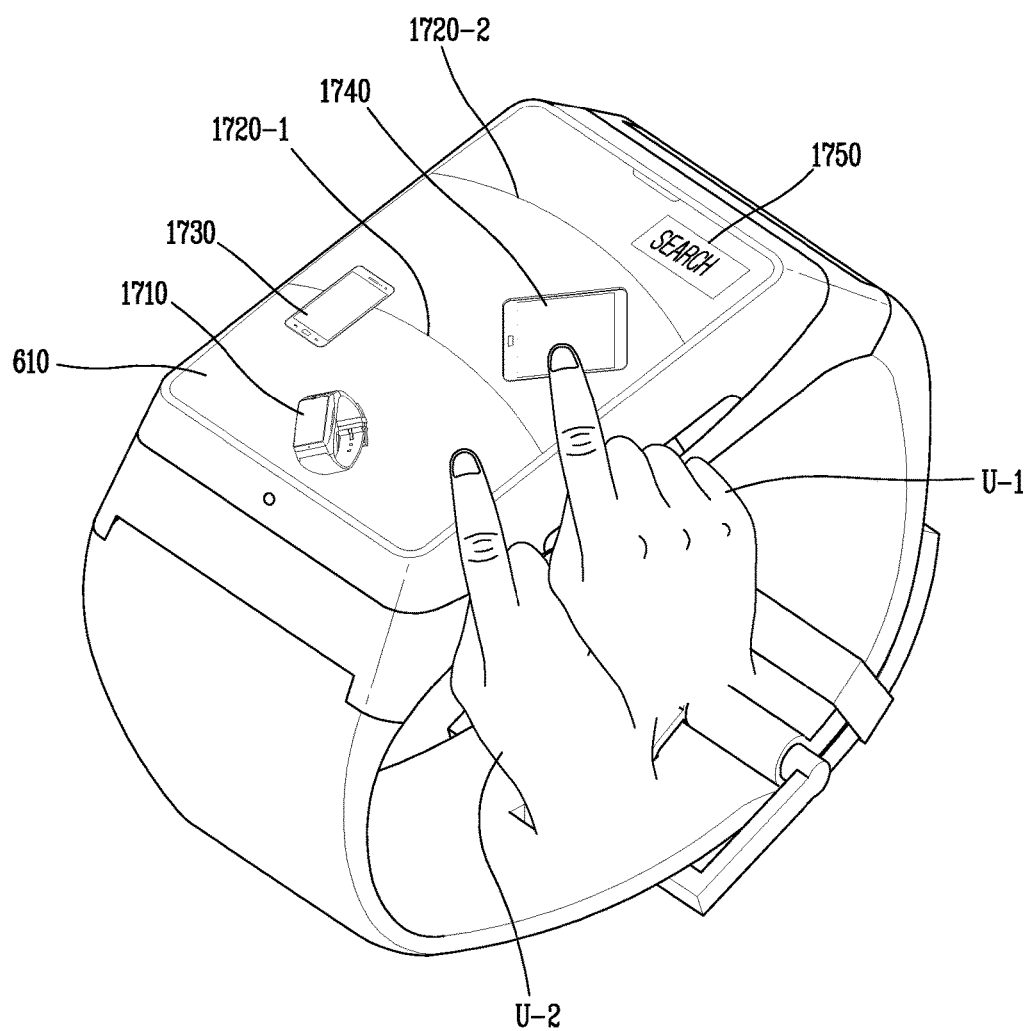
FIGS. 18 and 19 illustrate views in which the communication connection of a BAN network according to various embodiments of the present disclosure is displayed on a UI screen.
Figure 19:
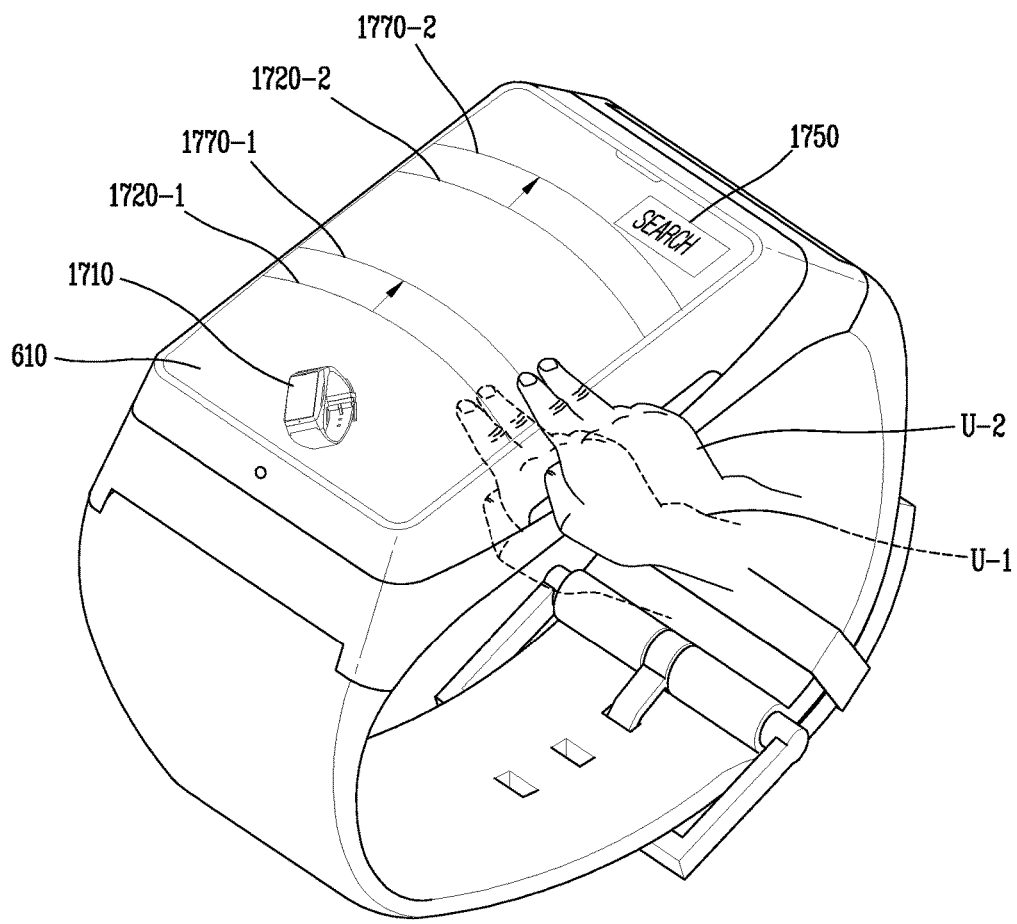

FIGS. 18 and 19 are views illustrating the communication connection of a BAN network according to various embodiments of the present disclosure on a UI screen.

According to FIG. 18, the tablet PC 1740 is currently disposed between the first distance line 1720-1 and the second distance line 1720-2. Here, the first distance line 1720-1 may correspond to a maximum distance at which the smart watch 100 can be connected in a wireless manner, and may indicate a specific distance. In this case, when a user touch input is entered from the U-1 to the U-2 in a drag manner, the smart watch 100 may determine it as a command for establishing communication connection between the smart watch 100 and the tablet PC 1740, and attempt connection with the tablet PC 1740.

According to FIG. 19, when the first distance line 1720-1 is dragged upward by two fingers, the first distance line 1720-1 may be changed to a position 1770-1.

The second distance line 1720-2 may be changed to a position 1770-2 along the first distance line 1720. However, the second distance line 1720-2 may not necessarily move along the first distance line 1720-1. In this case, the smart watch 100 may calculate a distance based on the changed first distance line 1770-2 to perform search and connection up to a device disposed at the relevant distance. The search and connection may be triggered by the search button.

For example, when the first distance line prior to the change is 3 m and the first distance line subsequent to the change is 5 m, the smart watch 100 may search for a device with a radius of 5 m to display it on the display unit 610. Furthermore, the smart watch 100 may also search for and connect to a device in consideration of distance as well as directionality.

Hereinafter, embodiments associated with a control method that can be implemented in a mobile terminal according to an embodiment of the present disclosure will be described with reference to the accompanying drawings. Meanwhile, in the above description, it has been described on the assumption that the mobile terminal 100 has a form of a smart watch, but in the following description, it will be described on the assumption that the mobile terminal 100 has a form of a smart phone for the sake of convenience of explanation. However, the present disclosure may be of course applicable to any other form as well as a case where the mobile terminal 100 is implemented in the form of a smart phone. It should be understood by those skilled in the art that the present disclosure can be embodied in other specific forms without departing from the concept and essential characteristics thereof.

Meanwhile, the mobile terminal 100 according to an embodiment of the present disclosure may be connected to a plurality of different terminals using a preset signal, and may exchange various information with each other. In this case, terminals connected to each other may exchange information associated with operation states of each other, information on various events such as reception of a message, incoming of a call, states of installed applications or devices, and the like with each other. Furthermore, various detection results sensed by the sensing units included in each device, for example, whether the position is moved or a result of sensing the user's biological signal, and the like may be exchanged with each other.

Figure 20:
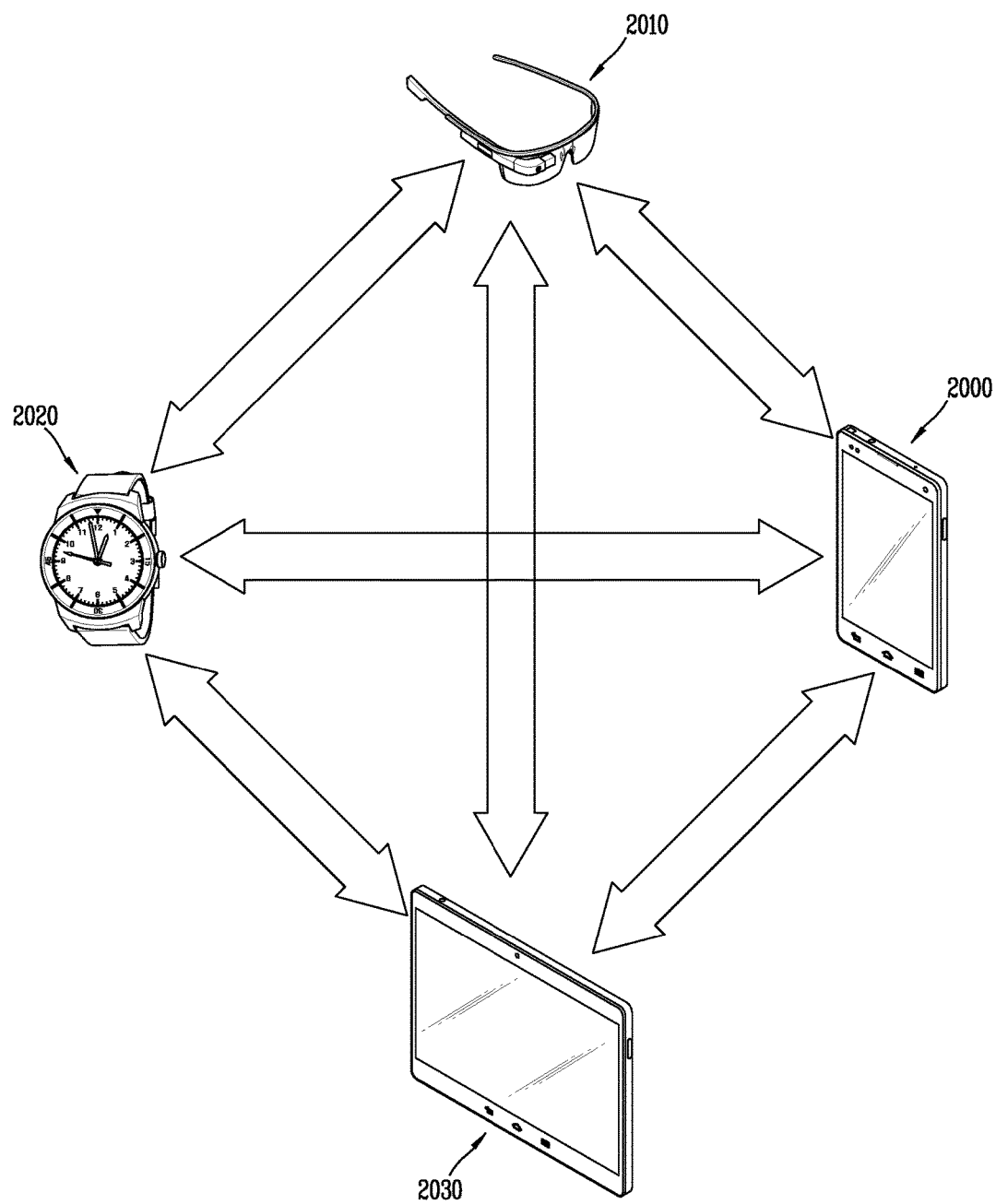
FIG. 20 is a conceptual view illustrating an example in which a mobile terminal associated with an embodiment of the present disclosure is connected to at least one of other terminals.

FIG. 20 is a conceptual view for explaining an example in which mobile terminals associated with an embodiment of the present disclosure are connected to a plurality of devices.

Referring to FIG. 20, the mobile terminal 100 according to an embodiment of the present disclosure may be implemented in various forms such as smart glasses 2010, a smart watch 2020, a smart phone 2000, and a tablet PC 2030. Furthermore, the terminals 2010, 2000, 2020, 2030 may form a network sharing various information. The terminals 2010, 2000, 2020, 2030 may be connected to each other through short-range wireless communication according to the user's selection to form the network.

Here, the terminals 2010, 2000, 2020, 2030 constituting the network may be devices sharing the same identification information. The identification information may be information that a terminal constituting the network is directly received from a user or information generated from any one of terminals (e.g., a master device) constituting the network as unique information of the network when the network is formed. Furthermore, any one terminal that has directly received identification information from a user or that has generated the identification information may share the identification information with another terminal connected through the network. Accordingly, the terminals 2010, 2000, 2020, 2030 constituting the network may share the same identification information with each other, and may distinguish between devices that are connected through the network and devices that are not connected through the network using the shared identification information.

Hereinafter, a network configured with devices that are formed around the user's body and share identification information may be a BAN (Body Area Network), and identification information shared by each device constituting the BAN may be the BAN ID (identification). The BAN may be implemented using a variety of wireless connectivity standards such as Bluetooth, Zigbee, Wi-Fi, Advanced Network Tools (ANT) or Bluetooth Low Energy (BLE).

In this case, the terminals 2010, 2000, 2020, 2030 connected to each other through the BAN may share various information with other terminals using the BAN. For example, the terminals 2010, 2000, 2020, 2030 may transmit information associated with their own operation states, that is, various executable functions and information on currently executed functions and the like to other terminals, and receive information associated with the operation states of the other terminals from the other terminals. Accordingly, even when the user checks one of the terminals, the user may check information on currently executed functions or executable functions in the other terminals.

In addition, when an event occurs, mobile terminals 2010, 2000, 2020, 2030 according to an embodiment of the present disclosure may share information associated with the occurred event with each other. Accordingly, when an event occurs on any one of the mobile terminals 2010, 2000, 2020, 2030, the mobile terminals 2010, 2000, 2020, 2030 may share information associated with the event that has occurred on the any one of the terminals, and the mobile terminals, respectively, may be in a state capable of notification information for notifying the occurrence of the event.

Here, the terminals 2010, 2000, 2020, 2030 according to an embodiment of the present disclosure may output notification information for notifying the occurrence of the event to only any one of terminals 2010, 2000, 2020, 2030 connected to the BAN based on a preset condition. In this case, the terminals 2010, 2000, 2020, 2030 may determine whether or not the terminals themselves are in a user's available state according to a preset criterion. For example, the terminals 2010, 2000, 2020, 2030 may use a current state of operation, a state of being worn or gripped by the user or a result of checking an application executed in the terminal to determine whether or not the terminals themselves are in the user's available state.

Furthermore, the terminals 2010, 2000, 2020, 2030 may transmit information associated with the occurred event to output the notification information through the output unit 150 provided therein according to the determination result, or output the notification information from another terminal in an available state. Accordingly, terminals according to an embodiment of the present disclosure may display information associated with an event occurring on the terminals connected to the BAN to any one terminal currently used by the user. In this case, other terminals that are not selected as a terminal for outputting notification information may not display the notification information for notifying the occurrence of the event even when the event occurs. In addition, when the user checks notification information on a currently occurred event, a terminal that has output the notification information may transmit the user's check information to another terminal.

As a result, according to the present disclosure, when the user checks notification information output from any one of the terminals carried by himself or herself, an event corresponding to the notification information may be recognized that has been checked by the user on other terminals. Accordingly, when the user checks notification information on any one of the terminals, it may be displayed on other terminals that the event has been checked by the user.

Therefore, according to the present disclosure, when a tablet PC is selected as a terminal to output notification information, the notification information associated with a call received at a smart phone of the user may be also output on the tablet PC without having a call function. Furthermore, when the user checks the notification information, it is displayed on other devices including the smart phone of the user that the received call has been checked by the user. Furthermore, as described above, when the tablet PC is a terminal to output notification information, other terminals may not output notification information on the received call.

Hereinafter, embodiments associated with a control method that can be implemented in a mobile terminal configured as above will be described with reference to the accompanying drawings. It should be understood by those skilled in the art that the present invention can be embodied in other specific forms without departing from the concept and essential characteristics thereof.

Figure 21:
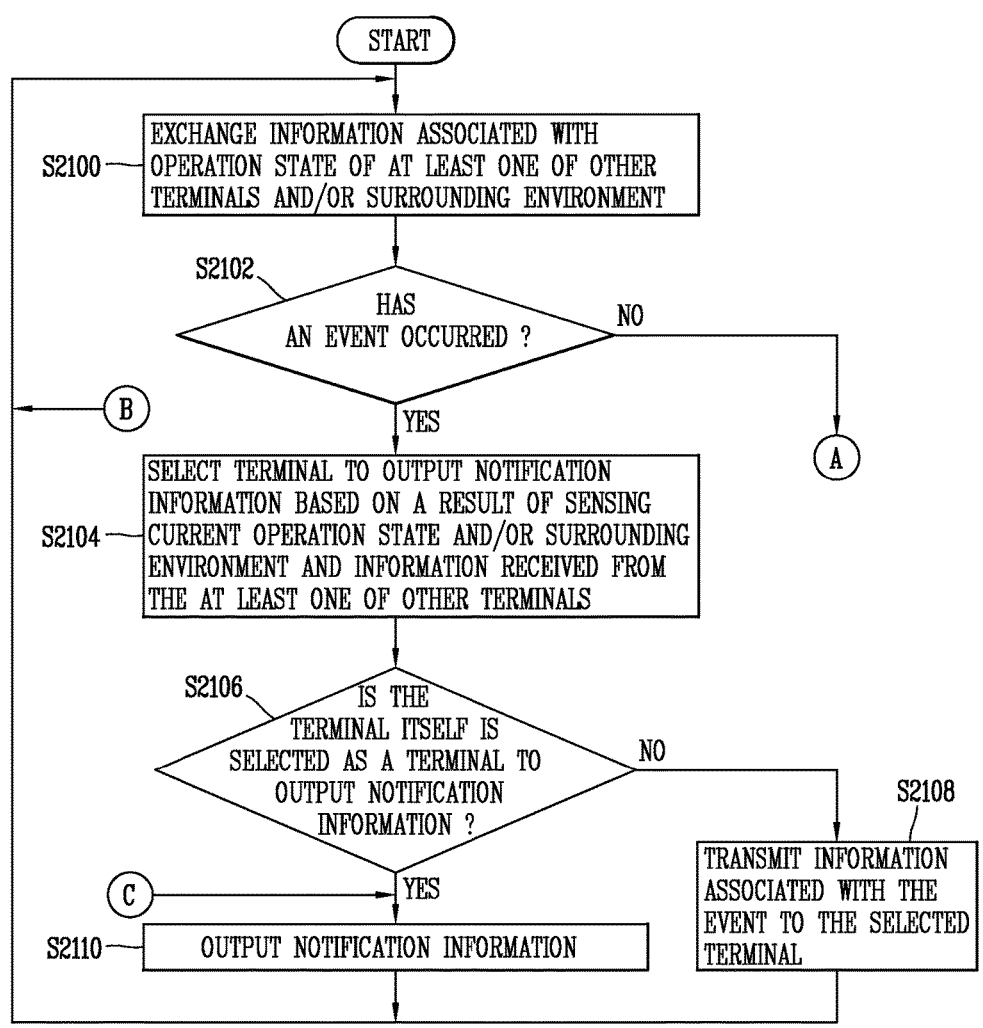
FIG. 21 is a flowchart illustrating an operation of outputting notification information or transmitting information associated with an event when the event occurs on a mobile terminal associated with an embodiment of the present disclosure.

FIG. 21 is a flowchart illustrating an operation of outputting notification information or transmitting information associated with an event when the event occurs on a mobile terminal associated with an embodiment of the present disclosure.

Referring to FIG. 21, the controller 180 of the mobile terminal 100 according to an embodiment of the present disclosure may be connected to at least one of other terminals to exchange information that has sensed surrounding environments through the operation states and/or sensing unit 140 (S2100). Here, the mobile terminal 100 and the at least one of other terminals may be connected in a BAN (body area network) form as described above to use various types of wireless signals (e.g., a Bluetooth or BLE signal) to exchange information on the operation states and/or the sensed surrounding environments.

In this case, the controller 180 may detect whether an event has occurred (S2102). Here, there may be various events. For example, the event may include all cases where information that should be notified to the user occurs. In other words, for example, the event may include a case where there is a newly received message (e.g., an SMS or SNS message), a case where a call is received, a case where an e-mail is received, and the like. Alternatively, the event may include a case where information that should be notified to the user is generated by the state or operation of a specific device such as a battery state or an execution of a preset application. Alternatively, the event may include a case where a user's state or situation is changed as a result of determining the user's situation based on a result of sensing surrounding environments or the user's physical condition.

On the other hand, when the event has occurred as a result of sensing in the step S2102, the controller 180 select whether the mobile terminal 100 is in an available state based on a result of sensing current operation states and/or surrounding environments, and a terminal In operation S2100, a terminal to output notification information for notifying the occurrence of the event based on information received from at least one of other terminals in the step S2100 (S2104).

In the step S2104, the controller 180 may determine whether the mobile terminal 100 is in an available state (a state capable of outputting notification information on the event) based on various conditions, and select any one of the at least one of other terminals as a terminal to output the notification information. For example, the controller 180 may determine whether the mobile terminal 100 is in an available state based on an operation state of the mobile terminal 100 and a result of sensing the surrounding of the mobile terminal 100. Furthermore, as a result of the determination, when the mobile terminal 100 is not in an available state, a terminal to output the notification information may be selected.

To this end, the controller 180 may use a result of sensing the current operation state of the at least one of other terminals and/or the environment around the at least one of other terminals. Alternatively, the controller 180 may use whether or not there is a specific constituent element provided in the terminal itself (mobile terminal 100) and the at least one of other terminals, the characteristics of the specific constituent element, or the like. Hereinafter, an operation process of allowing the controller 180 to select a terminal to output the notification information will be described in more detail with reference to FIG. 23.

On the other hand, when a terminal to output the notification information is selected in the step S2104, the controller 180 determines whether the mobile terminal 100 has been selected as a terminal to output the notification information (S2106). As a result of the determination during the S2106, when the terminal itself (the mobile terminal 100) is selected as a terminal to output the notification information, the notification information for notifying the occurrence of the event may be output using at least one of the display unit 151 or the audio output unit 152 (S2110). In this case, the notification information may be displayed on at least part of the display unit 151 in the form of a pop-up window or an icon-shaped graphic object, and audio information corresponding to the notification information may be output together.

On the other hand, as a result of the determination during the S2106, when the mobile terminal 100 is not selected as a terminal to output the notification information, the controller 180 the controller 180 may transmit information associated with the event to any one terminal according to a result of the selection in the step S2104 among the at least one of other terminals (S2108). In this case, the other terminal that has received information associated with the event may output notification information for notifying the occurrence of the event in the form of image information and/or audio information.

Meanwhile, when information associated with an event that has occurred on the other terminal is received as described above, the mobile terminal 100 may also output the notification information through the same process as that of the other terminal.

Figure 22:
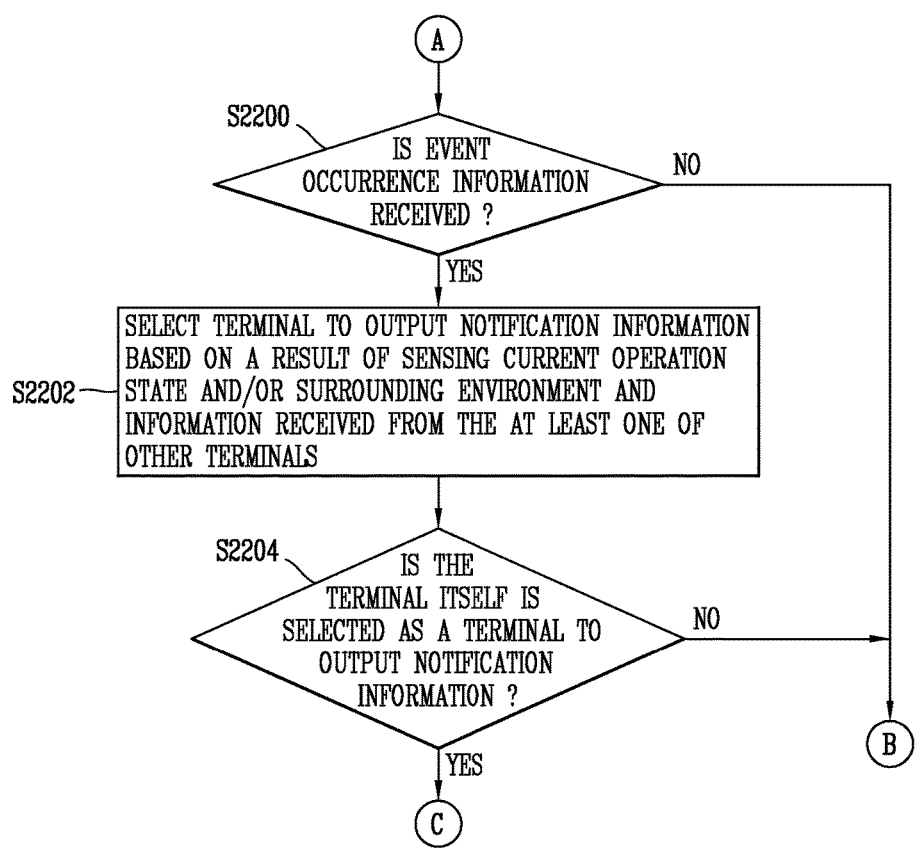
FIG. 22 is a flowchart illustrating an operation process of processing an event on a mobile terminal associated with an embodiment of the present disclosure when information associated with the occurrence of the event is received from another terminal.

FIG. 22 is a flowchart illustrating an operation process of processing an event on a mobile terminal associated with an embodiment of the present disclosure when information associated with the occurrence of the event is received from another terminal.

Referring to FIG. 22, as a result of sensing the occurrence of an event in the step S2102, when the occurrence of the event is not sensed, the controller 180 of the mobile terminal 100 according to an embodiment of the present disclosure may sense whether or not information associated with the event that has occurred on another terminal is received (S2200). Furthermore, as a result of the sensing in the step S2200, when there is event-related information received from another terminal, the controller 180 may select a terminal to output notification information for notifying the occurrence of the event based on a result of sensing the operation state and/or surrounding environment of the terminal itself (mobile terminal 100), and information received from at least one of other terminals in the step S2100 in FIG. 21 (S2202). Furthermore, the controller 180 may determine whether or not the mobile terminal 100 is in an available state (S2204).

Furthermore, as a result of the determination in the step S2204, when the mobile terminal 100 is selected as a terminal to output the notification information, the controller 180 may proceed to the step S2110 in FIG. 21 to output the notification information using at least one of the display unit 151 and the audio output unit 150. However, as a result of the determination in the step S2204, when the mobile terminal 100 is not selected as a terminal to output the notification information, the controller 180 may proceed to the step S2110 in FIG. 21 to exchange information associated with an operation state and/or a result of sensing the surrounding environment with at least one of other terminals. Then, the controller 180 may proceed to the step S2102 in FIG. 21 to sense whether an event has occurred.

Accordingly, when there is an event that has occurred on the terminal itself (mobile terminal 100) and at least one of other terminals connected thereto, the mobile terminal 100 according to an embodiment of the present disclosure may determine whether or not to output notification information based on the operation state and/or surrounding environment. On the other hand, when the mobile terminal 100 is not in a state capable of outputting notification information, the notification information may be output from any one of the other terminals connected thereto. In this case, the mobile terminal 100 may merely transmit information associated with the event to the other terminal, but may not output notification information, and thus according to the present disclosure, the notification information may be output only from any one terminal selected by a preset condition.

In addition, the event may include reception of a message and incoming of a call as described above, and furthermore, according to the present disclosure, when the terminal itself (mobile terminal 100) is not selected as a terminal to output notification information of the event, notification information for notifying the occurrence of the event may be transmitted to another device, and the terminal (mobile terminal 100) may not output the notification information. Accordingly, according to the present disclosure, when a condition as a terminal to output the notification information of an event is satisfied, even though it is a terminal without having a function corresponding to the occurred event (e.g., a tablet PC without having a call function), notification information associated with an event occurred on another terminal (e.g., a call incoming event occurred on a smart phone) may be output. It is because notification information on the occurred event is output to a terminal that is more suitable for a user to receive notification information based on a preset condition, not based on whether or not there is a function corresponding to the occurred event.

On the other hand, conditions for selecting a terminal that is more suitable for outputting notification information may be determined in various ways. For example, as illustrated in the step S2104 in FIG. 21 or step S2202 in FIG. 22, the controller 180 may use the operation state and/or surrounding environment of the mobile terminal 100 or at least one of other terminals to select a terminal to output the notification information. Here, the "operation state" may relate to an operation mode or currently executed application of the mobile terminal 100 or the at least one of other terminals, and the "surrounding environment" may relate to whether or not the mobile terminal or a terminal connected thereto is worn by a user or gripped by the user's hand.

Figure 23:
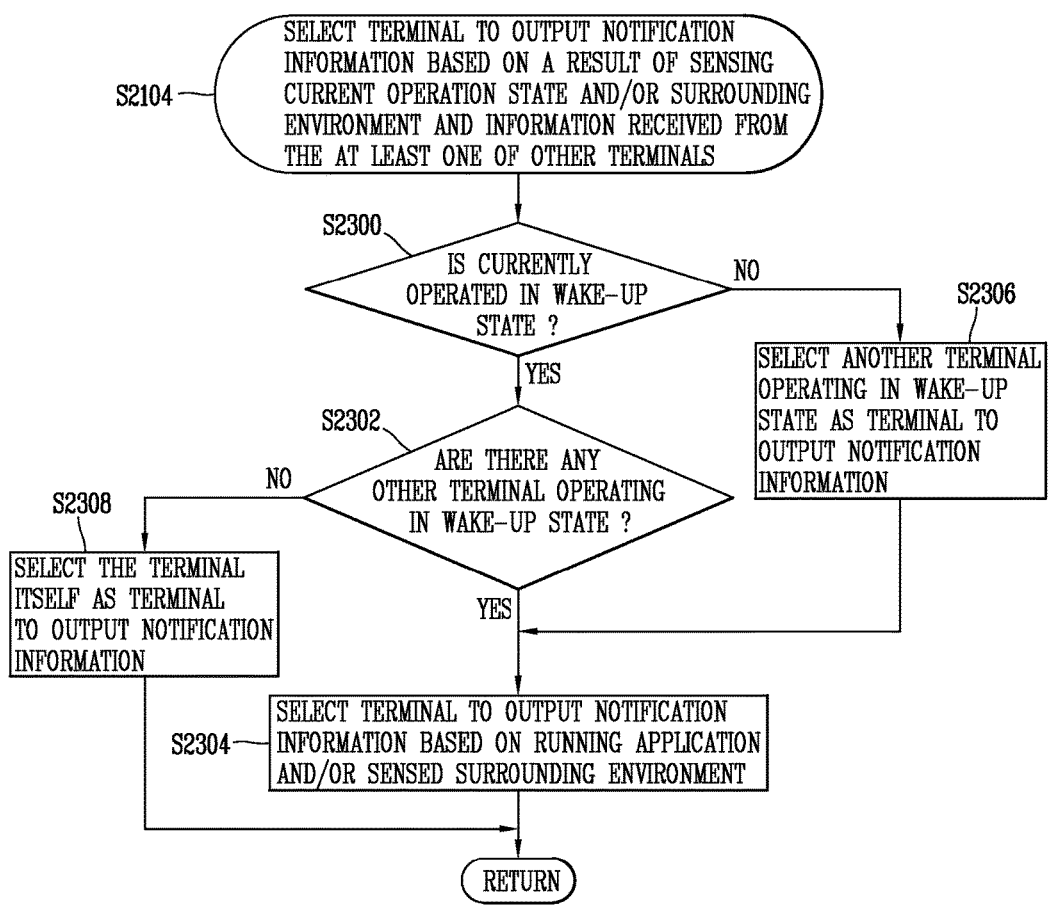
FIG. 23 is a flowchart illustrating a process of selecting a terminal to output notification information on an occurred event during the operations illustrated in FIGS. 21 and 22.

FIG. 23 illustrates a process of allowing the mobile terminal 100 according to an embodiment of the present disclosure to select a terminal to output the notification information in such a case in more detail.

Referring to FIG. 23, when the occurrence of an event is sensed in the step S2102 in FIG. 21 or information on an event occurred on another terminal is received in the step S700, the controller 180 of the mobile terminal 100 according to an embodiment of the present disclosure may check the operation mode of the terminal itself (mobile terminal 100) (S2300).

In the step S2300, the controller 180 may determine whether the mobile terminal 100 operates in a wake-up state or a sleep mode state. Furthermore, as a result of the determination in the step S2300, when the mobile terminal 100 currently operates in a wake-up state, the controller 180 may determine that the mobile terminal 100 is in an available state. Furthermore, the controller 180 may sense whether there is another terminal operating in wake-up state among at least one of other terminals connected thereto (S2302).

In addition, as a result of the determination in the step S2302, when there is no terminal operating in a wake-up state among the at least one of other terminals, the controller 180 may select the terminal itself (mobile terminal 100) as a device to output the notification information (S2308). It is because a case where a device operates in a sleep mode can be regarded that the user has not used the device for more than a predetermined time, and thus the device is not currently used by the user. Therefore, the controller 180 may determine that the terminal itself is the most suitable terminal to output notification information to a current user to output the notification information in the step S2106 and step S2110 in FIG. 21.

On the other hand, as a result of the sensing in the step S2302, when there is a terminal operating in a wake-up state among the at least one of other terminals, the controller 180 may select a terminal to output the notification information based on an application running on the terminal itself (the mobile terminal 100) or another terminal in the wake-up state and/or the sensed surrounding environment (e.g., whether the terminal is worn or gripped by a user) (S2304).

In the step S2304, the controller 180 may preferentially determine any one of the sensed surrounding environment or the running application. For example, the controller 180 may select a terminal that is worn or gripped by the user among the terminal itself and other terminals operating in the wake-up state, as a terminal to output the notification information. Alternatively, the controller 180 may select a terminal on which a specific application according to the user's selection is executed among the terminal itself and other terminals operating in the wake-up state.

On the other hand, when the mobile terminal 100 and other terminals operating in a wake-up state are all in a state of being worn or gripped, or specific applications are being all executed thereon, the controller 180 may select a specific terminal as a terminal to output the notification information in consideration of those conditions in a complex manner. For example, when the terminal itself and other terminals operating in a wake-up state are all in a state of being worn or gripped, the controller 180 may select a terminal on which the specific application according to the user's selection is executed among the other terminals as a terminal to output the notification information.

Alternatively, when the terminal itself (mobile terminal 100) and other terminals operating in a wake-up state are all executed with a specific application according to the user's selection, the controller 180 may select a terminal that is worn or gripped by the user among the terminals as a terminal to output the notification information.

Alternatively, the controller 180 may select a terminal to output the notification information according to the type of an application executed on the terminal itself and other terminals operating in a wake-up state. For example, when an application selected by the user is executed on all of the terminal itself and other terminals operating in a wake-up state, the controller 180 may select a terminal excluding terminals on which an application corresponding to the type previously specified by the user among the terminals. It is to prevent the user from being disturbed by the output of the notification information while engaging in the viewing of a specific content when watching the content such as a movie or a game.

On the other hand, the controller 180 may evaluate the importance of the notification information, and may select a terminal on which an application corresponding to a predetermined type is executed as a terminal to output the notification information based on the evaluated importance. For example, the controller 180 may evaluate the importance according to the type of the occurred event. Here, when the occurred event is incoming of a call or reception of a message, the controller 180 may evaluate the importance based on a phone number of the call or message originator.

In addition, when information associated with the occurred event includes text (e.g., receiving a message), the controller 180 may evaluate the importance of the event based on words included in the text. In other words, when preset words such as "important", "urgent", "please reply", and the like are included in words included in the text, the controller 180 may highly evaluate the importance of an event including the relevant text. When the evaluated importance is above a predetermined level, a terminal on which an application corresponding to a preset type is executed may be selected as a terminal to output the notification information.

Meanwhile, the controller 180 may select a terminal to output the notification information by further considering whether or not a specific constituent element is included therein and/or the characteristics of the specific constituent element as well as an operation mode or running application of the terminal itself or at least one of other terminals or whether or not it is worn or gripped by the user. For example, when the terminal itself and at least one of other terminals are operating in a wake-up state, and the terminals are all worn or gripped, and the same type of applications (e.g., music playback application) are being executed, the controller 180 may select a terminal to output the notification information based on whether or not the display unit is included in the terminals and/or a size of the display unit provided therein.

On the other hand, as a result of the sensing in the step S2300, when the mobile terminal 100 is not currently operating in a wake-up state, the controller 180 may determine that the mobile terminal 100 is not currently in an available state. In this case, the controller 180 may select another terminal operating in a wake-up state among at least one other devices connected thereto, and select the terminal operating in the wake-up state as a terminal to output the notification information (S2306).

However, in the step S2306, if it is determined that there are at least two or more other terminals operating in a wake-up state, then the controller 180 may of course select a terminal to output the notification information based on an application running on at least two terminals operating in the wake-up state and/or surrounding environment sensed by the at least two terminals. In this case, similar to the step S2302 in FIG. 23 as described above, the controller 180 may preferentially consider any one of the sensed surrounding environment or the running application or select one of the terminals in consideration of the conditions in a complex manner.

Meanwhile, information on the operation state of the mobile terminal 100 or at least one of other terminals (e.g., information on an operating mode or running application), or information on the sensed environment (information on whether it is worn or gripped by the user), or device information (e.g., information on whether or not a specific constituent element is included and/or the characteristics of the specific constituent element) may be exchanged through a network (e.g., BAN (Body Area Network)) formed in the step S2100. Hereinafter, an example of exchanging information associated with an operation state through such a BAN network and displaying information associated with the operation state on the display unit 151, and an operation process thereof will be described in detail with reference to FIGS. 35 through 44A and 44B.

Furthermore, according to the foregoing description, it has been described as an example in which the mobile terminal 100 and at least one of other terminals according to an embodiment of the present disclosure always exchange information on an operation state in a state of being connected in advance prior to the occurrence of the event, information on the sensed surrounding environment and device information and the like, but it is needless to say that it is not always required to be connected in advance.

In other words, in order to reduce power consumed in the mobile terminal 100 according to an embodiment of the present disclosure, the at least one of other terminals and the mobile terminal 100 may be connected only when a preset condition is satisfied to exchange information on the operation state and surrounding environment with each other. Here, the preset condition may be set by combining at least one or more of various conditions such as the occurrence of an event, the expiration of a preset period, or the user's selection as in the step S2102.

On the other hand, according to the foregoing description, it has been described that when an event occurs, the controller 180 of the mobile terminal 100 according to an embodiment of the present disclosure selects any one of the mobile terminal 100 or at least one terminal based on a preset condition to output notification information corresponding to the event. In addition, it has been mentioned that the event includes all cases where information to be notified to the user occurs, and may occur by reception of a message, incoming of a call, a state of a specific device or an application executed in a specific device.

Figure 24:
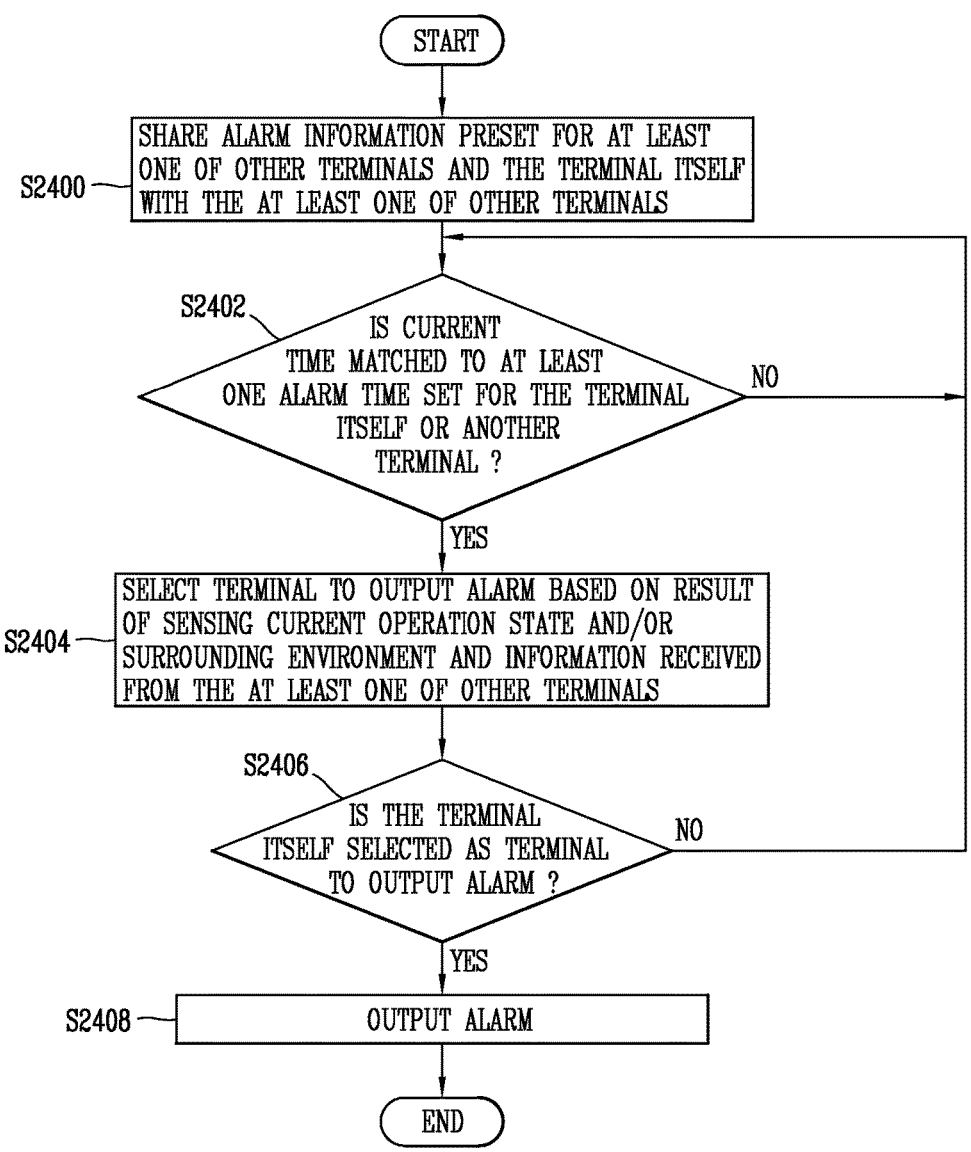
FIG. 24 is a flowchart illustrating an operation of outputting an alarm set for at least one of other terminals and a mobile terminal in the mobile terminal associated with the embodiment of the present disclosure.

Accordingly, the "event" may include a case where an alarm is set for the mobile terminal 100 and at least one of other terminals connected to the mobile terminal 100. FIG. 24 is a flowchart illustrating an operation of outputting an alarm when the alarm is set for the mobile terminal and at least one of other terminals according to an embodiment of the present disclosure as described above. Furthermore, in the following description of FIG. 24, it will be described on the assumption that when a user is carrying smart glasses 2010, a smart phone 2000, a smart watch 2020, and a tablet PC 2030 as illustrated in FIG. 20, the terminals 2010, 2000, 2020, 2030 are connected by forming a network such as a BAN.

Referring to FIG. 24, when connected to at least one of other terminals, the controller 180 of the mobile terminal 100 according to an embodiment of the present disclosure may share alarm information set for the terminal itself and the at least one of other terminals with the at least one of other terminals connected thereto (S2400). Here, the shared alarm information may include information on an alarm time, information on the type of the alarm, audio information corresponding to the alarm, and information on a vibration mode.

In addition, the controller 180 of the mobile terminal 100 may check a current time to check whether the current time matches one of the alarm times set for the terminal itself and other terminals 2020, 2020, 2030 (S2402). Furthermore, as a result of the check in the step S2402, when the current time matches an alarm time set for any one of the terminals 2010, 2000, 2020, 2030, the controller 180 may recognize it as an event in which an alarm output has occurred.

In this case, the controller 180 may determine whether the mobile terminal 100 is in a state capable of outputting the alarm based on a result of sensing the operation state and surrounding environment of the mobile terminal 100. Furthermore, when the terminal is in a state capable of outputting the alarm, the controller 180 may detect another terminal in a state of capable of outputting an alarm, and select the another terminal or the mobile terminal 100 as a terminal to output the alarm based on the detected result (S2404).

In the step S2404, the controller 180 may select a terminal to output the alarm based on various conditions. For example, the step S2404, similarly to the step S2104 or step S2202 in FIG. 21, may be a process of selecting any one terminal based on at least one of an operation state such as whether other terminals connected to the mobile terminal 100 are in a wake-up state or in a sleep mode and a result of sensing a surrounding environment such as a state of being worn or gripped by a user. In addition, the step S2404 may be a process of selecting any one terminal according to a type of application currently being executed on the terminals 2010, 2000, 2020, 2030, or a type of event, namely, a type of alarm.

On the other hand, when any one terminal is selected as a terminal to output alarm information in the step 2404, the controller 180 may check whether the mobile terminal 100 is selected as a terminal to output alarm information (S2406). Furthermore, as a result of the check during the S2406, when the terminal itself (mobile terminal 100) is selected as a terminal to output an alarm, the controller 180 may output an alarm based on a type of alarm matched to a current time, and audio information or vibration set to correspond to the alarm (S2408). Here, when it is determined that outputting the alarm according to audio information or vibration mode set to correspond to the alarm is not appropriate, the controller 180 may output the alarm according to preset audio information or vibration mode. For example, when the sound source data corresponding to the audio information set to correspond to the alarm is not stored in the memory 170 or when it is not possible to output vibration according to the vibration mode, the controller 180 may determine that outputting an alarm according to audio information or vibration mode set for the alarm is not appropriate.

On the other hand, as a result of the check in the step S2406, when the mobile terminal 100 is not selected as a terminal to output the alarm, the controller 180 may proceed to the step S2402 again without outputting an alarm to check whether or not there is an alarm of another terminal matching a current time. Accordingly, when not selected as a terminal to output an alarm, the alarm may not be output even when the alarm is set for the mobile terminal 100, and the alarm may be output from another terminal selected for outputting the alarm. Accordingly, even if there is an alarm set for the mobile terminal 100, according to the present disclosure, an alarm set for the mobile terminal 100 may be output through another terminal according to various conditions such as the operation state and surrounding situation.

Meanwhile, the mobile terminal 100 according to an embodiment of the present disclosure and other terminals connected to the mobile terminal 100 may sense a user's biological signal as an environment around the mobile terminal, and exchange information associated with a user's physical condition determined based on the sensed user's biological signal with each other.

In this case, the mobile terminal 100 and the at least one of other terminals may select a terminal to output notification information for notifying a user of the occurrence of an event based on the determined user's physical condition.

Figure 25:
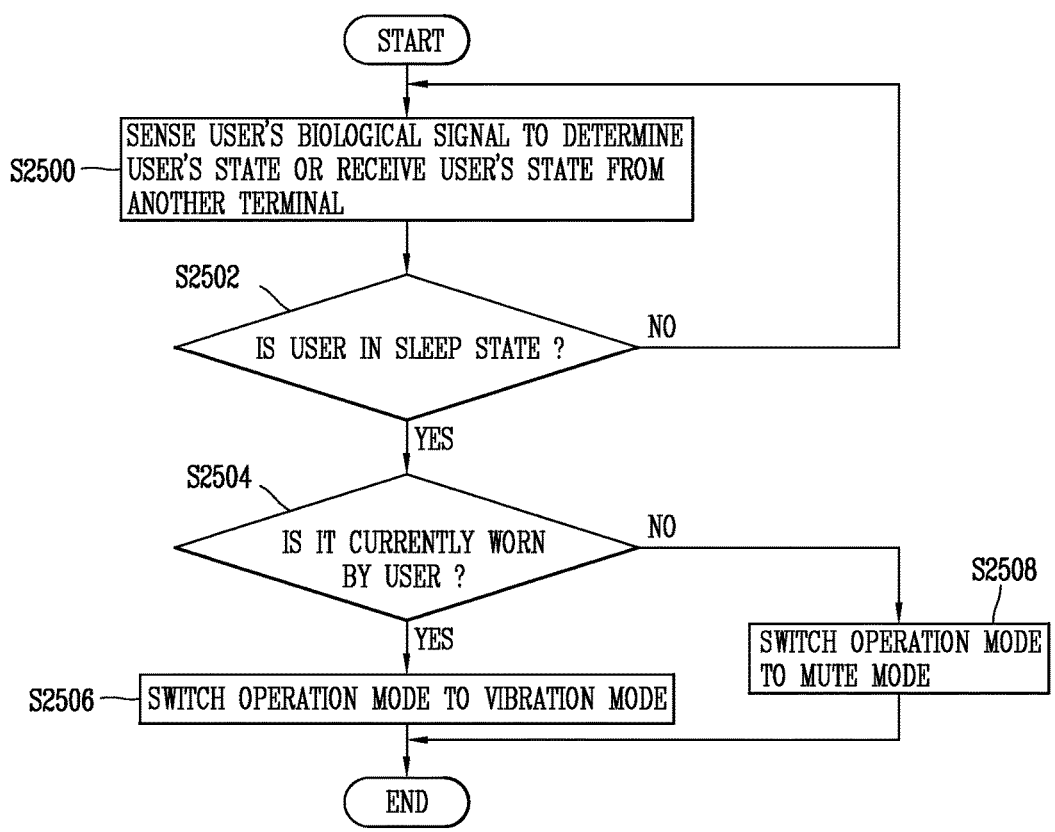
FIG. 25 is a flowchart illustrating an operation of switching an operation mode using a result of sensing or receiving a user's state in a mobile terminal associated with an embodiment of the present disclosure.

FIG. 25 illustrates an operation process of selecting a terminal to output notification information based on a result of determining a user's physical condition in the mobile terminal 100 and at least one of other terminals according to an embodiment of the present disclosure. Hereinafter, the following description of FIG. 25 will be made on the assumption that, when a user's physical condition enters a sleep state for the sake of convenience of explanation, a terminal to output notification information is selected based on that condition. However, it may be merely an example of the present disclosure, and the present disclosure may not be necessarily limited to this. In other words, the present disclosure may be applicable not only to a case where a user enters a sleep state but also to a state where the user enters another state, and a terminal to output notification information may be selected based on a changed user's physical condition.

Referring to FIG. 25, the controller 180 of the mobile terminal 100 according to an embodiment of the present disclosure may sense a user's biological signal to determine a user's physical condition. Alternatively, the controller 180 may receive information on the user's physical condition from another terminal (S2500). Furthermore, the controller 180 may determine whether the user's physical condition has entered a specific state (e.g., sleep state) using the determined result or information received from the another terminal.

If it is determined that the user's state is in a sleep state in the step S2500 as a result of allowing the controller 180 to sense the user's biological signal, the step S2502 may further include a process of allowing the controller 180 to transmit information indicating that the user's state has entered a sleep state to at least one of other terminals connected thereto. However, when the controller 180 receives information indicating that the user has entered a sleep state from another terminal, information for notifying the user's sleep state may not be transmitted to the another terminal.

On the other hand, when it is determined that the user enters a sleep state in the step S2502, the controller 180 may select a terminal to output notification information based on the determined user's physical condition, namely, sleep state. For example, when the user is in a sleep state, the controller 180 may select a terminal worn by the user as a terminal to output notification information.

In this case, the controller 180 may determine whether the mobile terminal 100 is currently worn by the user (S2504). Based on the determination result in the step S2504, the controller 180 may determine whether the mobile terminal 100 is suitable as a terminal to output the notification information. In other words, when the user is in a state of wearing the mobile terminal 100 as a result of the determination in the step S2504, the controller 180 may determine that the mobile terminal 100 is suitable as a terminal to output the notification information. However, if it is determined that the user is not in a state of wearing the mobile terminal 100 in the step S2504, the controller 180 may determine that the mobile terminal 100 is not a terminal to output the notification information.

In this case, according to the present disclosure, notification information may be output only through a terminal selected as a terminal to output the notification information for notifying the occurrence of an event, namely, a terminal worn by a current user. Furthermore, the controller 180 may output a preset vibration in consideration of the fact that the user is in a sleeping state to display the occurrence of the event. In this case, when the mobile terminal 100 is selected as a terminal to output notification information, the controller 180 of the mobile terminal 100 may switch the operation mode to a vibration mode (S2506). On the contrary, when the mobile terminal 100 is not selected as a terminal to output notification information, namely, when it is not in a state of being worn by the user in the step S2504, the controller 180 may switch the operation mode of the mobile terminal 1000 to a mute mode (S2508).

On the other hand, according to the foregoing description, it has been mentioned that the event may include a case where an alarm occurs. In this case, the mobile terminal 100 according to an embodiment of the present disclosure may recognize the occurrence of the alarm as an event according to a preset condition to further select another terminal connected thereto as a terminal to output the alarm.

Figure 26:
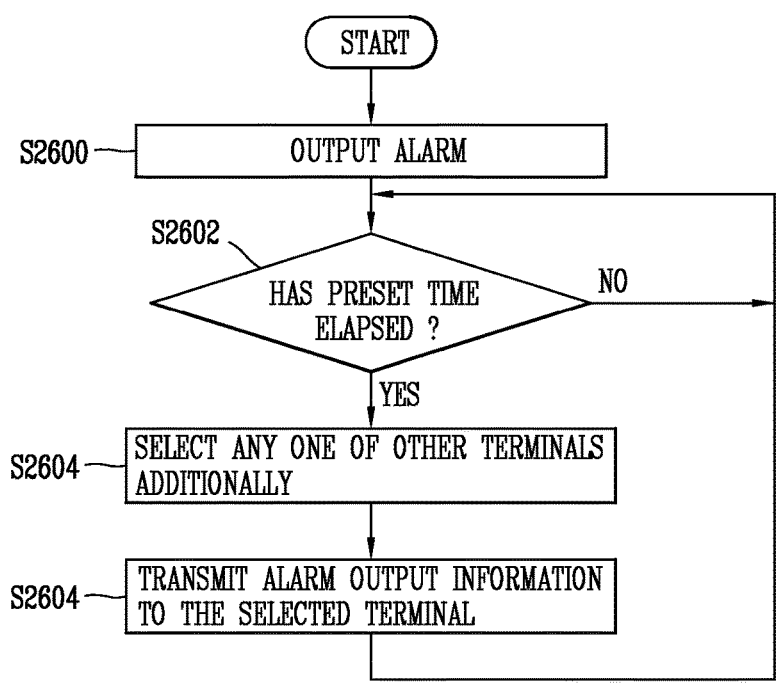
FIG. 26 is a flowchart illustrating an operation of outputting an alarm by further using at least one of other terminals when the alarm is output in a mobile terminal associated with an embodiment of the present disclosure.

FIG. 26 is a flowchart illustrating an operation of outputting an alarm using at least one of other terminals in a mobile terminal according to an embodiment of the present disclosure in such a case.

Referring to FIG. 26, the controller 180 of the mobile terminal 100 according to an embodiment of the present disclosure may output an alarm when a current time matches a preset alarm time (S2600). Furthermore, the controller 180 may check an elapsed period of time since the alarm is output (S2602).

Furthermore, as a result of checking the period of time during step S2602, when there is no acknowledgment of the alarm being currently output from the user even though a preset period of time elapses, the controller 180 may select any one of the at least one of other terminals connected thereto as a terminal to output the alarm information (S2604). In the step S2604, as a result of measuring a distance between other terminals currently connected thereto, the controller 180 may preferentially select a terminal located closest to the terminal or preferentially select a terminal that is worn or gripped by the user among the terminals.

In addition, the controller 180 may transmit information associated with an alarm currently being output to the selected terminal (S2606). In this case, another terminal that has received the alarm output information may simultaneously or sequentially output an alarm together with the mobile terminal 100.

Meanwhile, in the step S2602, the controller 180 may sense whether there is a user's acknowledgement until a preset time elapses. When there is an acknowledgment from the user in the step S2602, the controller 180 may transmit information associated with the user's acknowledgement to another terminal to which the alarm output. Then, the mobile terminal 100 and other terminals to which the alarm is output may terminate the output of the alarm.

Furthermore, the step S2602 may be a process of checking whether or not information associated with the user's acknowledgement is received from another terminal to which a current alarm is output within a preset time. Furthermore, when information associated with the user's acknowledgement is received from another terminal that outputs the alarm information, the controller 180 may terminate the output of the alarm.

However, when it is determined in the step S2602 that there is no user's acknowledgement within a preset period of time, or information associated with the user's acknowledgement is not received from another terminal, the controller 180 may proceed again to the steps S2604 and S2606. In this case, a number of terminals to which an alarm is output may increase through the steps S2604 and S2606 whenever a preset period of time elapses, and when the user does not continuously acknowledge the alarm information, all the terminals connected to the mobile terminal 100 may output the alarm.

Figure 27:
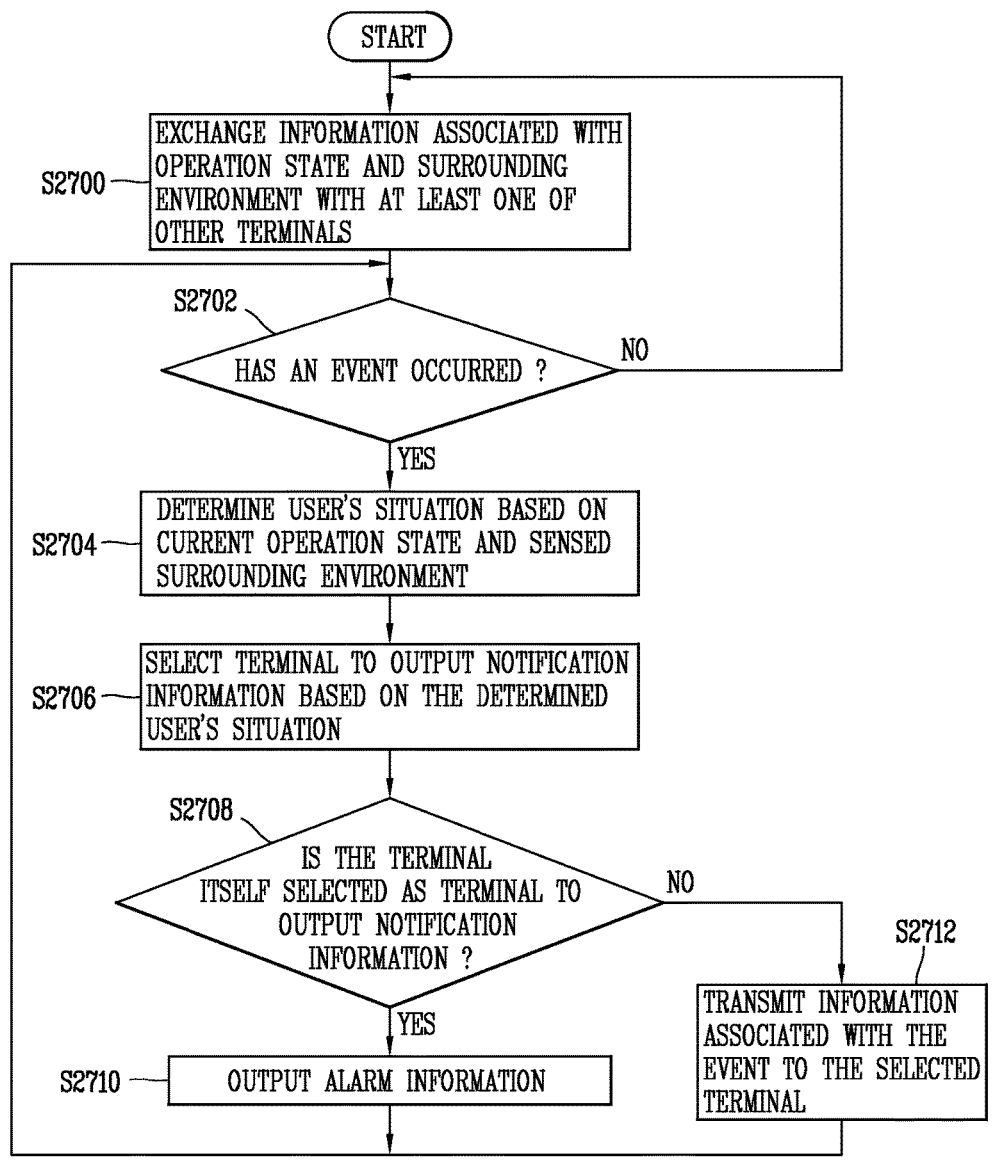
FIG. 27 is a flowchart illustrating an operation of allowing either one of a mobile terminal or at least one of other terminals to output notification information based on a user's situation in a mobile terminal associated with an embodiment of the present disclosure.

Meanwhile, according to the foregoing description, according to the present disclosure, a surrounding environment may be sensed to determine the user's situation, and any one of the mobile terminal or other terminals connected thereto may be selected as a terminal to output notification information based on the determined user's situation. FIG. 27 is a flowchart illustrating an operation process of outputting notification information from any one of the mobile terminal or at least one of other terminals based on a user's situation in a mobile terminal associated with an embodiment of the present disclosure in such a case.

Referring to FIG. 27, the controller 180 of the mobile terminal 100 according to an embodiment of the present disclosure may be connected to at least one of other terminals based on various conditions such as selection of a user, Information associated with the operation state and information perceiving the surrounding environment may be exchanged (S2700).

In this case, the controller 180 may determine whether an event has occurred (S2702). Furthermore, when an event occurs, the user may determine the user's current state in consideration of the current operation state of the mobile terminal 100 and the sensed surrounding environment (S2704).

For example, the controller 180 may determine the user's situation based on the user's position as a result of considering the surrounding environment. In other words, when it is sensed that the user is getting on a preset vehicle or the user is at a specific position (e.g., driver's seat) of the vehicle, the controller 180 may determine that the user is currently driving the vehicle. Alternatively, when a region in which the user is currently located is a region preset by the user (e.g., a conference room), the controller 180 may determine the user's situation based on the region (e.g., during a conference).

Alternatively, the controller 180 may determine the user's situation by various operation states such as an application being driven or the like. For example, the controller 180 may refer to a schedule application to check the schedule of the user corresponding to a current time, and determine the current user's state based on the checked schedule. Alternatively, the controller 180 may determine the situation of the user when a specific application (guide application of an art gallery or a museum) is executed.

When the user's situation is determined in the step S2704, the controller 180 may select any one of the mobile terminal 100 or at least one of other terminals as a terminal to output the notification information based on the determined user's situation (S2706).

For example, when the user is wearing a terminal (e.g., HMD, smart glasses, or headphone type terminal) that is worn on his or her head while the user is driving a vehicle, the controller 180 may select the terminal as a terminal to which the notification information is output. Alternatively, there is a terminal provided in the vehicle (carkit type), the carkit type terminal may be selected as a terminal to which the notification information is output. Alternatively, as a result of the user's situation, when the user is in a meeting or in a situation where the output of audio information is restricted such as an art gallery or museum, the controller 180 may select the terminal that is worn by the user as a terminal for outputting notification information to output the notification information as a vibration. In this case, the selected terminal may of course automatically switch the operation mode to a vibration mode based on the sensed user's situation.

On the other hand, when a specific terminal is selected as a terminal to output notification information in the step S2706, the controller 180 checks whether or not the mobile terminal 100 is selected as a terminal to output the notification information (S2708). Furthermore, when the mobile terminal 100 is selected as a terminal to output notification information, the controller 180 may output the notification information based on the user's situation determined in the step S2704 (S2110). Accordingly, the notification information may be output through a terminal mounted on the user's head or through a speaker provided in a vehicle (a situation where the user drives the vehicle). Alternatively, the notification information may be output in a vibration mode through a terminal such as a smart watch worn by the user (when the user is in a meeting).

However, as a result of the check in the step S2708, when the mobile terminal 100 is not selected as a terminal to output notification information, namely, when another terminal is selected, the controller 180 may transmit information associated with an event currently occurring in the mobile terminal 100 to the another terminal selected in the step S2708. In this case, the terminal that has received the information associated with the event may output notification information based on the user's situation determined in the step S2704 based on the received information. Accordingly, according to the present disclosure, based on a result of determining the user's situation, information associated with an event occurring on the terminal and another terminal used by the user may be output from any one terminal suitable for the user's situation. Furthermore, when the user checks the output notification information, the checked information may be transmitted to a terminal that has sensed the occurrence of the event, and as a result, the relevant terminal may recognize that the event has been checked by the user.

Meanwhile, according to the foregoing description, it has been described that a terminal that is currently in an available state or currently used by the user using information exchanged with each other or a terminal most suitable for outputting notification information based on a current operation state or the user's current situation is automatically selected as an example, but, on the contrary, the user may of course previously designate one of the mobile terminal 100 or another terminal connected to the mobile terminal 100 as a terminal to output the notification information. In this case, the controller 180 of the mobile terminal 100 according to an embodiment of the present disclosure may output notification information corresponding to the occurred event (in case of a predesignated terminal) or transmit the notification information to another terminal (in case of not a predesignated terminal).

On the other hand, the user may of course designate different terminals according to the types of events. For example, in case of incoming of a call, the user may previously designate a smart phone as a terminal to output notification information in case of the occurrent of an incoming call event, and in case of reception of a message, the user may previously designate a smart phone as a terminal to output notification information in case of the occurrent of a message reception event. In this case, the controller 180 may determine whether or not there is a predesignated terminal corresponding to the event according to the type of the currently occurred event. Then, the controller 180 may output notification information to a specific terminal according to the determination result, or output the notification information to any one terminal selected as a result of considering an operation state, a surrounding environment state, and the user's situation or the like.

On the other hand, according to the foregoing description, an operation process of the mobile terminal 100 according to an embodiment of the present disclosure has been described in detail with reference to a flowchart.

Hereinafter, an example in which the mobile terminal and at least one of other terminals according to an embodiment of the present disclosure select a terminal to output notification information on an occurred event, and output the notification information to the selected terminal will be described in detail.

FIGS. 28 through 31 are exemplary views illustrating an example in which notification information is output from either one of a mobile terminal associated with such an embodiment of the present disclosure and at least one of other terminals selected based on an operation state and a surrounding environment. In the following description, it will be described on the assumption that a smart phone 2000, a smart watch 2020, and a tablet PC 2030 are connected to one another for the sake of convenience of explanation as well as on the assumption that an event 2800 occurs on the smart phone 2000.

Figure 28:
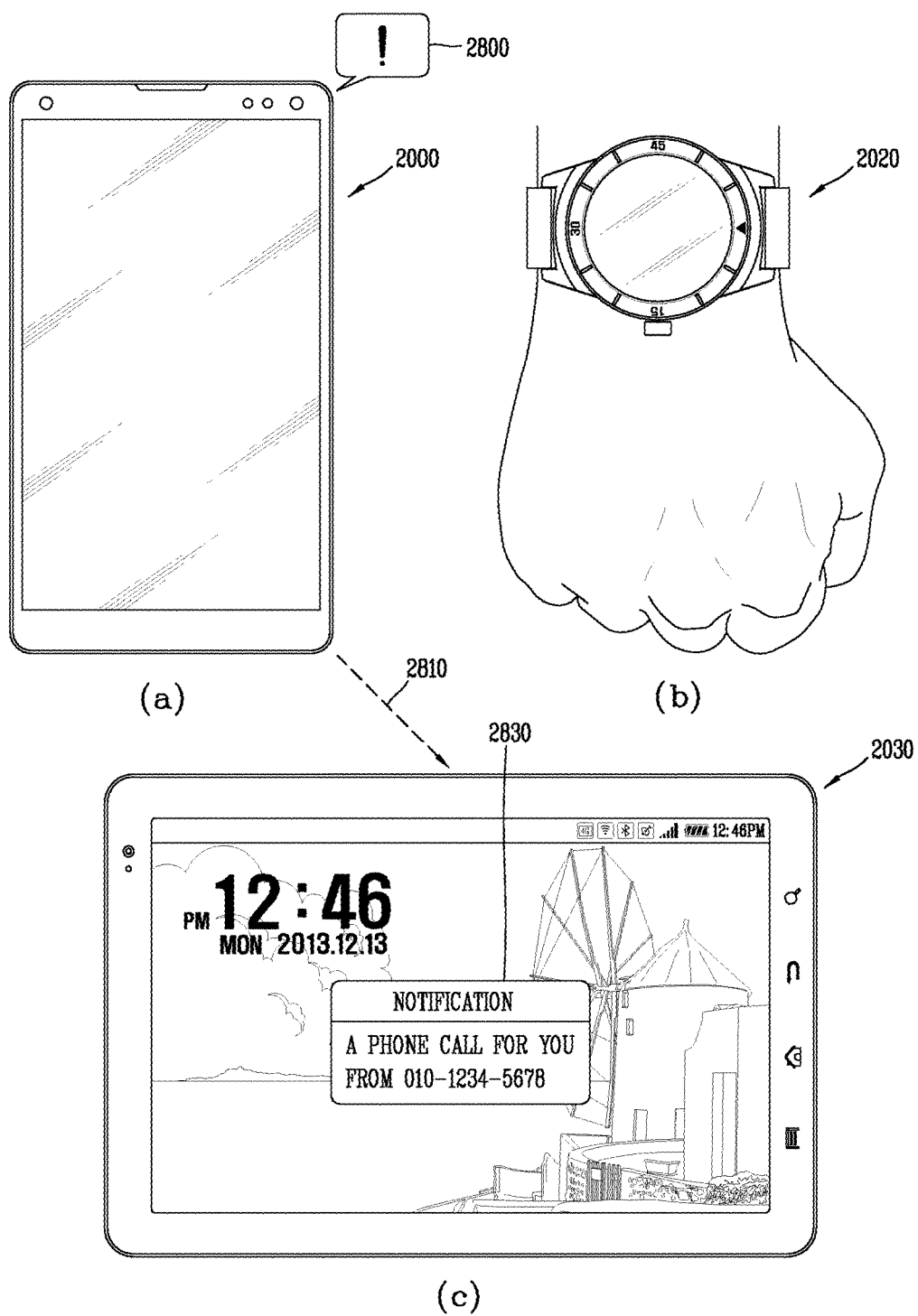

First of all, FIG. 28 illustrates an example in which notification information is output from any one of the terminals based on the operation states of the terminals 2000, 2020, 2030 when an event 1300 occurs.

Referring to FIG. 28, when an event 2800 occurs on the smart phone 2000, the controller of the smart phone 2000 may determine whether or not the smart phone 2000 is in an available state. Here, a criterion for determining availability is whether the current operation state is a wake-up state or a sleep mode state.

Accordingly, the controller of the smart phone 2000 that has sensed the occurrence of the event 2800 checks whether the current operation state of the smart phone 2000 is a wake-up state or a sleep mode state. Furthermore, as illustrated in FIG. 28A, when the smart phone 2000 is in a sleep mode state, the controller of the smart phone 2000 may determine that the smart phone 2000 is not in an available state, and accordingly, select any one of the other terminals 2020, 2030 to output notification information on the occurred event.

In this case, the controller of the smart phone 2000 may select a terminal to output the notification information based on the current operation states of the terminals 2020 and 2030. It is because, in case of a terminal currently in a wake-up state, it is highly likely a terminal currently used by the user. Therefore, when only one tablet PC 2030 is operating in a wake-up state as illustrated in FIGS. 28B and 28C, the controller of the smart phone 2000 may transmit information associated with the occurred event to the tablet PC 2030 (2810). Accordingly, the tablet PC 2030 may output notification information 2830 corresponding to the event occurred on the smart phone 2000.

On the other hand, when there are a plurality of terminals in a wake-up state, the smart phone 2000 may select a terminal to output the notification information based on a surrounding environment state, for example, whether the user is wearing or gripping, in addition to an operation state.

For example, when not only the tablet PC 2030 but also the smart watch 2020 are both in a wake-up state, the controller of the smart phone 2000 may search a terminal that is worn or gripped by the user among terminals currently operating in a wake-up state. Here, information on whether or not it is worn or gripped by the user may be collected from the other terminals 2020, 2030 prior to or subsequent to the occurrence of an event or according to the user's selection or based on a preset condition such as a preset time, and the like through a BAN or the like.

Accordingly, the smart watch 2020 in a state of currently being worn by the user may be selected in preference to the tablet PC 2030 that is not gripped by the user, and as a result, the controller of the smart phone 2000 may transmit information associated with the occurred event 2800 to the smart watch 2020 (2810). As a result, as illustrated in FIG. 29B, the smart watch 2020 may output notification information 2830 corresponding to the event occurred on the smart phone 2000.

On the other hand, when the smart phone 2000 is in a wake-up state and gripped by the user, and the event 2800 occurs on the smart phone 2000, the controller of the smart phone 2000 may determine that the smart phone 2000 is in an available state. Furthermore, the controller may select the smart phone 2000 as a device to output notification information on the occurred event. In this case, the event occurred on the smart phone 2000 may be output through the output unit of the smart phone 2000.

On the other hand, according to the present disclosure, it has been mentioned that whether or not to be selected as a terminal to output notification information can be determined based on the type of a currently executed application as well as a result of sensing an operation state or a surrounding environment of terminals. Here, information on an application being executed on the terminals 2000, 2020, 2030 may be collected from other terminals 2020, 2030 through a BAN or the like based on a preset condition.

FIG. 30 illustrates an example of such a case.

Referring to FIG. 30, FIG. 30 illustrates an example in which not only the smart phone 2000 on which the event 2800 occurs, but also the smart watch 2020 and the tablet PC 2030 are all operating in a wake-up state. Furthermore, it is shown an example in which the smart phone 2000 is being gripped by a user, and the smart watch 2020 is being worn by a user. In this case, the controller 180 of the smart phone 2000 that has sensed the occurrence of the event 2800 may select either one of the smart phone 2000 and smart watch 2020 that are gripped or worn by the user as a terminal to be output notification information corresponding to the event 2800.

In this case, the controller of the smart phone 2000 may select a terminal to output the notification information based on an application currently executed on the smart phone 2000 or smart watch 2020 as described above. In this case, the controller of the smart phone 2000 may check whether the applications executed on the smart phone 2000 and smart watch 2020 are the types of applications predesignated by the user. For example, the user may previously designate an application associated with a video or a game, and a terminal on which the predesignated application is executed may not be selected as a terminal to which the notification information is output. In such a case, a state in which the user is immersed in content such as a movie or a game may not be disturbed by the notification information.

Accordingly, when the predesignated application is an application for playing back video content, in case where the video content is played back on the smart phone 2000 as illustrated in FIG. 30 (a), the controller of the smart phone 2000 may not select the smart phone 2000 as a terminal to which the notification information is output. As a result, the controller of the smart phone 2000 may transmit information associated with a currently occurred event to the smart watch 2020, and in this case, as illustrated in FIG. 30B, notification information corresponding to the event may be output from the smart watch 2020.

Meanwhile, even when a specific application is being executed as described above, the controller of the smart phone 2000 may further evaluate the importance of the currently occurred event, and output notification information corresponding to the event based on the evaluated importance a terminal on which the specific application is executed. It is because when a specific application is pre-designated to prevent the user's immersed state from being disturbed by the notification information, a possibility that the terminal on which the application is running is being used by the user may be higher.

In this case, a terminal that has sensed the occurrence of the event, namely, the controller of the smart phone 2000 may further evaluate the importance of a currently occurred event. For example, the controller may evaluate the importance based on the type of the currently occurred event, and when the event includes text (e.g., a message), the importance may be evaluated based on words included in the text. Alternatively, when the currently occurred event is an incoming call, the importance may be evaluated based on the caller's phone number. As described above, a criterion for evaluating the importance of the event may be preset by the user, and changed by the user as much as possible.

Accordingly, when it is determined that the importance level of the currently occurred event is above a preset level, the controller of the smart phone 2000 may allow a terminal on which the application predesignated by the user is executed to output notification information for notifying the occurrence of the event. As a result, when video content is played back on the smart phone 2000 as illustrated in FIG. 31A, the smart phone 2000 that has sensed the occurrence of the event, namely, the controller of the smart phone 2000, may output notification information on an event currently occurred on the smart phone 2000.

Meanwhile, according to the foregoing description, according to the mobile terminal 100 according to an embodiment of the present disclosure, it has been mentioned that any one of the mobile terminal and other terminals connected thereto can be selected in advance as a terminal to output notification information by the user.

Figure 32A:
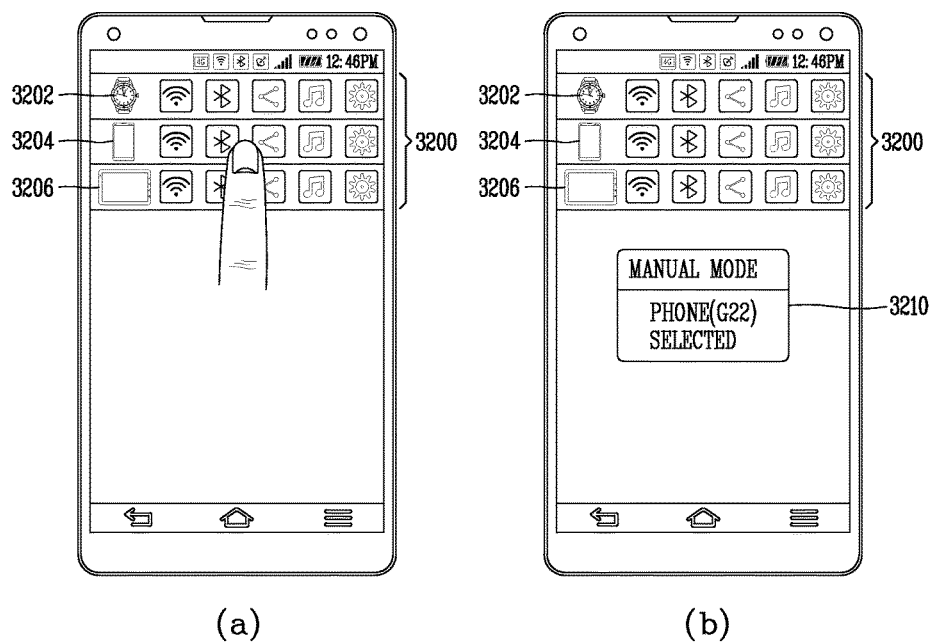
FIGS. 32A and 32B are exemplary views illustrating an example in which a terminal to output notification information is selected in advance by a user in a mobile terminal associated with an embodiment of the present disclosure.
Figure 32B:
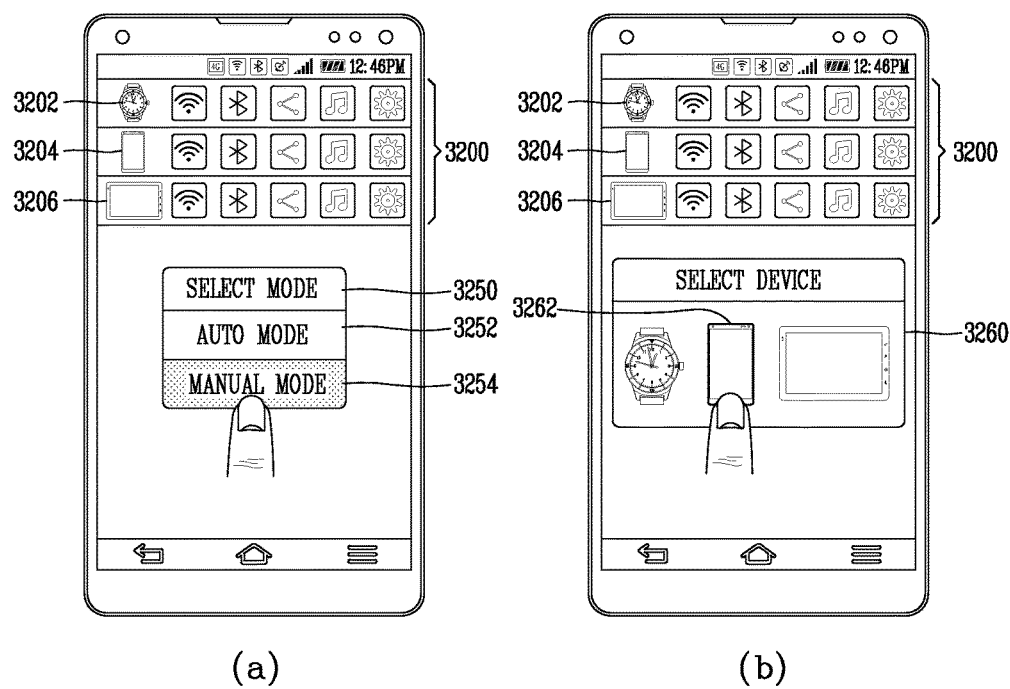

FIGS. 32A and 32B are exemplary views illustrating an example in which a terminal to output notification information is selected in advance by a user in a mobile terminal associated with an embodiment of the present disclosure.

First, referring to FIG. 32A, a mobile terminal according to an embodiment of the present disclosure may display information associated with other terminals currently connected to the mobile terminal 100 based on the user's selection. In this case, as illustrated in FIG. 32A(a), the graphic objects 3202, 3204, 3206 corresponding to the currently connected terminals, respectively, and information 3200 on functions currently being executed on the respective terminals may be displayed on at least part of the display unit 151 of the mobile terminal 100.

In this state, the user may directly select any one of the terminals. For example, as illustrated in FIG. 32A(a), when the user selects any one of the graphic objects 3202, 3204, 3206 corresponding to the currently connected terminals, respectively, the controller 180 may select a specific terminal selected by the user as a preset terminal to output notification information. In this case, as illustrated in FIG. 32A(b), when an event occurs, the controller 180 may display information 3210 on a terminal predesignated to output notification information corresponding to the event on the display unit 151.

In this case, the controller 180 may transmit information on a terminal currently selected by the user to other terminals connected thereto. Accordingly, the user may merely select a specific terminal through one mobile terminal 100 to allow the specific terminal to be selected as a terminal to output notification information on all the other terminals connected thereto. As a result, when an event occurs on the mobile terminal 100 and other terminals connected to the mobile terminal 100, notification information corresponding to the event may be output from any one terminal selected by the user.

On the other hand, FIG. 32B illustrates an example in which a terminal to which notification information is output is selected in a different manner from that of the foregoing description.

For example, as illustrated in FIG. 32B(a), the controller 180 of the mobile terminal 100 may allow the user to select whether to automatically select a terminal to output the notification information (auto mode: 3252) or whether notification information is output only from a specific terminal selected by the user (manual mode: 3254) through a selection menu 3250.

Here, when the auto mode 3252 is selected, the controller 180 may select a terminal to which notification information is output based on a result of sensing the operation states or surrounding environments of the mobile terminal 100 and other connected terminals connected thereto, an application being executed or the like. However, on the contrary, when the manual mode 3254 is selected, the controller 180 may display a menu screen 3260 for selecting a specific terminal on the display unit 151 as illustrated in FIG. B(b), and previously designate any one terminal 3262 selected by the user from the menu screen 3260 as a terminal to output notification information corresponding to an event when the event occurs. In this case, notification information corresponding to the event may be output only to the any one terminal 3262 designated by the user.

On the other hand, though not shown in the drawing, the user may of course output notification information from a specific terminal according to the type of the occurred event. In this case, the controller 180 may further display a selection screen capable of allowing the user to select the types of the events that can occur on the display unit 151. Furthermore, when the user selects at least one event type through the selection screen, as illustrated in FIGS. 32A and 32B, a screen for selecting a terminal to output notification information may be displayed on the display unit 151. In addition, if a specific terminal is designated by the user, when an event occurs, notification information may be output to the designated terminal according to the type of the occurred event.

Figure 33:
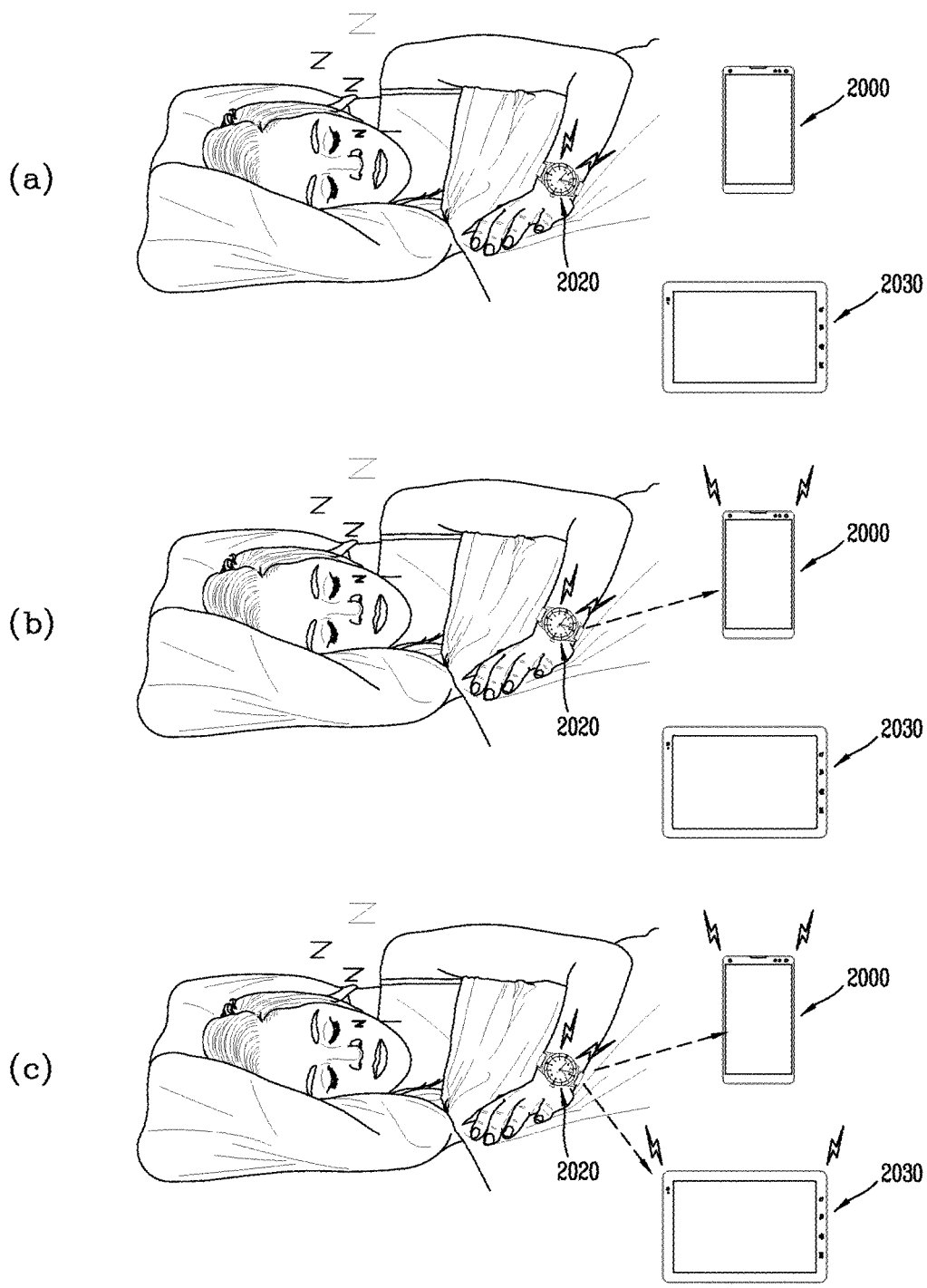
FIG. 33 is a view illustrating an example in which alarm information is output from a mobile terminal associated with an embodiment of the present disclosure and at least one of other terminals.

Meanwhile, it has been mentioned that a mobile terminal according to an embodiment of the present disclosure is able to output an alarm using at least one of other devices connected thereto when the alarm is output. FIG. 33 illustrates an example in which alarm information is output from the mobile terminal and at least one of other terminals according to an embodiment of the present disclosure in such a case.

Referring to FIG. 33, when a current time is matched to a preset alarm time, a first terminal (smart watch: 2020) may output an alarm with preset audio information or vibration as illustrated in FIG. 33A. In this case, the first terminal 2020 may transmit alarm information to any one terminal (smart phone (second terminal): 2000) connected thereto when a preset time has elapsed in a state that there is no user's acknowledgement for the output alarm to output the alarm information from the second terminal 2000.

In this case, as illustrated in FIG. 33B, alarms may be output from both the first terminal 2020 and the second terminal 2000. Furthermore, when an alarm is output from the second terminal 2000, the first terminal 2020 may sense again whether there is the user's acknowledgement on either one of the first terminal 2020 and the second terminal 2000 within a preset period of time. When the user's acknowledgement is not sensed on both the first terminal 2020 and the second terminal 2000, alarm information may be transmitted to another terminal (tablet PC (third terminal): 2030).

Accordingly, an alarm may be output from all of the first terminal 2020 and other terminals 2000, 2030 connected to the first terminal 2020, as illustrated in FIG. 33C. Furthermore, in this state, when the user checks an alarm output from any one of the terminals 2000, 2020, 2030 (e.g., when a touch input is applied), a terminal that has sensed the user's acknowledgement may transmit it to the other terminals. Accordingly, alarms output from all of the terminals 2000, 2020, 2030 may be concurrently terminated.

Figure 34:
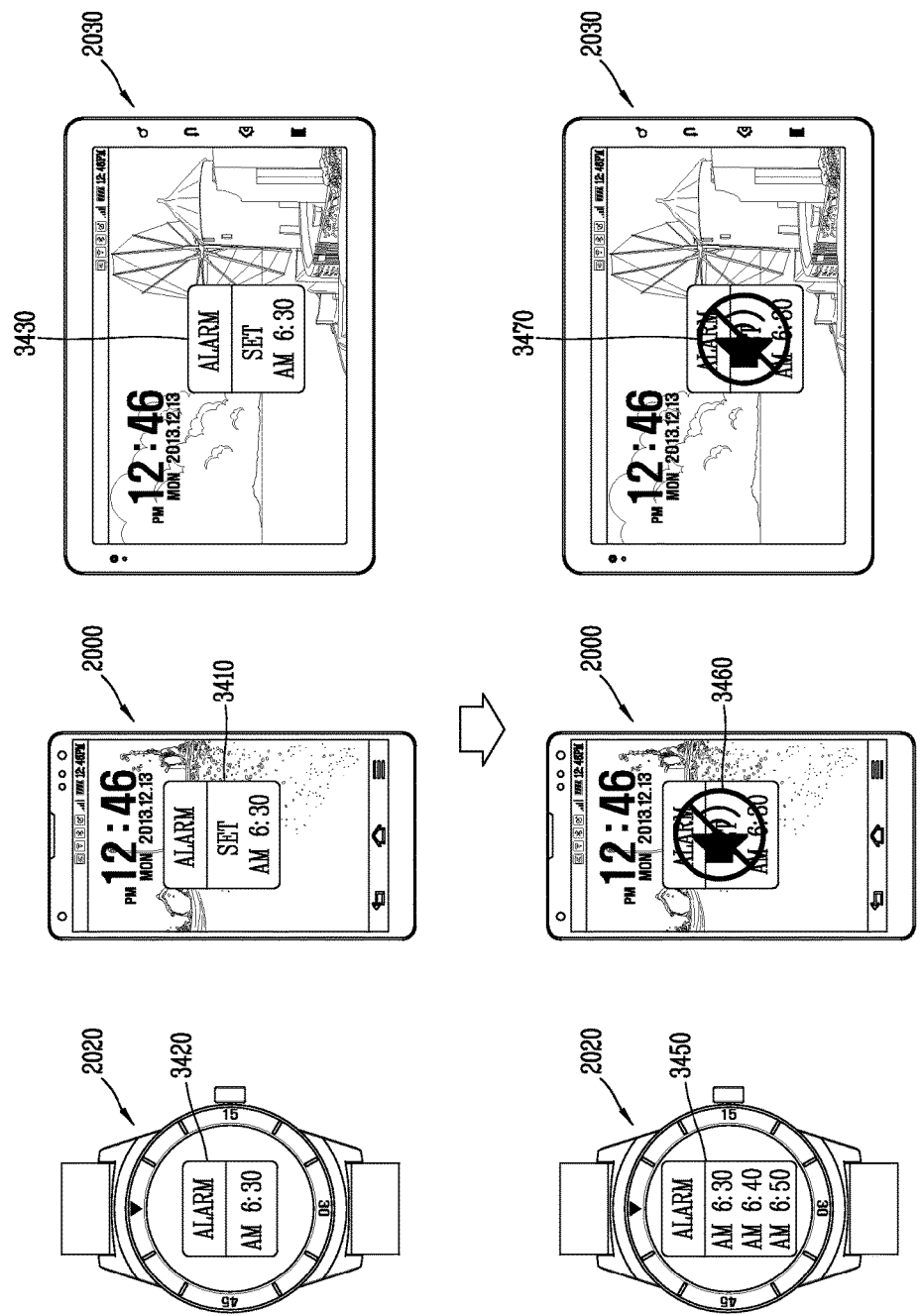
FIG. 34 is a view illustrating an example in which alarms set for a mobile terminal associated with an embodiment of the present disclosure and at least one of other terminals are output from any one terminal selected based on a preset condition.

According to the foregoing description, according to the present disclosure, it has been mentioned that when there are a plurality of terminals for which alarm information is set, alarm setting information may be shared and output from any one of the terminals. FIG. 34 is a view illustrating an example in which alarms set for a mobile terminal associated with an embodiment of the present disclosure and at least one of other terminals are output from any one terminal selected based on a preset condition. In the following description, for the sake of convenience of explanation, it will be described on the assumption that a smart watch, a smart phone, and a tablet PC are connected to one another.

For example, as illustrated in FIG. 34, when alarm information is set to different times on the smart watch 2020, the smart phone 2000, and the tablet PC 2030, according to the present disclosure, the set alarm information may be shared among the smart watch 2020, the smart phone 2000 and the tablet PC 2030. Here, the shared alarm information may include not only a time to which the alarm is set but also information on an output method (output audio information or vibration mode) of the alarm.

In this case, when the smart watch 2020 is selected as a device to which an alarm is to be output, alarm times set for a first alarm 3420 set on the smart watch 2020, a second alarm 3410 set on the smart phone 2030 and a third alarm 3430 set on the tablet PC 2030 may all be set. Accordingly, the smart watch 2020 may output alarms all at 06:30 AM set for the first alarm 3420, at 06:40 AM set for the second alarm 3410, and at 06:50 AM set for the third alarm 3430. Here, the output alarms may be of course output according to an alarm output mode (output audio information or vibration mode) set on the terminals 2020, 2000, 2030, respectively.

Furthermore, as illustrated in FIG. 34, when alarms set for the other terminals 2000, 2030 are output (3450) from any one terminal (e.g., smart watch 2020), the other terminals 2000, 2030 may not output alarms. In this case, as illustrated in FIG. 34, the terminals 2000, 2030 may operate in a mute mode (3460, 3470).

Meanwhile, according to the present disclosure, it has been mentioned that terminals are connected with one another using a BAN, but according to the present disclosure, terminal may be of course connected using a short-range connection mode as well as the BAN. In addition, if terminals are located at a distance that cannot be connected by a short-distance connection mode such as a BAN, they may be connected to one another using a wireless communication method such as WI-FI or ZigBee. Accordingly, even though a terminal is separated from the user by more than a predetermined distance, the user may check information on an event occurring on the terminal through a terminal currently used or worn or gripped by the user. In addition, when the user checks the event, acknowledgement information may be also transmitted to the terminal that is separated by more than a predetermined distance, thereby disallowing notification information to be output to the terminal.

On the other hand, according to the foregoing description, the mobile terminal 100 according to an embodiment of the present disclosure may be implemented in various forms such as smart glasses 2010, a smart watch 2020, a smart phone 2000, and a tablet PC 2030. The devices 2000, 2010, 2020, 2030 connected to one another terminal through a BAN may share various information with another terminal using the BAN. For example, the devices 2000, 2010, 2020, 2030 may transmit information associated with their operation states, namely, executable functions and information on currently executed functions to another device. Here, the information associated with the operation state may be information associated with a function predesignated by the user on any one of the devices. In other words, when the user selects functions for determining an operation state on any one of the devices 2000, 2010, 2020, 2030, the devices 2000, 2010, 2020, 2030 may share information on those functions with one another. Accordingly, when a preset condition is satisfied, the devices 2000, 2010, 2020, 2030 may transmit information on the execution or non-execution of the selected functions to other devices as information associated with the operation state. Furthermore, the devices 2000, 2010, 2020, 2030 may receive information associated with the operation state of the device and the operation states of other devices received by the device from the other devices.

Accordingly, even when information associated with an operation state is received only at one of the devices, the mobile terminal 100 according to an embodiment of the present disclosure may receive information on a function currently being executed on a device that has transmitted information associated with the operation state, and another device that has transmitted information associated with an operation state to the device that has transmitted the information or an executable function and the like. Furthermore, the controller 180 of the mobile terminal 100 according to an embodiment of the present disclosure may display a user interface screen including graphic objects for displaying at least part of functions executable on the other devices 2010, 2020, 2030 connected to a BAN and the mobile terminal 100, and the execution states of the functions. In the following description, for the sake of convenience of explanation, it will be described as an example in the mobile terminal 100 according to an embodiment of the present disclosure has the form of a smart phone.

Figure 35:
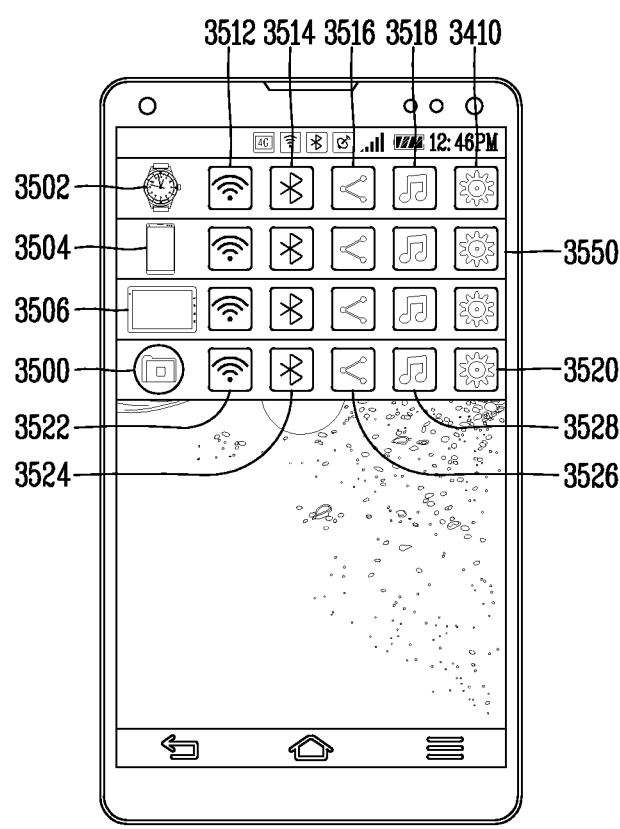
FIG. 35 is an exemplary view illustrating an example of displaying a user interface screen including information associated with functions and operation states of a plurality of terminals in a mobile terminal according to an embodiment of the present disclosure.

On the other hand, FIG. 35 is an exemplary view illustrating an example of displaying a user interface screen including information associated with functions and operation states of a plurality of terminals in a mobile terminal according to an embodiment of the present disclosure.

A user interface screen 3550 provided on the mobile terminal 100 according to an embodiment of the present disclosure may include graphic objects corresponding to at least one of devices connected to the mobile terminal 100 and functions executable on the mobile terminal. For example, when the smart watch 2020 and the tablet PC 2030 are currently connected to the mobile terminal 100 in the form of a BAN (Body Area Network), graphic objects corresponding to functions executable on the mobile terminal 100, the smart watch 2020 and the tablet PC 2030, and the execution states of the functions may be included in the user interface screen. Furthermore, the execution states of the functions may be shared among devices according to information exchanged among the mobile terminal 100, the smart watch 2020 and the tablet PC 2030 (information associated with operation states).

Accordingly, the user interface screen 3550 displayed on the mobile terminal 100 according to an embodiment of the present disclosure may be displayed as illustrated in FIG. 35.

In other words, the controller 180 of the mobile terminal 100 according to an embodiment of the present disclosure may display graphic objects corresponding to at least part of functions that are executable on currently connected devices 2020, 2030 and the mobile terminal 100 by grouping them for each device 100, 2020, 2030. Here, the executable functions may be functions preset by the user to determine the operation state of each of the devices. For example, these functions may be a WI-FI function, a Bluetooth function, a data sharing function, and a sound setting function. FIG. 35 illustrates an example in which graphic objects corresponding to the functions, respectively, are grouped by each device 100, 2020, 2030.

In other words, as illustrated in FIG. 35, graphic objects 3502, 3504, 3506 corresponding to the respective devices 100, 2020, 2030 may be displayed in different rows from each other, and the graphic objects corresponding to the respective functions may be separately displayed by respective rows. Furthermore, a graphic object associated with a function of editing graphic objects grouped by each device, namely, deleting any one of currently displayed graphic objects or adding a graphic object corresponding to another function, may further be displayed.

On the other hand, the positions of the respective devices on the user interface screen 3550 may be determined in a preset order. For example, the controller 180 may determine the positions according to an order preset from the user or a frequency or time at which the user uses a specific device. Alternatively, the controller 180 may display devices having the same or similar functions among the devices (e.g., in case of two or more smart phones) at positions adjacent to each other. Alternatively, the controller 180 may determine positions at which the devices and graphic objects corresponding to the respective devices are to be displayed using both a use frequency of the user and a type of the device (whether or not having the same or similar function).

Meanwhile, the graphic objects may correspond to respective functions that are executable on the respective devices 100, 2020, 2030. For an example, graphic objects 3510, 3512, 3514, 3516 displayed in the same row as the graphic object 3502 corresponding to the smart watch 2020 may be functions corresponding to functions that are executable on the smart watch 2020, respectively. Furthermore, the graphic object 3510 may be a graphic object for an edit function configured to add or delete functions to be displayed in a row corresponding to the smart watch 2020.

In addition, the graphic objects may be differently displayed depending on whether they are currently executed in the respective devices 100, 2020, and 2030. In other words, a currently executing function among the graphic objects may be displayed in a different color from the other graphic objects or displayed in a highlighted manner with a thicker line. Alternatively, the graphic object may be changed and displayed as an object having a different shape.

Meanwhile, in the mobile terminal 100 according to an embodiment of the present disclosure may provide a control menu 3500 capable of simultaneously controlling at least part of functions executable on the devices. The control menu 3500 may be displayed adjacent to the graphic objects grouped by the respective devices and displayed in a shape corresponding to the grouped graphic objects or displayed at a separate position in a different manner from the grouped objects.

Meanwhile, the control menu 3500 may be configured to include graphic objects associated with the predesignated functions on the mobile terminal 100 and at least one of other devices. Accordingly, graphic objects included in the control menu 3500 may be associated with functions that can be executed on both the mobile terminal 100 and the plurality of devices, and may correspond to commonly executable functions on the mobile terminal 100 and the plurality of devices.

For example, as described above, when a WI-FI function, a Bluetooth function, a data sharing function, and a sound setting function are predesignated functions on the mobile terminal 100, the smart watch 2020, and the tablet PC 2030, the control menu 3500 may include a graphic object 3522 corresponding to the WI-FI function, a graphic object 3524 corresponding to the Bluetooth function, a graphic object 3526 corresponding to the data sharing function, and a graphic object 3528 corresponding to the sound setting function.

In this case, the graphic objects 3522, 3524, 3526, and 3528 may be provided to control the corresponding functions on the mobile terminal 100, the smart watch 2020, and the tablet PC 2030, respectively. For example, the graphic object 3522 may be provided to simultaneously control the WI-FI functions of the mobile terminal 100, the smart watch 2020, and the tablet PC 2030, and the graphic object 2524 may be provided to simultaneously control the Bluetooth functions of the mobile terminal 100, the smart watch 2020, and the tablet PC 2030. Furthermore, the graphic object 3526 and the graphic object 3528 may be provide to simultaneously control the data sharing function and the sound setting function of the mobile terminal 100, the smart watch 2020, and the tablet PC 2030, respectively.

On the other hand, the graphic objects 3522, 3524, 3526, 3528 may be displayed according to the positions of the functions of the corresponding devices 100, 2020, 2030. For example, graphic objects included in the control menu 3500 may be displayed according to an order in which the respective functions are displayed on the devices 100, 2020, 2030.

Accordingly, as illustrated in FIG. 35, graphic objects corresponding to the control menu 3500 and functions that are executable on each device may be displayed in the same column for each function. In this case, graphic objects displayed in the respective columns on the user interface screen 3550 according to an embodiment of the present disclosure may be associated with the same function.

Meanwhile, an order in which the functions are displayed may be determined in various ways. For example, the functions may be determined according to an order or use degree preset by the user, namely, a number of times the function is controlled by the user, a number of times the function is executed, a time and the like.

Here, the control of the functions may be associated with an on/off function of the functions. In other words, when there is a user's touch input to the control menu, the controller 180 may turn on or off the functions of the mobile terminal 100, and other devices connected to the mobile terminal 100 corresponding to graphic objects displayed at a position where the touch input is sensed, namely, the smart watch 2020 and the tablet PC 2030.

Meanwhile, when the devices 2020, 2030 are connected thereto, the controller 180 may determine functions to be included in the control menu based on information received from the connected devices 2020, 2030. For example, the controller 180 may receive information associated with functions that are executable on each device from the connected devices 2020, 2030 to determine functions to be included in the control menu 3500 from the information. For example, the controller 180 may display information on executable functions received from the mobile terminal 100 on the display unit 151 to allow the user to select at least part of the functions. In this case, a graphic object corresponding to a function selected by the user may be included in the control menu 3500.

Meanwhile, graphic objects included in the control menu 3500 may be displayed in different shapes based on functions executed on the devices. In other words, when a specific function is being executed on all of the mobile terminal 100, the smart watch 2020, and the tablet PC 2030, the controller 180 may display a graphic object of the control menu 3500 corresponding to the specific function in an on state or an active state depending on the executed state. Alternatively, on the contrary, when a specific function is not being executed on all of the mobile terminal 100, the smart watch 2020 and the tablet PC 2030, a graphic object of the control menu 3500 corresponding to the specific function is in an off state or an inactive state. Here, the on or off state and the active or inactive state may be displayed with a different color, a different graphic object (e.g., a guide line) displayed around the graphic object, a change of shape, or the like.

On the other hand, when only part of the devices are in a state in which the specific function is being executed, the controller 180 may of course reflect that state to display graphic objects of the control menu 3500. For example, when the relevant function is executed on only part of the devices, the controller 180 may display a color of the graphic object of the control menu 3500 corresponding thereto in a different manner or display a depth of the color in a different manner. Alternatively, the controller 180 may of course display the specific function being executed only on part of the devices using a separate graphic object.

Furthermore, the control menu 3500 may further include a graphic object 3520 associated with a function for editing functions to be included in the control menu, namely, for adding a specific function or deleting a currently included function.

Meanwhile, the controller 180 may allow the user to select at least one control of functions executable on the mobile terminal 100 and other devices connected to the mobile terminal 100 through a user interface including graphic objects corresponding to functions executable for each device as described above and the control menu. For example, when the user selects one of graphic objects divided by each device (divided by each row), the controller 180 may transmit a control signal for controlling a function corresponding to the selected graphic object on only any one corresponding device. Here, the transmitted control signal may be transmitted directly to a specific device selected by the user, or may be transmitted via another connected device.

In addition, the controller 180 may allow a specific function to be controlled at the same time on the mobile terminal 100 and other devices connected to the mobile terminal 100 based on a user's touch input entered through the user interface. For example, when the user selects any one of graphic objects 3522, 3524, 3526, 3528 included in the control menu 3500, the controller 180 may transmit a control signal for controlling a function corresponding to the selected graphic object to other devices connected to the mobile terminal 100 while at the same controlling the mobile terminal smart watch 100 according to the control signal. Accordingly, when a specific graphic object included in the control menu 3500 is selected by the user, a specific function corresponding to the selected graphic object may be executed at the same time on the mobile terminal and other devices (e.g., smart watch 2020, tablet PC 2030) or the execution thereof may be suspended.

Hereinafter, embodiments associated with a control method that can be implemented in a mobile terminal having the foregoing configuration will be described with reference to the accompanying drawings. It should be understood by those skilled in the art that the present disclosure can be embodied in other specific forms without departing from the concept and essential characteristics thereof.

Figure 36:
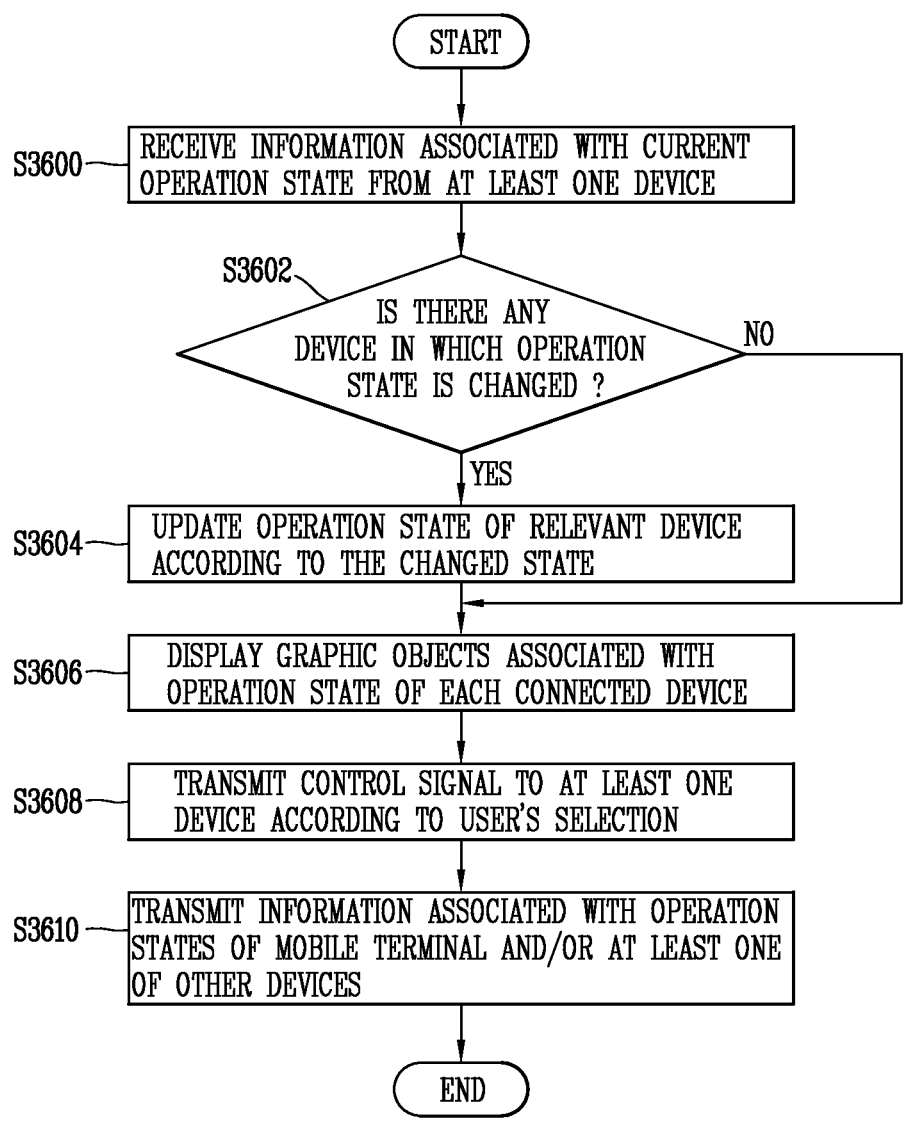
FIG. 36 is a flowchart illustrating an operation procedure of a mobile terminal according to an embodiment of the present disclosure.

FIG. 36 is a flowchart illustrating an operation procedure of a mobile terminal according to an embodiment of the present disclosure.

Referring to FIG. 36, in a state that at least one of other devices is connected to a BAN or the like, the controller 180 of the mobile terminal 100 according to an embodiment of the present disclosure may receive information associated with a current operation state of the device from the connected device (S3600). Here, the information associated with the operation state may include information associated with the execution or non-execution of at least part of functions executable on the relevant device. Here, the at least part of functions may be functions selected by the user through any one of the mobile terminal 100 or other devices connected to the mobile terminal 100. Furthermore, the step S3600 may include a process of sensing a current execution state of the at least part of functions on the mobile terminal 100.

Meanwhile, the other device may transmit information on the operation state of at least one of other devices collected by the terminal itself to the mobile terminal 100. In this case, the controller 180 may receive information associated with the operation states of a device currently connected to the mobile terminal 100 as well as other devices collected by the device in the step S3600.

On the other hand, when information associated with the operations states of at least one of other devices is collected during the S3600, the controller 180 may divide the collected information for each device. For example, when the mobile terminal 100 according to an embodiment of the present disclosure is connected to the smart watch 2020 and the tablet PC 2030 through a BAN, the controller 180 may receive information associated with the operation state of the smart watch 2020 and information associated with the operation state of the tablet PC 2030 collected by the smart watch 2020 from the smart watch 2020. Furthermore, similarly, the controller 180 may collect information associated with the operation states of the tablet PC 2030 and the smart watch 2020 from the tablet PC 2030. In this case, the controller 180 may divide the received information into information associated with the smart watch 2020 and information associated with the tablet PC 2030, respectively, and extract only one from the divided information, respectively. For example, the controller 180 may extract only the most recently received information among the received information.

In this case, the controller 180 may identify functions currently being executed on each of currently connected devices based on the extracted information. According to the identified result, the controller 180 may display the current operation state of each of the connected devices using a plurality of graphic objects. In other words, as illustrated in FIG. 35, the controller 180 may display functions executable on the respective devices for each device in a divided manner, and display a currently executed function among the functions in a different manner, thereby displaying functions currently being executed on the relevant device (S3606).

On the other hand, in the step S3606, the controller 180 may determine positions at which the devices are displayed on the user interface screen 3550 according to a preset order. For example, the controller 180 may determine the positions according to an order previously set by the user or a frequency or time when the user uses a specific device. Alternatively, the controller 180 may display devices having the same or similar functions among the devices (e.g., in case of two or more smart phones) at positions adjacent to each other. Alternatively, the controller 180 may determine positions at which the devices and graphic objects corresponding to the respective devices are to be displayed using both a use frequency of the user and a type of the device (whether or not having the same or similar function).

Meanwhile, if there is information on a prestored operation state of the relevant device, then the controller 180 may determine whether the operation state of the relevant device is changed from information extracted in the step S3600 (S3602). In this case, when there is a device whose operation state is changed, the controller 180 may update the operation state of the relevant device using the information extracted in the step S3600 (S3604). In this case, the step S3606 may be a process of changing only a graphic object corresponding to a function for which the changed operation state, namely, the execution state of the relevant device has been changed, for only the device whose operation state is changed among the mobile terminal 100 and the devices connected to the mobile terminal 100.

On the other hand, in the step S3606, the controller 180 of the mobile terminal 100 according to an embodiment of the present disclosure may generate a control menu capable of controlling at least one of the mobile terminal 100 and the devices connected to the mobile terminal 100 at the same time based on information associated with the operation states of the mobile terminal 100 and the devices connected to the mobile terminal 100. Furthermore, the controller 180 may display the user interface screen 3550 including graphic objects for displaying the generated control menu and the operation state of the respective devices. Hereinafter, an operation process of the step S3606 will be described in detail with reference to FIG. 37.

On the other hand, in the step S3606, when the operation states of the mobile terminal 100 and at least one of other devices are displayed, the controller 180 may execute a specific function on the mobile terminal 100 and the at least one of other devices according to the user's selection or suspend the specific function being executed.

For example, during step S3606, the controller 180 may transmit a control signal for controlling a specific function to all of the at least one of other devices, or transmit the control signal for controlling the specific function to only one of the at least one of other devices according to the user's selection. Furthermore, the user's selection for this purpose may be carried out by a user's touch input to graphic objects included in the user interface screen 3550. Hereinafter, an operation process of the step S3606 for transmitting a control signal to all of at least one of other devices or any one of the at least one of other devices according to the user's selection will be described below in more detail with reference to FIG. 38.

Meanwhile, the controller 180 may transmit information associated with a current operation state of the mobile terminal 100 to another device (S3610). For example, the controller 180 may transmit information associated with the operation state to another device according to various preset criteria. Here, the transmitted information may include information associated with at least one of other devices received or extracted in the step S3600 as well as information associated with the current operation state of the mobile terminal 100.

Meanwhile, the preset criteria may be an expiration of preset predetermined period of time, a user's selection, or a specific event. In this case, when a preset event such as when there is a user's selection or at intervals for a preset predetermined period of time or when a change of the operation state occurs, the controller 180 may transmit information associated with the operation states of a plurality of devices including the mobile terminal 100 to another device.

Here, the another device may be a device connected to the mobile terminal 100 through a BAN or the like. In other words, as illustrated in FIG. 35, at least one of the smart watch 2020, the tablet PC 2030, and the smart glasses may be the another device that receives information associated with the operation states from the mobile terminal 100.

Here, the controller 180 may not be required to transmit information associated with the operation states to all the other devices, and may of course transmit it to only one of the devices. However, in this case, information associated with the operation state of the mobile terminal 100 may be transmitted to all devices (e.g., smart watch 2020, tablet PC 2030, smart glasses 2010) connected thereto. It is because, as described above, a device that has received information from the mobile terminal 100 may propagate information associated with the operation state of the mobile terminal 100 to another device.

The propagation of such information may also be applied to a case where a new device is connected. Therefore, according to the present disclosure, even when a new device is connected to only one of currently connected devices, information on the device may be propagated to other devices connected thereto. Accordingly, even when the device is not directly connected to the newly connected device, according to the present disclosure, the user may check functions executable on the newly connected device and the operation state of the newly connected device, and control a function of the newly connected device.

Figure 37:
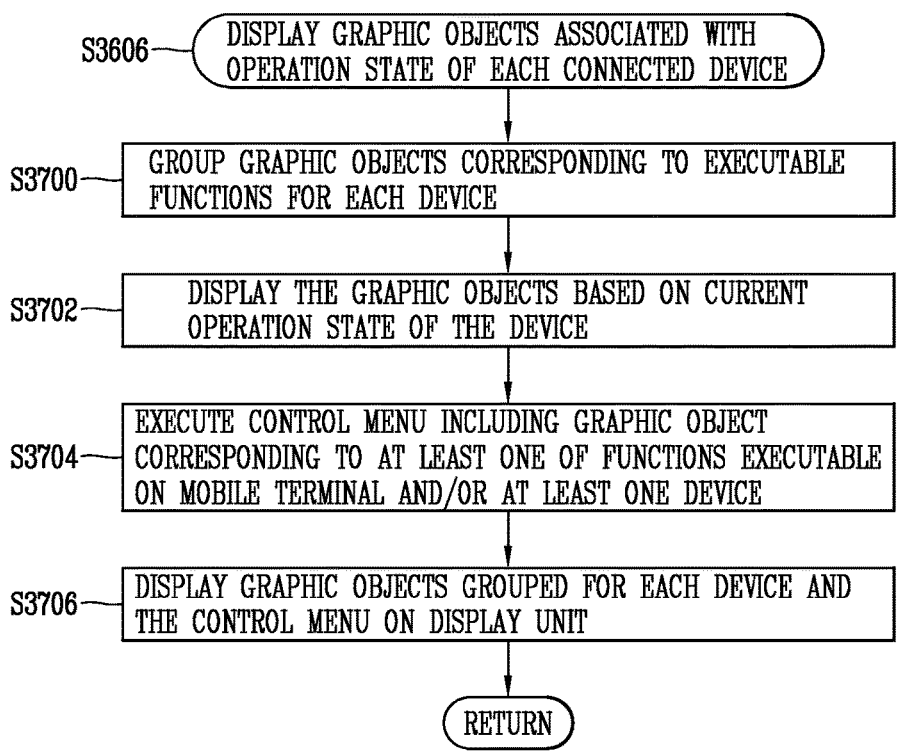
FIG. 37 is a flowchart illustrating in more detail an operation process of displaying information associated with the operation states of a plurality of terminals during the processes illustrated in FIG. 36.

On the other hand, FIG. 37 illustrates an operation process of displaying information associated with the operation states of a plurality of terminals, among the processes illustrated in FIG. 36, as described above.

Referring to FIG. 37, first, the controller 180 of the mobile terminal 100 according to an embodiment of the present disclosure may group graphic objects corresponding to functions that are executable for the each device, for each device, and display the graphic objects grouped for each device on the display unit 151 (S3700). The executable functions may be preset by the user from any one of the mobile terminal 100 or devices connected to the mobile terminal 100. Therefore, the functions may be of course added or deleted as much as possible according to the use's selection. In addition, an order in which graphic objects corresponding to the functions are listed may also be changed as much as possible in accordance with the user's selection or a preset order. Here, the preset order may be determined in various ways. For example, the controller 180 may determine an order of functions according to the order of the highest use degree among the functions selected by the user as functions to determine a current operation state. Here, the use degree may be determined according to a number of times the touch input is applied by the user, a number of times the state is changed by the user, and the like.

On the other hand, the controller 180 may display graphic objects grouped for each device in the step S3600 to be distinguished from each other based on a current operation state of the corresponding device, depending on whether they are currently being executed or not (S3702). For example, the controller 180 may display a graphic object corresponding to a function currently being executed in a different color from a graphic object corresponding to a function that is not currently being executed, or display a guide line having a different thickness adjacent to the graphic object. Alternatively, the controller 180 may display the graphics object corresponding to the function currently being executed and the graphic object corresponding to the function that is not currently being executed to have different shapes from each other, even though corresponding to the same function.

Upon the completion of the step S3702, the display unit 151 of the mobile terminal 100 according to an embodiment of the present disclosure may display executable functions and functions currently being executed among them in a distinguished manner. Accordingly, the controller 180 may allow the user to check devices currently connected to the mobile terminal 100, and functions currently executable on the mobile terminal 100, namely, all the operation states of devices currently connected to the mobile terminal 100.

Meanwhile, in this state, the controller 180 may generate a control menu for simultaneously controlling at least one of functions that are executable on the mobile terminal 100 and devices currently connected to the mobile terminal 100 (S3704). Furthermore, the controller 180 may display graphic objects grouped for the device and the generated control menu on the display unit 151. Here, the control menu may be displayed adjacent to graphic objects for functions for determining operation states grouped for the each device as illustrated in FIG. 35 or displayed in another divided region. In this case, the controller 180 may divide a region on the display unit 151 into a plurality of regions, and display graphic objects for preset functions and the control menu for the each device in different regions.

Here, the control menu may include graphic objects corresponding to at least one of functions executable in the mobile terminal 100 and the devices currently connected to the mobile terminal 100, and the executable functions herein may be predesignated functions for determining the operation state. Furthermore, the generated control menu may be propagated to other devices currently connected to the mobile terminal 100, and accordingly, even though the user selects any one of other devices connected to a BAN, a screen including the same control menu may be displayed on the display unit 151.

On the other hand, the positions of graphic objects included in the control menu may be determined automatically or determined according to the user's selection. For example, an order in which graphic objects included in the control menu are listed may be determined in various ways. For example, the controller 180 may determine an order of graphic objects included in the control menu according to an order set by the user or an order of the user's highest attention level. Here, the "user's attention level" may be determined according to a number of times the touch input is applied by the user or a number of times the state is changed by the user, for example.

Meanwhile, the user may of course change an order of graphic objects included in the control menu at his or her discretion in addition to automatically determining the order as described above. In this case, the controller 180 may propagate information on a change of positions to other connected devices.

In addition, functions included in the control menu may be added or deleted as much as possible by the user, and in this case, the added or deleted functions may have an effect on graphic objects displaying the operation states of the mobile terminal 100 and devices currently connected to the mobile terminal 100. In other words, when the display of a graphic object corresponding to a specific function is terminated on the control menu, the controller 180 may determine that a function corresponding to a graphic object the display of which is terminated is excluded from predesignated functions to determine the operation states. In this case, the controller 180 may propagate information on the excluded function to other connected devices, and accordingly, information on an operation state corresponding to the excluded function may not be received any longer.

On the contrary, a specific function may be of course added to the control menu. In this case, the controller 180 may further display a graphic object corresponding to the added function along with graphic objects corresponding to the predesignated functions to determine the operation states. In this case, the controller 180 may propagate information on the added function to other connected devices, and accordingly, information on an operation state corresponding to the added function may be further received.

Figure 38:
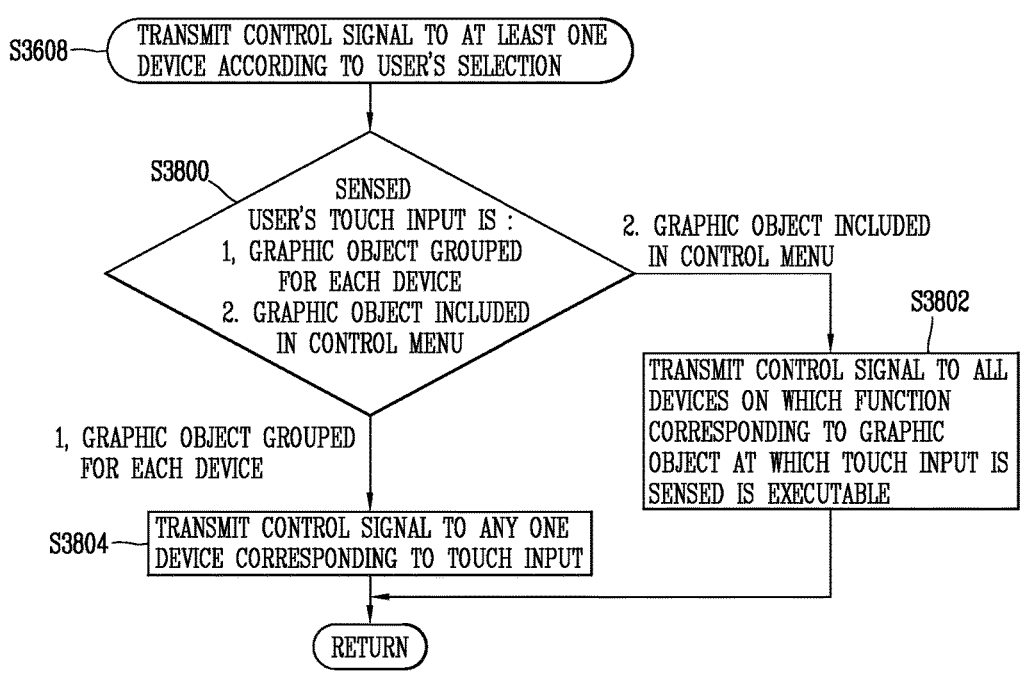
FIG. 38 is a flowchart illustrating an operation process of controlling at least one device according to a user's selection during the processes illustrated in FIG. 36.

On the other hand, FIG. 38 illustrates an operation process of controlling at least one device according to the user's selection among the processes illustrated in FIG. 36.

Through the user's selection of graphic objects included in the user interface, the controller 180 may allow a specific function to be executed or the executed specific function to be suspended on all of the mobile terminal 100 and other connected devices or any one of them. Furthermore, the user's selection may be determined based on a graphic object corresponding to the user's touch input.

In other words, for example, when the user's touch input is sensed on the display unit 151, the controller 180 may recognize a position on the display unit 151 at which the touch input is sensed. Furthermore, the controller 180 may determine whether the touch input is applied to one of graphic objects grouped for predesignated functions or to one of graphic objects included in the control menu (S3800). In addition, a control signal for controlling a specific function may be transmitted to any one of the devices or all the connected devices according to the divided result.

For example, as a result of sensing the touch input in the step S3800, when the touch input is sensed in a region where graphic objects for prespecified functions are displayed for the each device, the controller 180 may determine the touch input as an input for a specific device.

In this case, the controller 180 may transmit a signal associated with the control of a specific function to any one of the devices corresponding to a graphic object on which the touch input is sensed. Furthermore, the specific function may be a function corresponding to a graphic object displayed at a position where the touch input is sensed.

Accordingly, the controller 180 may transmit a control signal for suspending the execution of the specific function or a specific function currently being executed to any one of the devices (S3804). Here, if any one of the devices is the mobile terminal 100, then the controller 180 may of course execute the specific function or stop the specific function based on the control signal.

On the other hand, as a result of sensing a touch input in the step S3804, when the touch input is sensed in a region where graphic objects included in the control menu are displayed, the controller 180 may determine that the touch input is applied to all of the mobile terminal 100 and devices connected to the mobile terminal 100. In this case, the controller 180 may transmit a control signal for controlling a function corresponding to the touch input to all of the connected devices while at the same time executing a specific function on the mobile terminal 100 or suspending a specific function currently being executed based on the control signal. Here, a function corresponding to the touch input may be a function corresponding to a graphic object displayed at a position where the touch input is sensed.

In other words, the mobile terminal 100 according to an embodiment of the present disclosure may provide a user interface including a control menu capable of simultaneously controlling at least one of information associated with current operation states of a plurality of devices and functions executable by the plurality of devices. Furthermore, the controller 180 may allow the user to easily and quickly check the current operation states of the plurality of devices through the user interface. In addition, the controller 180 may allow the user to simultaneously control a function of any one of the plurality of devices or functions of at least part of the plurality of devices through the interface, thereby allowing the user to more easily and conveniently control the plurality of devices.

On the other hand, according to the above description, an operation process of the mobile terminal 100 according to an embodiment of the present disclosure has been described in detail with reference to flowcharts.

In the following description, a user interface screen provided on the mobile terminal 100 according to an embodiment of the present disclosure and examples of functions provided on the user interface screen according to an embodiment of the present disclosure will be described in more detail with reference to exemplary views.

Figure 39:
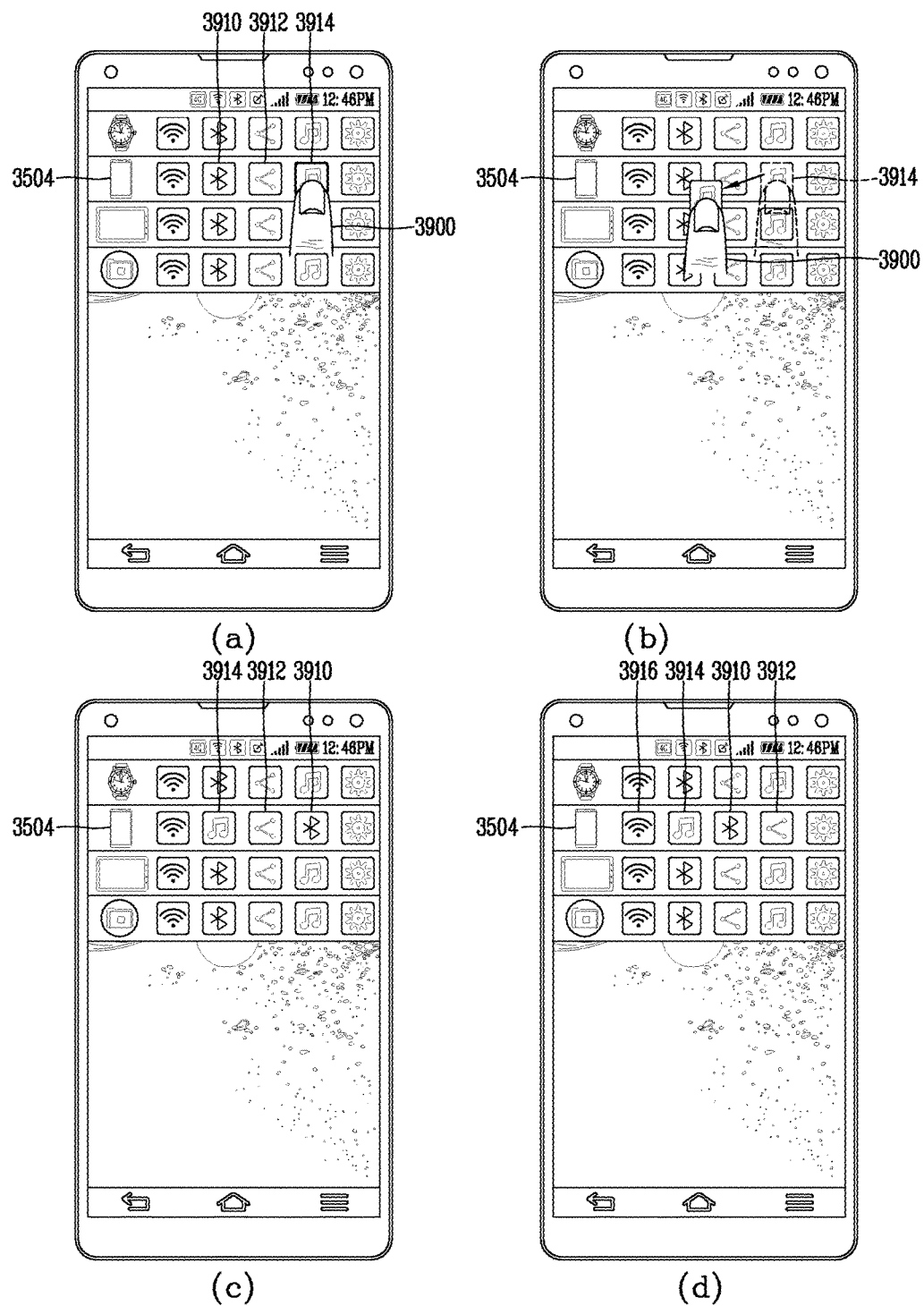
FIG. 39 is an exemplary view illustrating an example in which a position of a graphic object corresponding to a function of a specific device is changed in a mobile terminal according to an embodiment of the present disclosure.

FIG. 39 is an exemplary view illustrating an example in which a position of a graphic object corresponding to a function of a specific device is changed in a mobile terminal according to an embodiment of the present disclosure.

First, referring to FIG. 39A, FIG. 39A illustrates an example in which functions that are executable on the mobile terminal 100 and devices connected to the mobile terminal 100, and a control menu capable of simultaneously controlling at least part of the functions are displayed. Furthermore, in this state, the user may change the position of a graphic object corresponding to a desired function as much as possible at his or her discretion.

For example, as illustrated in FIGS. 39 (*a*) and 39 (*b*), the user may touch and drag a graphic object corresponding to a function of a specific device to move the graphic object to any position. In this case, the controller 180 may change the positions of graphic objects corresponding to other functions of the relevant device according to the movement of the graphic object. For example, the controller 180 may insert the graphic object selected by the user to a different position in a row displayed with the graphic objects of the currently selected device, or exchange only the positions of a graphic object selected by the user and another graphic object displayed at a position where the object is moved by the user with each other. FIGS. 39C and 39D illustrate those examples.

For example, as illustrated in FIGS. 39A and 39B, when a graphic object 3914 (hereinafter referred to as a first graphic object) corresponding to a sound setting function of the mobile terminal 100 is selected and dragged to a specific position by the user, the controller 180 may change at least one position of other graphic objects displayed in a row (a row in which a graphic object 3504 corresponding to the mobile terminal 100 is displayed) in which functions executable on the mobile terminal 100 are displayed according to the dragged position.

In other words, when the graphic object 3914 is moved to a position corresponding to a graphic object 3910 (hereinafter, referred to as a second graphic object) corresponding to the existing Bluetooth function of the mobile terminal 100, the controller 180 may exchange the position of the second graphic object 3910 and the position of the graphics object on which the movement is currently selected, namely, the first graphic object 3914, with each other. In this case, as illustrated in FIG. 39C, it may be displayed in such a manner that only the positions of a graphic object 3910 corresponding to the Bluetooth function and a graphic object 3914 corresponding to the sound setting function are exchanged with each other in a row corresponding to the mobile terminal 100.

On the other hand, on the contrary, the controller 180 may insert the first graphic object 3914 between other graphic objects displayed in a row corresponding to the mobile terminal 100. In this case, the positions of other graphic objects may be moved by inserting the first graphic object 3914. In other words, as illustrated in FIGS. 39A and 39B, in a state that the first graphic object 3914 is selected, when the selected graphic object is dragged to a position between a graphic object 3916 corresponding to the Wi-Fi function and the graphic object 3910 corresponding to the Bluetooth function of the mobile terminal 100, the controller 180 may move the positions of the second graphic object 3910 and a graphic object associated with another function at the same time according to the insertion of the first graphic object 3914. FIG. 39D illustrates such an example.

On the other hand, it is illustrated in FIG. 39 as an example in which only the position of a graphic object corresponding to any one of functions executable on a specific device, but the positions of functions provided by a plurality of devices may be of course changed once at the same time. For example, when the position of a graphic object included in the control menu is changed by the user, the controller 180 may simultaneously change the position of a graphic object corresponding to a specific function of the other devices.

Figure 40:
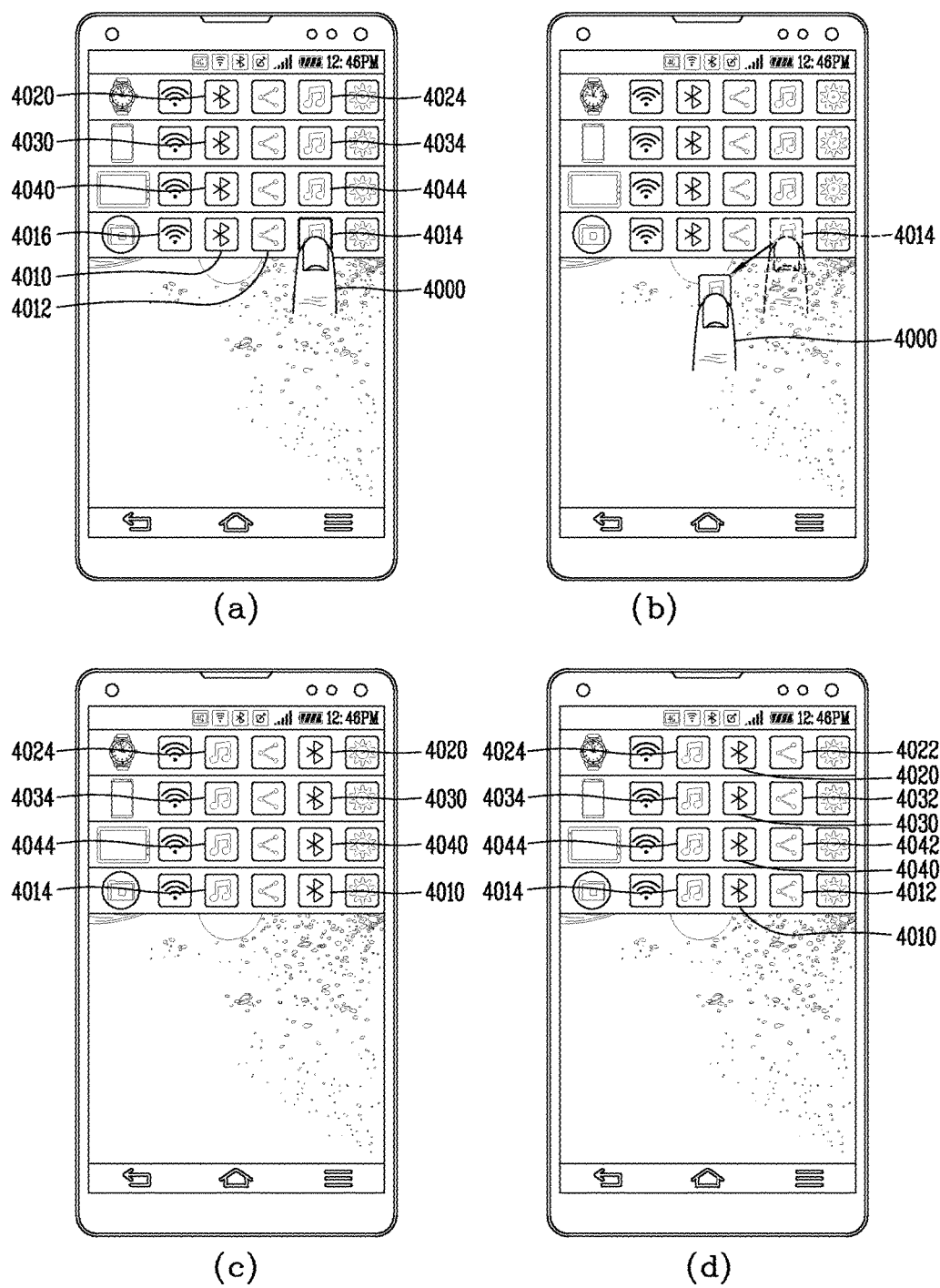
FIG. 40 is an exemplary view illustrating an example in which the positions of graphic objects corresponding to a specific function are simultaneously changed in a mobile terminal according to an embodiment of the present disclosure.

FIG. 40 illustrates an example of such a case.

First, referring to FIGS. 40A and 40B, FIGS. 40A and 40B illustrate views in which a specific graphic object 4014 included in the control menu is selected and dragged by the user. In this case, the controller 180 may insert the selected graphic object 4014 to any position within the control menu according to the user's selection or exchange the position of another graphic object displayed within the control menu and the position of the selected graphic object 4014 with each other.

FIGS. 40C and 40D illustrate such an example.

First, referring to FIGS. 40C, FIG. 40C illustrates an example in which the position of another graphic object displayed in the control menu and the position of the selected graphic object 4014 are exchanged with each other. In other words, within the control menu, when a graphic object 4014 (hereinafter, referred to as a first graphic object) associated with the sound setting function is selected, and the first graphic object 4014 is moved to a position displayed with graphic object 4010 (hereinafter, referred to as a second graphic object) associated with the Bluetooth function, the controller 180 may exchange a position of the first graphic object 4014 on the control menu with a position of the second graphic object 4010 on the control menu with each other.

In this case, as illustrated in (c) of FIG. 40, according to a position exchange between the first graphic object 4014 and the second graphic object 4010, the controller 180 may exchange the positions of graphic objects 4024, 4034, 4044 of the mobile terminal 100 and other devices corresponding to a function of the first graphic object 4014 and the positions of graphic objects 4020, 4030, 4040 of the mobile terminal 100 and other devices corresponding to a function of the second graphic object 4010 with each other.

Meanwhile, if the first graphic object 4014 is inserted to a specific position on the control menu according to the user's selection, then the controller 180 may simultaneously change the positions of a plurality of different graphic objects according to the insertion.

In other words, if the user selects the first graphic object 4014, and then inserts the first graphic object 4014 between the graphic object 4016 corresponding to the WI-FI function and the second graphic object 4010 on the control menu, the controller 180 may move the positions of the second graphic object 4010 and a graphic object 4012 (hereinafter, referred to as a third graphic object) corresponding to the data sharing in accordance with the position movement of the first graphic object 4014 as illustrated in FIG. 40D.

In this case, as illustrated in FIG. 40D, according to the movement of the first graphic object 4014, the second graphic object 4010, and a third graphic object 912, the controller 180 may simultaneously move the positions of graphic objects 4024, 4034, 4044 of the mobile terminal 100 and other devices corresponding to a function of the first graphic object 4014, graphic objects 4020, 4030, 4040 of the mobile terminal 100 and other devices corresponding to a function of the second graphic object 4010, and graphic objects 4022, 4032, 4042 of the mobile terminal 100 and other devices corresponding to a function of the third graphic object 4012.

Meanwhile, according to the foregoing description, it has been mentioned that the mobile terminal 100 according to an embodiment of the present disclosure may further include a graphic object corresponding to an edit function capable of adding a new function to a specific device or control menu or deleting a graphic object corresponding to a previously displayed function.

Figure 41:
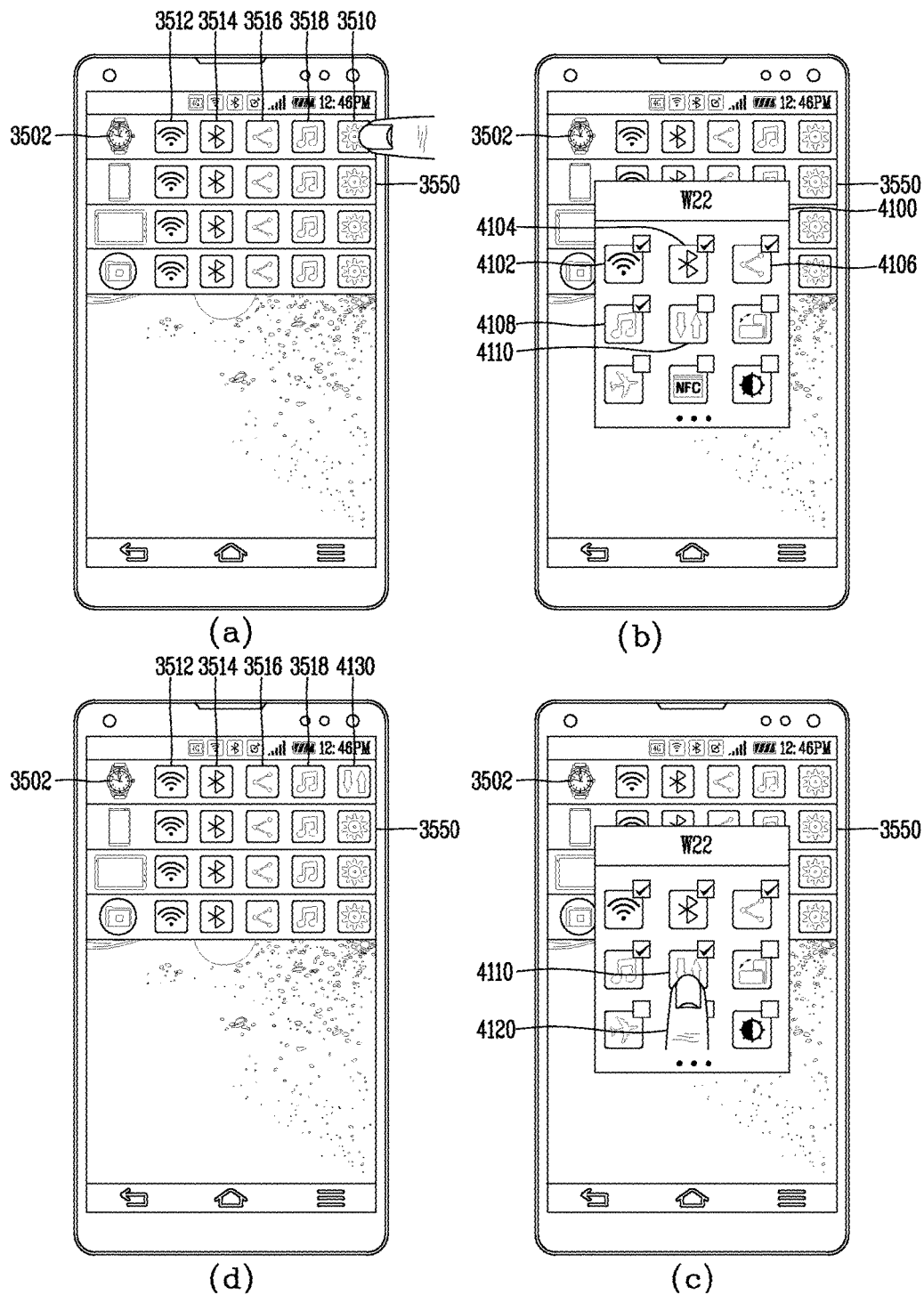
FIG. 41 is an exemplary view illustrating an example in which a graphic object corresponding to a function of a specific device is additionally displayed in a mobile terminal according to an embodiment of the present disclosure.
Figure 42:
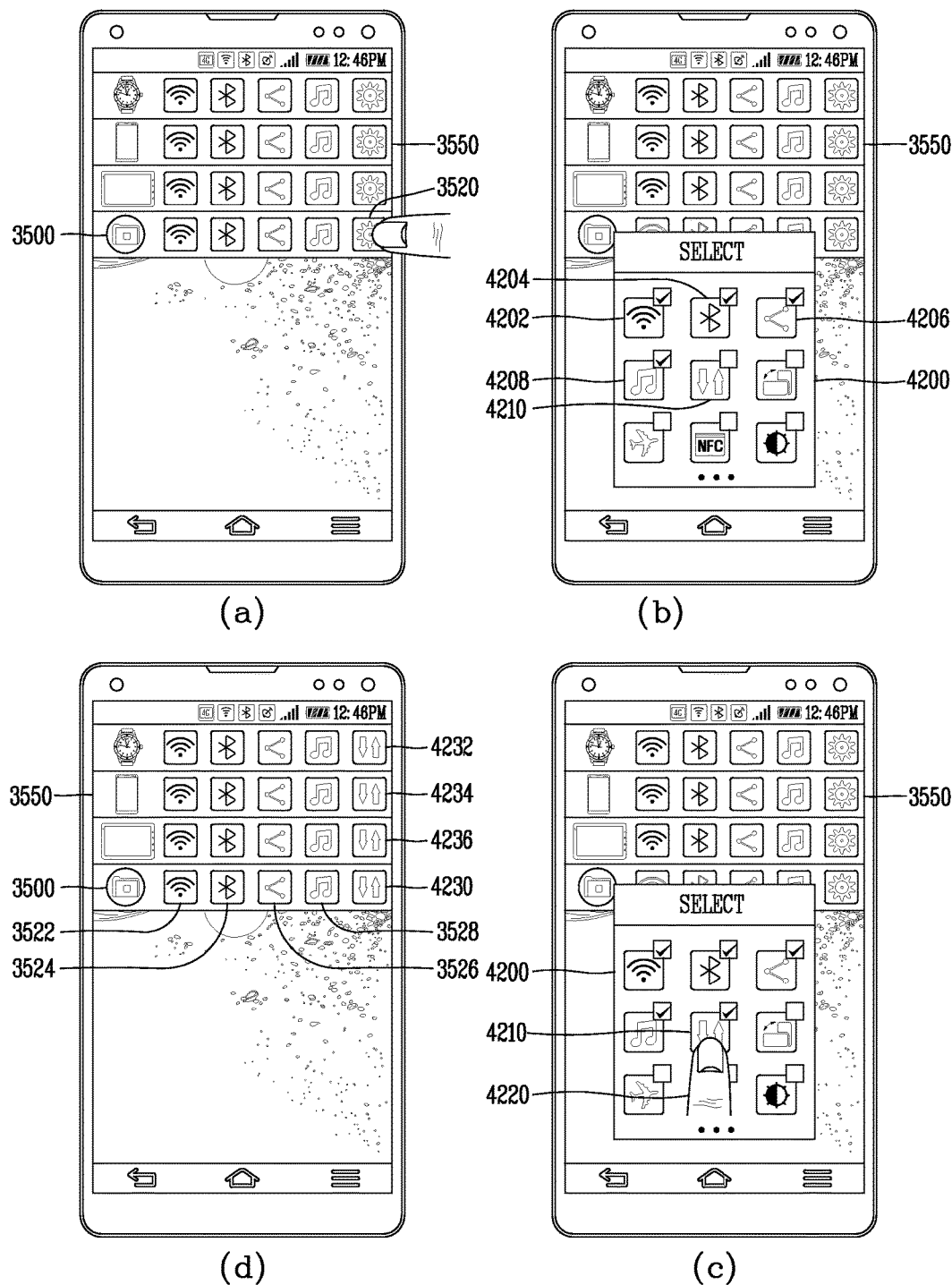
FIG. 42 is an exemplary view illustrating an example in which graphic objects corresponding to a specific function are additionally displayed simultaneously in a mobile terminal according to an embodiment of the present disclosure.

FIGS. 41 and 42 illustrate an example of allowing the user to select a function to be added or deleted using a menu screen including a plurality of functions when a graphic object corresponding to the edit function is displayed in a row or control menu corresponding to a specific device, and there is the user's touch input to the graphic object.

For example, as illustrated in FIG. 41A, when the user selects an edit function graphic object 3510 displayed in a row corresponding to a specific device (e.g., smart watch), the controller 180 may display a menu screen 4100 including part of functions executable on the currently selected device on the display unit 151.

The menu screen 4100 may display a plurality of functions that are executable on a device corresponding to a row in which the user's touch input is currently sensed, namely, smart watch 2020, as illustrated in FIG. 41B. Furthermore, on the menu screen 4100, a name of the smart watch 2020 (e.g., W22), and graphic objects 4102, 4104, 4106, 4108 corresponding to functions displayed on the current user interface screen 3550 and graphic objects corresponding to functions that are not displayed thereon, among the functions, to be distinguished from each other (e.g., displayed with a check (V)).

On the other hand, as illustrated in FIG. 41C, the controller 180 may allow the user to select a new function 4110 in addition to functions currently displayed on the user interface screen 3550 among functions that are executable on a device corresponding to a row in which the user's touch input is currently sensed, namely, the smart watch 2020. In this case, the controller 180 may display a graphic object 4130 corresponding to the newly selected function 4110 on the user interface screen 3550. FIG. 41D illustrates such an example.

On the other hand, adding a new function has been illustrated as an example in FIGS. 41C and 41D, but the display of any one of graphic objects currently displayed on the user interface screen 3550 may be of course terminated by a similar process. For example, the controller 180 may release least one of currently selected functions 4102, 4104, 4106, 4108 according to the user's selection on a menu screen 4100 illustrated in FIG. 41C. In this case, the controller 180 may display only graphic objects corresponding to functions (checked (V) functions) selected by the user among functions included in the menu screen 4100 on the user interface screen 3550. Accordingly, on the user interface screen 3550, a graphic object for the deselected function may be no longer displayed on the relevant device.

On the other hand, according to the foregoing description, it has been described that a graphic object corresponding to any one function of the mobile terminal 100 and at least one of other devices connected to the mobile terminal 100 is newly added or deleted on the user interface screen 3550 as an example, but a specific function may be added to or deleted from the mobile terminal 100 and at least one of other devices at the same time.

FIG. 42 illustrates an example of such a case.

Referring to FIG. 42, when a user's touch input is sensed at a position where the edit function graphic object 3520 included in the control menu 3500 is displayed, for example, as illustrated in FIG. 42A, the controller 180 may display a menu screen 4200 for displaying functions that can be included in the control menu 3500 on the display unit 151 as illustrated in FIG. 42B.

The menu screen 4200 may include various functions as illustrated in FIG. 42B. Furthermore, on the menu screen 4200, graphic objects 4202, 4204, 4206, 4208 corresponding to functions currently displayed on the control menu 3500 and graphic objects corresponding to functions that are not currently displayed on the control menu 3500 are displayed to be distinguished from each other (e.g., displayed with a check (V)).

Meanwhile, when the menu screen 4200 is displayed on the first vane 151, the controller 180 may allow the user to select functions to be included in the control menu 3500 through the menu screen 4200. In other words, as illustrated in FIG. 42C, the controller 180 may allow the user to select a new function 4210 in addition to functions 4202, 4204, 4206 currently displayed on the control menu 3500. In this case, the controller 180 may display a graphic object 4230 corresponding to the newly selected function 4210 on the control menu 3500. FIG. 42D illustrates such an example.

On the other hand, when a new graphic object 4230 is added to the control menu 3500 as described above, a graphic object corresponding to the newly added function may be displayed on the mobile terminal 100 and other devices connected thereto. Accordingly, as illustrated in FIG. 42D, graphic objects 4232, 4234, 4236 corresponding to the graphic object 4230 newly added to the control menu 3500 may be displayed on the user interface screen 3550 for each device. In this case, the controller 180 may allow functions corresponding to the newly added graphic object 4230 to be simultaneously controlled on the mobile terminal 100 and devices connected thereto, based on the user's touch input to the control menu 3500.

Meanwhile, according to the foregoing description, it has been illustrated an example in which a menu screen 4100 or 4200 for allowing the user to select a function to be displayed on a specific device or control menu using a specific graphic object 3510 or 3520 capable of allowing the user to select an edit function, but any other method may be of course used as much as possible. For example, when a duration time of the touch input is equal to or longer than a preset period of time, the controller 180 may display a menu screen corresponding to a position where the touch input is sensed on the display unit 151.

In other words, when the user's touch input sustained for a preset period of time is sensed in a region on the display unit 151 on which graphic objects corresponding to the functions of a specific device are displayed, the controller 180 may determine that the touch input is applied to edit functions corresponding to a specific device. In this case, the controller 180 may display the menu screen 4100 on the display unit 151. Furthermore, the controller 180 may allow graphic objects corresponding to a function selected through the menu screen 4100 to be displayed in a region (e.g., a specific row) corresponding to the specific device on the user interface screen 3550.

Similarly, when a user's touch input sustained for a preset period of time is sensed in a region on the display unit 151 where graphic objects included in the control menu 3500 are displayed, the controller 180 may determine that the touch input is applied to edit functions included in the control menu 3500. In this case, the controller 180 may display the menu screen 4200 on the display unit 151. Furthermore, the controller 180 may display graphic objects corresponding to a function selected through the menu screen 4200 in a region where the control menu 3500 of the user interface screen 3550 is displayed.

On the other hand, according to the foregoing description, it is seen that graphic objects included in the control menu 3500 are not changed even though a graphic object corresponding to the functions of a specific device is newly added or changed, but on the contrary, when the position of a graphic object corresponding to at least one of the devices is changed, the positions of the graphic objects included in the control menu 3500 may be of course changed accordingly.

Figure 43:
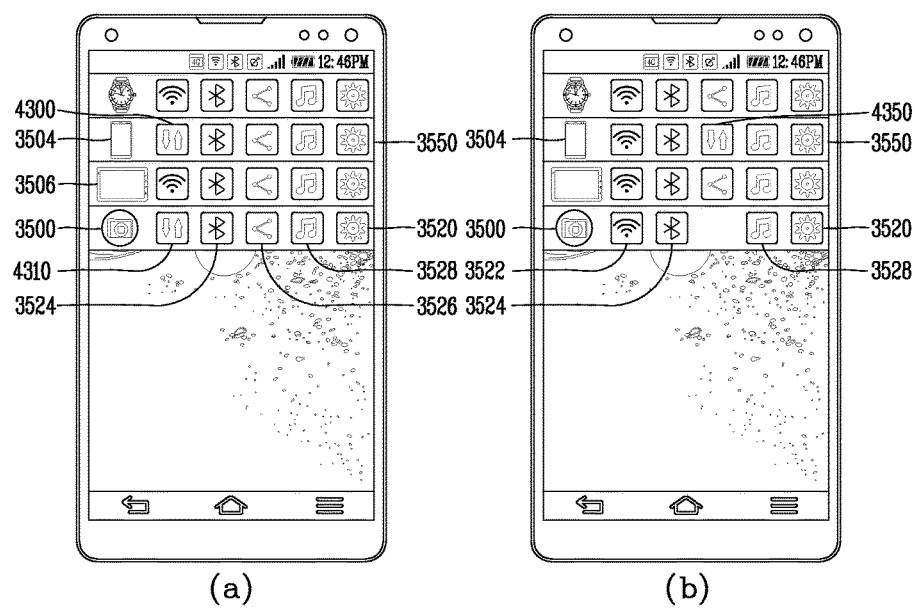
FIG. 43 is an exemplary view illustrating an example in which graphic objects included in a control menu are changed according to a change of a graphic object corresponding to a function of a specific device in a mobile terminal according to an embodiment of the present disclosure.

FIG. 43 is an exemplary view illustrating an example in which graphic objects included in a control menu are changed according to a change of a graphic object corresponding to a function of a specific device in a mobile terminal according to an embodiment of the present disclosure in such a case.

For example, as illustrated in FIG. 43A, when any one of functions of the mobile terminal 100 currently displayed on the user interface screen 3550 is changed to a new function according to the user's selection, the controller 180 may display a graphic object 4300 corresponding to the new function in a region where functions corresponding to the mobile terminal 100 are displayed.

In this case, the controller 180 may change functions included in the control menu 3500 according to a change of the function. In other words, as described above, when any one of functions of a specific device displayed on the user interface screen 3550 is changed, the controller 180 may display a graphic object corresponding to the changed function on the control menu 3500.

In addition, if the change is a case where a new function is added instead of the existing function as illustrated in FIG. 43A, then a graphic object 4310 corresponding to the new function may be displayed on the control menu 3500. In this case, when there is a user's touch to the graphic object 4310, the controller 180 may allow a function corresponding to the graphic object 4310 among the mobile terminal 100 and other devices connected to the mobile terminal 100 to be controlled simultaneously based on the user's touch input.

On the other hand, when there is a user's touch input to the graphic object 4310, the controller 180 may allow a function corresponding to the graphic object 4310 to be controlled based on the touch input on all of the mobile terminal 100 and other devices connected to the mobile terminal 100. Alternatively, the controller 180 may allow a function corresponding to the graphic object 4310 to be controlled only for devices in which the graphic object 4310 is displayed on the user interface screen 3550. In this case, a function corresponding to the graphic object 4310 may be controlled only in a part of the mobile terminal 100 and other devices connected thereto.

On the other hand, on the contrary to FIG. 43A, when a column including graphic objects corresponding to at least one of different functions is generated, the controller 180 may of course not display a graphic object corresponding to the column. It is because on the user interface screen 3550 of the present disclosure, graphic objects corresponding to functions executable on the mobile terminal 100 and other devices connected thereto and graphic objects included in the control menu 3500 may be preset in such a manner that graphic objects associated with the same function are disposed in the same column. In this case, the controller 180 may not display a graphic object at a position corresponding to a column including graphic objects corresponding to the at least one of different functions in the control menu 3500. FIG. 43B illustrates such an example.

Figure 44A:
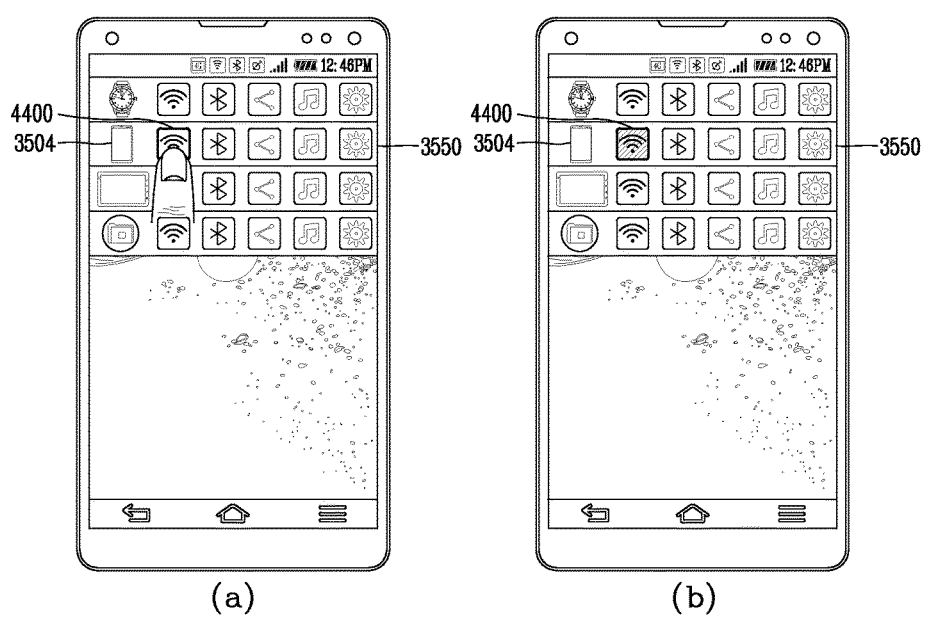
FIGS. 44A and 44B are exemplary views illustrating an example in which at least one device are simultaneously controlled according to a user's touch input in a mobile terminal according to an embodiment of the present disclosure.
Figure 44B:
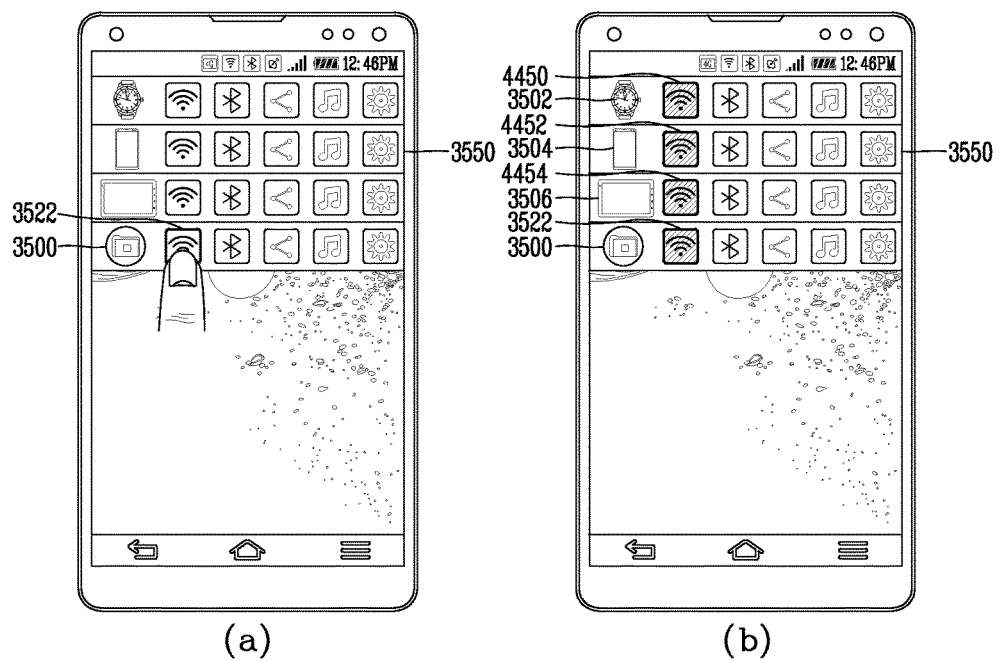

Meanwhile, according to the foregoing description, it has been mentioned that the controller 180 of the mobile terminal 100 according to an embodiment of the present disclosure may control at least one function on at least one device through the user interface screen 3550. FIGS. 44A and 44B illustrate an example in which at least one device are simultaneously controlled according to a user's touch input in a mobile terminal according to an embodiment of the present disclosure as described above.

First, referring to FIG. 44A, FIG. 44A illustrates an example in which a specific function of a specific device is controlled by a user. In other words, as illustrated in FIG. 44A, for example, when there is a user's touch input to a graphic object 4400 corresponding to any one of functions executable on a specific device, the controller 180 may allow a function corresponding to the graphic object to be controlled only on the specific device.

In this case, the controller 180 may transmit a control signal for controlling the function to the specific device. For example, when the specific function is in an off state as a result of determining the operation state of the specific device, the controller 180 may transmit a control signal for turning on the specific function to the specific device according to the touch input. On the contrary, when the specific function is turned on in the specific device, the controller 180 may transmit a control signal for turning off the specific function to the specific device according to the touch input. Here, if the specific device is the terminal itself, namely, the mobile terminal 100, the controller 180 may of course control a specific function according to the user's touch input instead of transmitting the control signal.

Furthermore, in this case, the operation state of the specific device changed according to the control may be displayed on the user interface screen 3550. Accordingly, the display state of the graphic object 4400 to which the user's touch input is applied may be changed according to a change of the operation state of the specific device.

Meanwhile, the controller 180 of the mobile terminal 100 according to an embodiment of the present disclosure may allow a specific function to be controlled on all of the mobile terminal 100 and devices connected thereto according to the user's touch input. For example, as illustrated in FIG. 44B(a), when the user's touch input is applied to a position where any one 3522 of graphic objects included in the control menu 3500 is displayed, the controller 180 may allow a function corresponding to the graphic object 3522 to be controlled on all of the mobile terminal 100 and other devices connected to the mobile terminal 100 according to the user's touch input.

As a result, the controller 180 may transmit a signal for controlling a function corresponding to the graphic object 3522 to other devices 2020, 2030 connected to the mobile terminal 100. Furthermore, the controller 180 may control the function corresponding to the graphic object 3522 according to the user's touch input on the mobile terminal 100.

In this case, an execution state of a function corresponding to the graphic object 3522 may be changed on the connected other devices 2020, 2030 and the mobile terminal 100 according to the transmitted control signal and the control of the controller 180. Accordingly, the operation states of the other connected devices 2020, 2030 and the mobile terminal 100 may be changed, and accordingly, as illustrated in FIG. 44B, the changed operation states of the mobile terminal 100 and other connected devices 2020, 2030 may be displayed on the user interface screen 3550.

On the other hand, according to the foregoing description, it has been described that the mobile terminal 100 according to an embodiment of the present disclosure has a form of a smart phone for an example, but it is merely exemplary description for the sake of convenience of explanation, and the present disclosure may not be necessarily limited to this. In other words, as illustrated in FIG. 3, the mobile terminal 100 according to an embodiment of the present disclosure may be of course implemented in the form of a smart watch 2020, a tablet PC 2030, or smart glasses 2010, and may be of course implemented in various forms of devices as much as possible other than the above illustrated examples.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a wireless communication unit configured to transmit and receive wireless signals to and from at least one external terminal;
an output unit comprising at least one of an audio output module configured to output audio information or a display configured to display image information; and
a controller operably coupled with the wireless communication unit and the output unit, wherein the controller is configured to:
selectively cause the output unit or the at least one external terminal communicatively connected to the mobile terminal to output event information associated with occurrence of an event according to a predetermined condition; and
detect whether the mobile terminal and the connected at least one external terminal are in a wake-up mode or a sleep mode,
wherein when the mobile terminal is in the wake-up mode, the controller is further configured to:
cause the output unit to output the event information when no operation is performed by the at least one external terminal in the wake-up mode; and cause the at least one external terminal being operated in the wake-up mode to output the event information when the at least one external terminal is worn or gripped by a user.

2. The mobile terminal of claim 1, wherein the controller is further configured to cause the wireless communication unit to transmit the event information to an external terminal operating in the wake-up mode among the connected at least one external terminal when the mobile terminal is in the sleep mode.

3. The mobile terminal of claim 1, wherein when two or more external terminals communicatively connected to the mobile terminal are worn or gripped by the user, the controller is further configured to cause the wireless communication unit to transmit the event information to any one of the worn or gripped external terminals based on whether the one of the worn or gripped external terminals is provided with a display unit and based on a size of the provided display unit.

4. The mobile terminal of claim 1, wherein when there are a plurality of external terminals communicatively connected to the mobile terminal and operating in the wake-up mode, the controller is further configured to:
cause the wireless communication unit to transmit the event information to one of the plurality of external terminals; or
cause the output unit to output the event information based on an application executed on the mobile terminal and the one of the plurality of external terminals operating in the wake-up mode.

5. The mobile terminal of claim 4, wherein the controller is further configured to control the wireless communication unit or the output unit to output the event information from a terminal on which a preset specific application is not executed among the mobile terminal and the plurality of external terminals operating in the wake-up mode such that the event information is not output via a terminal executing the preset specific application.

6. The mobile terminal of claim 5, wherein the preset specific application is a video application such that video content is played back on the terminal executing the preset specific application.

7. The mobile terminal of claim 1, wherein when the event occurs on at least one of the at least one external terminal, the controller is further configured to:
detect whether the mobile terminal and connected at least one external terminal are in a wakeup mode or a sleep mode; and
when the mobile terminal is in the wake-up mode:
cause the output unit to output the event information when no operation is performed by the at least one external terminal in the wake-up mode; and
cause any one of the mobile terminal and the at least one external terminal being operated in the wake-up mode and worn or gripped by the user to output the event information when the at least one external terminal is operated in the wakeup mode.

8. The mobile terminal of claim 1, wherein the event comprises:

a case of generating an alarm by an alarm set in the mobile terminal or at least one of the at least one external terminal,
wherein the controller is further configured to cause outputting of an alarm set in the mobile terminal and an alarm at an alarm time set in the at least one of the at least one external terminal, or cause the wireless communication unit to transmit the event information associated with the alarm set in the mobile terminal to the at least one of the at least one external terminal based on an operating mode of the mobile terminal and the at least one of the at least one external terminal and based on whether the mobile terminal and the at least one of the at least one external terminal are worn or gripped by the user.

9. The mobile terminal of claim 8, wherein when an alarm is output from the mobile terminal, the controller is further configured to cause the wireless communication unit to transmit information associated with the output alarm to the at least one of the at least one external terminal such that the alarm is also output on the at least one of the at least one external terminal when the user does not check on the alarm from the mobile terminal within a predetermined period of time.

10. The mobile terminal of claim 1, further comprising;
a sensing unit configured to sense the user's biological signal,
wherein the controller is further configured to:
determine the user's physical condition based on the sensed biological signal; and
cause the wireless communication unit to transmit information associated with the user's physical condition to the at least one external terminal when the user's physical condition is in a specific state.

11. The mobile terminal of claim 10, wherein when the user is in a sleep state, the controller is further configured to switch an operation mode to a vibration mode or a mute mode based on whether or not the mobile terminal is worn by the user.

12. The mobile terminal of claim 1, wherein the controller is further configured to:
determine the user's surrounding situation; and
cause the wireless communication unit to transmit the event information to the at least one external terminal or cause the output unit to output the event information based on the determined user's surrounding situation.

13. The mobile terminal of claim 12, wherein the controller is further configured to determine the user's surrounding situation based on at least one of a location of the user, whether the user has entered a specific region, or a predetermined schedule of the user.

14. The mobile terminal of claim 1, wherein when the event information output from the mobile terminal is checked by the user, the controller is further configured to cause the wireless communication unit to transmit information associated with the checked event information to at least one of the at least one external terminal.

* * * * *